(12) United States Patent
Itoh et al.

(10) Patent No.: US 8,891,759 B2
(45) Date of Patent: Nov. 18, 2014

(54) CRYPTOGRAPHIC PROCESSING DEVICE AND CRYPTOGRAPHIC PROCESSING METHOD

(71) Applicant: Fujitsu Limited, Kawasaki (JP)

(72) Inventors: Kouichi Itoh, Kawasaki (JP); Dai Yamamoto, Kawasaki (JP); Masahiko Takenaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 222 days.

(21) Appl. No.: 13/630,889

(22) Filed: Sep. 28, 2012

(65) Prior Publication Data

US 2013/0039486 A1  Feb. 14, 2013

Related U.S. Application Data

(63) Continuation of application No. PCT/JP2010/002363, filed on Mar. 31, 2010.

(51) Int. Cl.
*H04L 29/06* (2006.01)
*G06F 7/72* (2006.01)
*H04L 9/00* (2006.01)
*H04L 9/30* (2006.01)

(52) U.S. Cl.
CPC ......... *H04L 9/3066* (2013.01); *H04L 2209/122* (2013.01); *G06F 2207/7242* (2013.01); *G06F 7/725* (2013.01); *H04L 9/003* (2013.01)
USPC .......................................................... 380/28

(58) Field of Classification Search
USPC ........................................ 726/22, 23; 380/28
See application file for complete search history.

(56) References Cited

U.S. PATENT DOCUMENTS 6,914,986 B2 * 7/2005 Handschuh ............... 380/30
(Continued)

FOREIGN PATENT DOCUMENTS

| JP | 2003-233307 | 8/2003 |
| WO | WO 2007/005563 | 1/2007 |
| WO | WO 2009/122461 | 10/2009 |

OTHER PUBLICATIONS

Fan Zhang et al. "An Efficient Window-Based Countermeasure to Power Analysis of ECC Algorithms", Proceedings of the Fifth International Conference on Information Technology: New Generations, 2008, pp. 120-126.

(Continued)

*Primary Examiner* — Ali Abyaneh
(74) *Attorney, Agent, or Firm* — Staas & Halsey LLP

(57) ABSTRACT

A cryptographic processing device includes a private key storage unit which stores a private key d for elliptic curve cryptography, a random number generation unit which generates a b-bit random value s, and a processing unit. A bit string D is the private key d or a bit string obtained by modifying the private key d in such a way that a value of a most significant bit is 0, and a relation u=mk+b holds true for a length u of the bit string D, a window size k, and a positive integer m. The processing unit determines a signed k-bit window value w[i] corresponding to each i where $0 \leq i \leq (m-1)$, a signed b-bit random value s[i] corresponding to each i, and a correction value g. The processing unit determines the above values under a certain constraint condition, while determining each random value s[i] to be +s or −s.

15 Claims, 35 Drawing Sheets

(56) References Cited

U.S. PATENT DOCUMENTS

| | | | |
|---|---|---|---|
| 7,602,907 B2 * | 10/2009 | Zhu et al. | 380/30 |
| 7,903,811 B2 * | 3/2011 | Vasyltsov | 380/28 |
| 7,940,927 B2 * | 5/2011 | Futa et al. | 380/28 |
| 8,345,864 B1 * | 1/2013 | Robinson et al. | 380/30 |
| 2007/0064931 A1 | 3/2007 | Zhu et al. | |
| 2008/0240443 A1 * | 10/2008 | Vuillaume et al. | 380/277 |
| 2011/0013770 A1 | 1/2011 | Itoh | |

OTHER PUBLICATIONS

Kouichi Itoh et al., DPA Countermeasures by Improving the Window Method, CHES2002, 2002, pp. 303-317.

International Search Report of PCT/JP2010/002363 mailed Jun. 1, 2010.

International Preliminary Report on Patentability mailed Nov. 1, 2012 in corresponding International Application No. PCT/JP2010/002363 1 page.

* cited by examiner d = 0 1 0 0 1 0 1 0 1 1 0 1 0 0 0 1 1 0 1 1 0 1 1 s = 1 0 0 0 1 1 0 1    − 1 0 0 0 1 1 0 1
                           − 1 0 0 0 1 1 0 1
                                 − 1 0 0 0 1 1 0 1
                                       − 1 0 0 0 1 1 0 1
                                             − 1 0 0 0 1 1 0 1
———————————————————————————————
0 0 1 1 0 1 1 0 1 0 1 0 1 1 0 1 0 1 0 0 1 1 0

| | | | | | | |
|---|---|---|---|---|---|---|
| INITIAL WINDOW VALUE | 1 | 5 | 5 | 2 | 6 | c |
| CARRY CORRECTION | +1 | +1 | | +1 | | |
| WINDOW CORRECTION | | −8 | −8 | | −8 | |
| SIGNED WINDOW VALUE | 2 | −2 | −3 | 3 | −2 | |
| | w[4] | w[3] | w[2] | w[1] | w[0] | |

F I G. 1

101

| INDEX | VALUE |
|---|---|
| 0 | 0A |
| 1 | 1A |
| 2 | 2A |
| 3 | 3A |
| 4 | 4A |
| 5 | −3A |
| 6 | −2A |
| 7 | −1A |

102

| INDEX | VALUE |
|---|---|
| 0 | $(0 \times 2^8 + s)A$ |
| 1 | $(1 \times 2^8 + s)A$ |
| 2 | $(2 \times 2^8 + s)A$ |
| 3 | $(3 \times 2^8 + s)A$ |
| 4 | $(4 \times 2^8 + s)A$ |
| 5 | $(-3 \times 2^8 + s)A$ |
| 6 | $(-2 \times 2^8 + s)A$ |
| 7 | $(-1 \times 2^8 + s)A$ |

FIG. 2

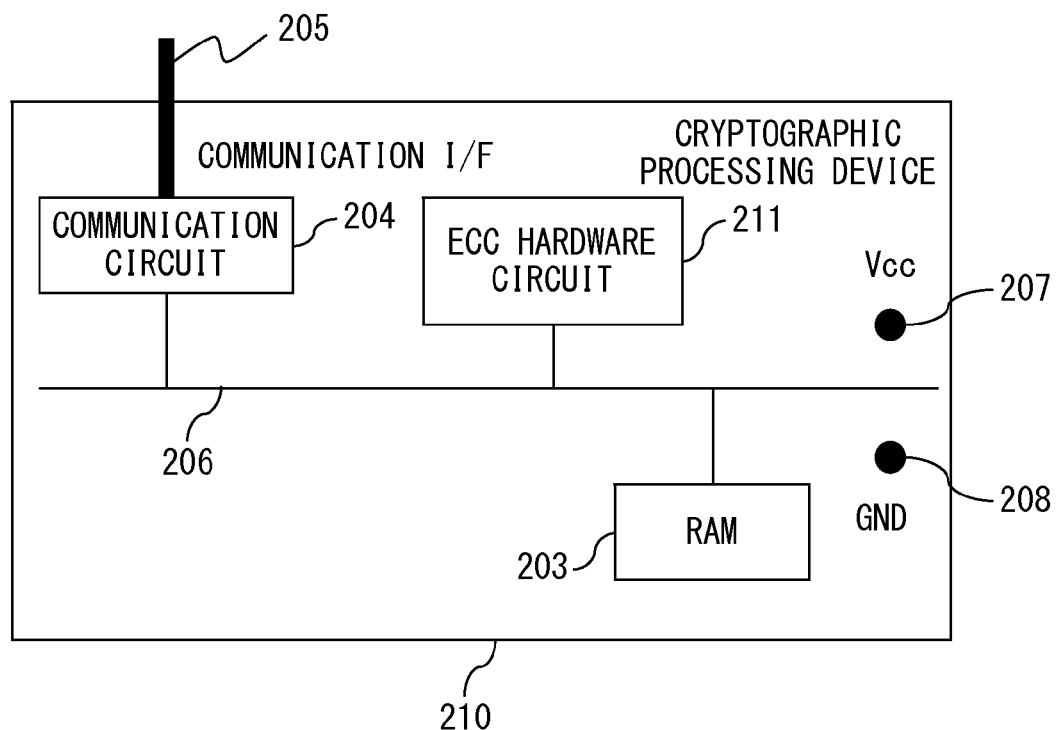
F I G. 7

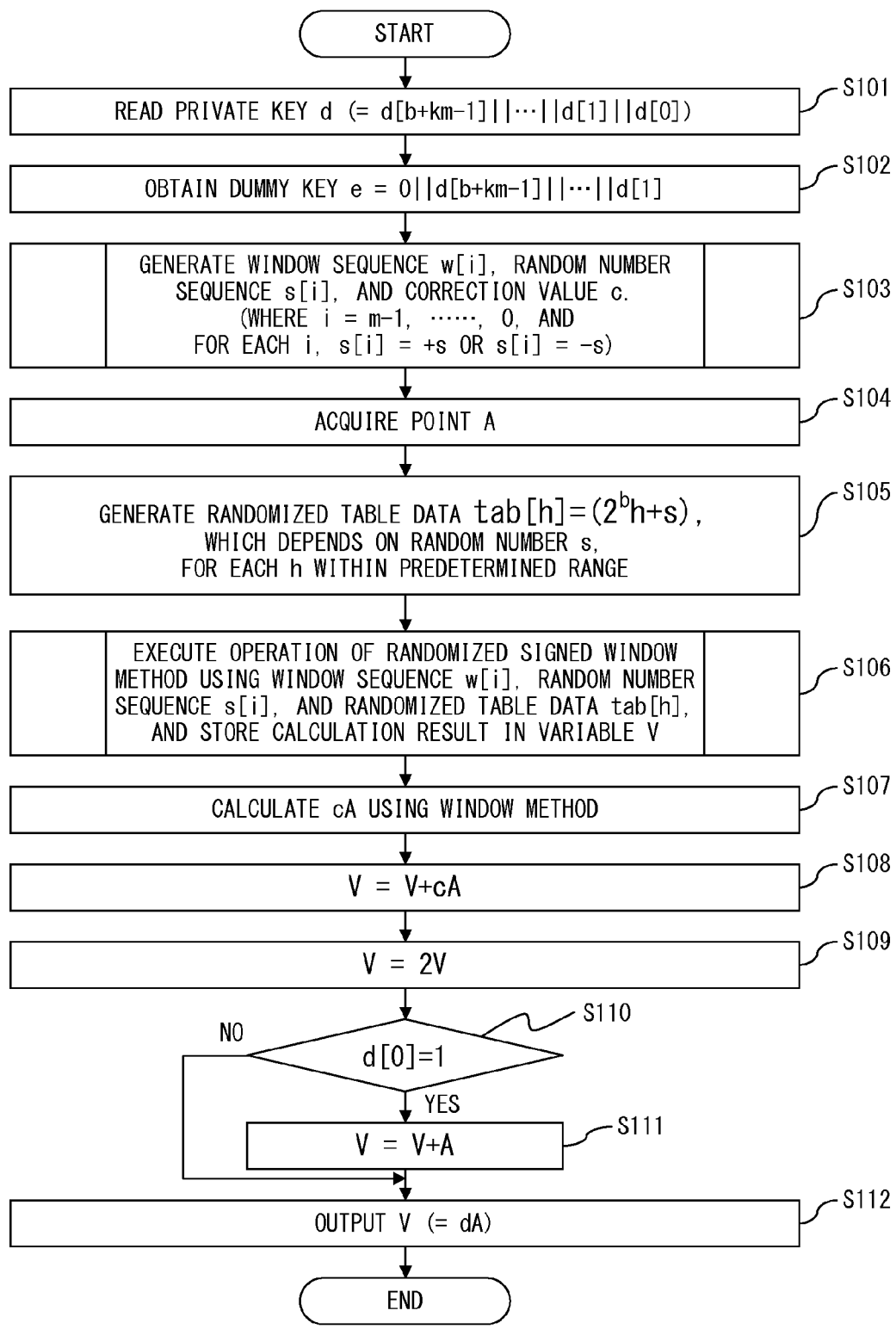
F I G. 9 i=0
CALCULATE $d_H - s$ (S304)                                                Ⓐ

$d_H = -\boxed{0\ 0\ 1\ 0\ 0\ 0\ 1\ 1} = -67$ $s = \boxed{0\ 0\ 1\ 1\ 0\ 1} = 13$ $d_H - s = -\boxed{0\ 0\ 1\ |\ 0\ 1\ 0\ 0\ 0} = -80$ BELONG TO R2 →s[0] = -s (S308), t[0] = 0 (S309),
    CARRY CORRECTION = 0

$d_H = -\boxed{0\ 0\ 1\ 0\ 0\ 0\ 1\ 1} = -67$ $s[0] = -\boxed{0\ 0\ 1\ 1\ 0\ 1} = -13$ $t[0] = \boxed{0\ 0\ 0\ 0\ 0\ 0\ 0\ 0} = 0$ $d_H - s[0] + t[0] = -\boxed{0\ 0\ 0\ |\ 1\ 1\ 0\ 1\ 1\ 0} = -67 + 13 = -54$

= 0 - 54 (S315)

w[0] = 0

UPDATE $d_H$ (S319)   $d_H = -\boxed{1\ 1\ 0\ 1\ 1\ 0} = -54$

END OF i LOOP (S321)

CORRECTION VALUE c = $d_H$ (S322)

$c = -\boxed{1\ 1\ 0\ 1\ 1\ 0} = -54$

FINAL RESULT :
w[2]=3, s[2]=13, w[1]= -3, s[1] = -13, w[0] = 0, s[0] = -13, c = -54

F I G.  1 2 B $d$ = |1|0|1|1|0|0|1|0|0|1|0|1|0|1|0| = 22826

$e$ = |0|1|0|1|1|0|0|1|0|0|1|0|1|0|1| = 11413   $s$ = |0|0|1|1|0|1| = 13

$w[2] || s[2]$ = |0|1|1|0|0|1|1|0|1| = 205

$w[1] || s[1]$ = −|0|1|1|0|0|1|1|0|1| = −205

$w[0] || s[0]$ = −|0|0|0|0|0|1|1|0|1| = −13

$c$ = −|1|1|0|1|1|0| = −54

104

| INDEX | VALUE |
|---|---|
| −2 | $(-2 \times 64 + s)A = -115A$ |
| −1 | $(-1 \times 64 + s)A = -51A$ |
| 0 | $(0 \times 64 + s)A = 13A$ |
| 1 | $(1 \times 64 + s)A = 77A$ |
| 2 | $(2 \times 64 + s)A = 141A$ |
| 3 | $(3 \times 64 + s)A = 205A$ |
| 4 | $(4 \times 64 + s)A = 269A$ |
| 5 | $(5 \times 64 + s)A = 333A$ |

F I G. 1 3

| 107 | |
|---|---|
| INDEX | VALUE |
| 0 | $(0 \times 2^b + s)A$ |
| 1 | $(1 \times 2^b + s)A$ |
| 2 | $(2 \times 2^b + s)A$ |
| 3 | $(3 \times 2^b + s)A$ |
| 4 | $(4 \times 2^b + s)A$ |
| 5 | $(5 \times 2^b + s)A$ |
| 6 | $(6 \times 2^b + s)A$ |
| 7 | $(7 \times 2^b + s)A$ |

| 105 | |
|---|---|
| INDEX | VALUE |
| −2 | $(-2 \times 2^b + s)A$ |
| −1 | $(-1 \times 2^b + s)A$ |
| 0 | $(0 \times 2^b + s)A$ |
| 1 | $(1 \times 2^b + s)A$ |
| 2 | $(2 \times 2^b + s)A$ |
| 3 | $(3 \times 2^b + s)A$ |
| 4 | $(4 \times 2^b + s)A$ |
| 5 | $(5 \times 2^b + s)A$ |

| 106 | |
|---|---|
| INDEX | VALUE |
| 0 | 0A |
| 1 | 1A |
| 2 | 2A |
| 3 | 3A |
| 4 | 4A |

FIG. 14

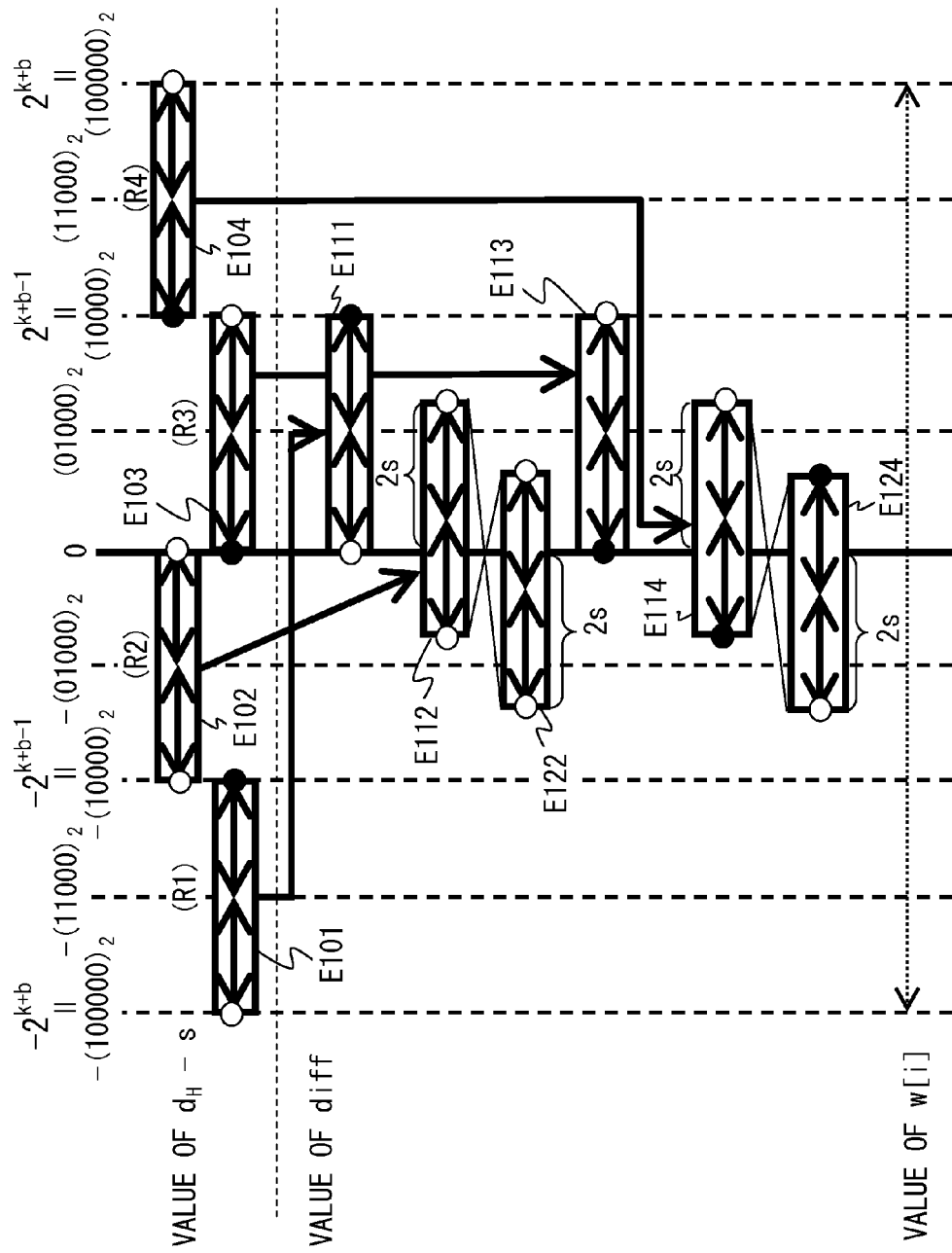
F I G. 15

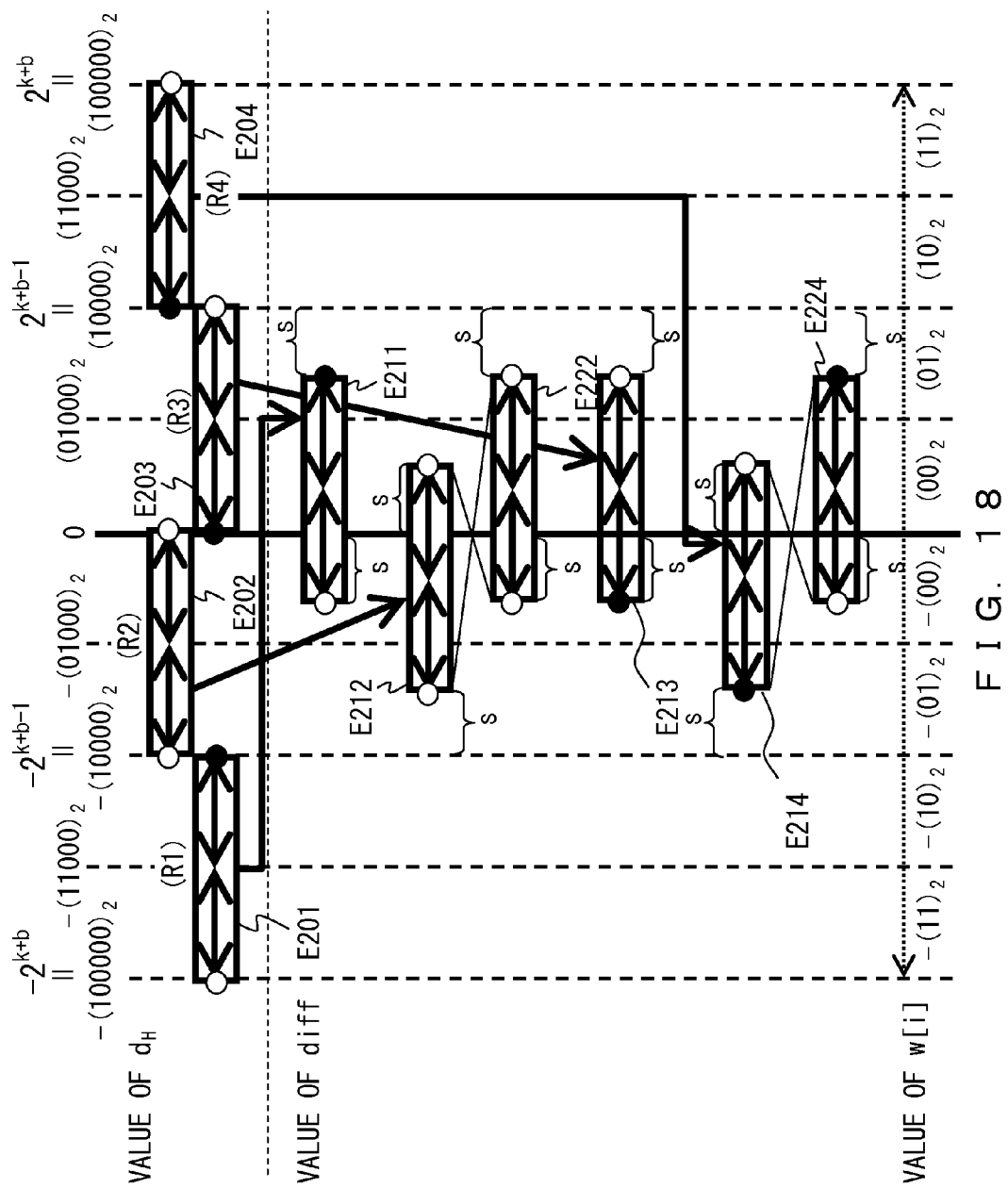
F I G. 18 i=0
JUDGE $d_H$ VALUE (S404)

$$d_H = \boxed{1\ 1\ 1\ |\ 0\ 1\ 1\ 1\ 0\ 0} = 476$$

BELONG TO R4 → s[1] = -s (S412), t[0] = $-2^9$ (S413),
CARRY CORRECTION = +1 (S414)

$$d_H = \boxed{1\ 1\ 1\ 0\ 1\ 1\ 1\ 0\ 0} = 476$$

$$s[0] = -\boxed{0\ 1\ 0\ 0\ 1\ 0} = -18$$

$$t[0] = -\boxed{1\ 0\ 0\ 0\ 0\ 0\ 0\ 0\ 0} = -512$$

$$d_H - s[0] + t[0] = -\boxed{0\ 0\ 0\ |\ 0\ 1\ 0\ 0\ 1\ 0} = 476 + 18 - 512 = -18$$
(S415)

w[0] = 0

UPDATE $d_H$ (S419)   $d_H = -\boxed{0\ 1\ 0\ 0\ 1\ 0} = -18$

END OF i LOOP (S421)

CORRECTION VALUE c = $d_H$ (S422)

$$c = -\boxed{0\ 1\ 0\ 0\ 1\ 0} = -18$$

FINAL RESULT :
  w[2]=2, s[2]=18, w[1]= 3, s[1] = 18, w[0] = 0, s[0] = -18, c = -18

F I G.  2 0 B d = `1010101110 1 1001` = 21977 e = `0101010111011 1 00` = 10988   s = `010010` = 18 w[2]||s[2] = `0100 1 0010` = 146 w[1]||s[1] = `0110 1 0010` = 210 w[0]||s[0] = −`0000 1 0010` = −18 c = −`010010` = −18

108

| INDEX | VALUE |
|---|---|
| −1 | (−1×64+s)A = −46A |
| 0 | (0×64+s)A = 18A |
| 1 | (1×64+s)A = 82A |
| 2 | (2×64+s)A = 146A |
| 3 | (3×64+s)A = 210A |
| 4 | (4×64+s)A = 274A |
| 5 | (5×64+s)A = 338A |

F I G. 2 1

107

| INDEX | VALUE |
|---|---|
| 0 | $(0 \times 2^b + s)A$ |
| 1 | $(1 \times 2^b + s)A$ |
| 2 | $(2 \times 2^b + s)A$ |
| 3 | $(3 \times 2^b + s)A$ |
| 4 | $(4 \times 2^b + s)A$ |
| 5 | $(5 \times 2^b + s)A$ |
| 6 | $(6 \times 2^b + s)A$ |
| 7 | $(7 \times 2^b + s)A$ |

109

| INDEX | VALUE |
|---|---|
| −1 | $(-1 \times 2^b + s)A$ |
| 0 | $(0 \times 2^b + s)A$ |
| 1 | $(1 \times 2^b + s)A$ |
| 2 | $(2 \times 2^b + s)A$ |
| 3 | $(3 \times 2^b + s)A$ |
| 4 | $(4 \times 2^b + s)A$ |
| 5 | $(5 \times 2^b + s)A$ |

106

| INDEX | VALUE |
|---|---|
| 0 | 0A |
| 1 | 1A |
| 2 | 2A |
| 3 | 3A |
| 4 | 4A |

FIG. 22 i=0
JUDGE $d_H$ VALUE (S504)

$d_H = -\boxed{0\ 0\ 0\ \vdots\ 0\ 1\ 0\ 0\ 1\ 0}$ ⓒ

BELONG TO R2 → s[0] = -s (S508), t[0] = 0 (S509),
CARRY CORRECTION = 0

$d_H = -\boxed{0\ 0\ 0\ 0\ 1\ 0\ 0\ 1\ 0} = -18$ $s[0] = -\boxed{1\ 0\ 0\ 1\ 1\ 0} = -38$ $t[0] = -\boxed{0\ 0\ 0\ 0\ 0\ 0\ 0\ 0\ 0} = 0$ $d_H - s[0]+t[0] = \boxed{0\ 0\ 0\ \vdots\ 0\ 1\ 0\ 1\ 0\ 0} = -18+38 = 20$ (S515)

w[0] = 0

UPDATE $d_H$ (S519)  $d_H = \boxed{0\ 1\ 0\ 1\ 0\ 0} = 20$

END OF i LOOP (S521)

CORRECTION VALUE c = $d_H$ (S522)

$c = -\boxed{0\ 1\ 0\ 1\ 0\ 0} = 20$

FINAL RESULT :
w[2]=3, s[2]=38, w[1]= -3, s[1] = -38, w[0] = 0, s[0] = -38, c = 20

F I G. 2 5 B d = 1100100011111100 = 25724 e = 0110010001111110 = 12862    s = 100110 = 38 w[2]||s[2] = 01110 0110 = 230 w[1]||s[1] = −01110 0110 = −230 w[0]||s[0] = −00010 0110 = −38 c = 010100 = 20

110

| INDEX | VALUE |
|---|---|
| −1 | (−1×64+s)A = −26A |
| 0 | (0×64+s)A = 38A |
| 1 | (1×64+s)A = 102A |
| 2 | (2×64+s)A = 166A |
| 3 | (3×64+s)A = 230A |
| 4 | (4×64+s)A = 294A |

F I G. 2 6

107

| INDEX | VALUE |
|---|---|
| 0 | $(0 \times 2^b + s)A$ |
| 1 | $(1 \times 2^b + s)A$ |
| 2 | $(2 \times 2^b + s)A$ |
| 3 | $(3 \times 2^b + s)A$ |
| 4 | $(4 \times 2^b + s)A$ |
| 5 | $(5 \times 2^b + s)A$ |
| 6 | $(6 \times 2^b + s)A$ |
| 7 | $(7 \times 2^b + s)A$ |

111

| INDEX | VALUE |
|---|---|
| −1 | $(-1 \times 2^b + s)A$ |
| 0 | $(0 \times 2^b + s)A$ |
| 1 | $(1 \times 2^b + s)A$ |
| 2 | $(2 \times 2^b + s)A$ |
| 3 | $(3 \times 2^b + s)A$ |
| 4 | $(4 \times 2^b + s)A$ |

106

| INDEX | VALUE |
|---|---|
| 0 | 0A |
| 1 | 1A |
| 2 | 2A |
| 3 | 3A |
| 4 | 4A |

F I G. 2 7

| | | AGAINST PA ATTACK | NUMBER OF ENTRIES IN TABLE | | | | INDEX RANGE |
|---|---|---|---|---|---|---|---|
| | | | k=2 | k=3 | k=4 | ANY k | |
| FIRST EMBODIMENT | $s \geq 0$ | SECURE | 6 | 8 | 12 | $2^{k-1}+4$ | $-2 \leq h \leq 2^{k-1}+1$ |
| | $s \leq 0$ | | | | | | $-1 \leq h \leq 2^{k-1}+2$ |
| SECOND EMBODIMENT | $s \geq 0$ | SECURE | 5 | 7 | 11 | $2^{k-1}+3$ | $-1 \leq h \leq 2^{k-1}+1$ |
| | $s \leq 0$ | | | | | | |
| THIRD EMBODIMENT | $s > 0$ | SECURE | 4 | 6 | 10 | $2^{k-1}+2$ | $-1 \leq h \leq 2^{k-1}$ |
| | $s < 0$ | | 5 | 7 | 11 | $2^{k-1}+3$ | $-1 \leq h \leq 2^{k-1}+1$ |
| RANDOMIZED WINDOW METHOD (THIRD COMPARATIVE EXAMPLE) | | SECURE | 4 | 8 | 16 | $2^k$ | $0 \leq h \leq 2^k-1$ |
| SIGNED WINDOW METHOD (FOURTH COMPARATIVE EXAMPLE) | | VULNERABLE | 3 | 5 | 9 | $2^{k-1}+1$ | $0 \leq h \leq 2^{k-1}$ |

F I G. 3 2

CRYPTOGRAPHIC PROCESSING DEVICE AND CRYPTOGRAPHIC PROCESSING METHOD

CROSS-REFERENCE TO RELATED APPLICATION

This application is a continuation of International Application PCT/JP2010/002363 filed on Mar. 31, 2010 and designated the U.S., the entire contents of which are incorporated herein by reference.

FIELD

The present invention relates to an elliptic curve cryptography.

BACKGROUND

In recent years, the importance of information security technology has been increasing. As one of the infrastructure technologies of information security, public-key cryptography has been actively studied.

There are several kinds of public-key cryptographies, and among them, the Rivest-Shamir-Adleman (RSA) algorithm, which utilizes modular exponentiation, elliptic curve cryptography (ECC), which utilizes scalar multiplication of a point on an elliptic curve, and the like are known.

In utilizing the public-key cryptographies, it is important to keep the private key secret to maintain security. In recent years, however, some attacking methods for breaking the private key have become known. Accordingly, in order to make the equipment which executes processing with the public-key cryptography tamper-proof, some countermeasures against at least the known attacking methods are required to be implemented in the equipment.

As one example of side-channel attacks, an attacking method called a power analysis (PA) attack is known. There are two types of PA; simple power analysis (SPA) and differential power analysis (DPA).

Therefore, equipment which executes processing with the public-key cryptography is required to have security against an SPA attack and security against a DPA attack. For example, one of the countermeasures against an SPA attack includes a method called a "window method" and one of the countermeasures against a DPA attack includes a method of randomizing data. Further, a cryptographic device for realizing effective tamper-proof modular exponentiation and scalar multiplication of a point has been proposed; with respect to an encryption method which executes modular exponentiation, a cryptographic processor has also been proposed that makes the estimation of the private key with a PA attack difficult and that is highly tamper-proof.

Some documents, such as Japanese Laid-open Patent Publication No. 2003-233307 and International Publication Pamphlet No. WO 2009/122461 are known.

SUMMARY

The cryptographic processing device according to one aspect of the present invention includes a private key storage unit, a random number generation unit, and a processing unit. The private key storage unit stores a private key d for elliptic curve cryptography. The random number generation unit generates a signed or unsigned b-bit random value s.

The processing unit reads the private key d from the private key storage unit, and with respect to a positive integer m where a relation u=mk+b holds true for a length u of a bit string D which is the private key d or a bit string obtained by modifying the private key d in such a way that a value of a most significant bit is 0, and a window size k, determines, by using the bit string D and the random value s, a window value w[i] which is a signed k-bit value corresponding to each i where $0 \leq i \leq (m-1)$, a random value s[i] which is a signed b-bit value corresponding to each i where $0 \leq i \leq (m-1)$, and a correction value g, under a constraint condition in which $$D = g + \sum_{i=0}^{m-1} (2^{ki+b} w[i] + 2^{ki} s[i])$$

holds true, while determining each random value s[i] to be +s or −s.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF DRAWINGS

FIG. 1 illustrates the attempt to combine a randomized window method and a signed window method.

FIG. 2 explains the reason why the attempt of FIG. 1 fails.

FIG. 7 illustrates a second example of a hardware configuration for the cryptographic processing devices of the first to third embodiments.

FIG. 9 is a flowchart of a process in which the cryptographic processing device of the first to third embodiments obtains a scalar multiple from the private key and a point.

FIG. 12B is one (No. 2) of figures for illustrating the specific example of the window sequence, random number sequence, and correction value determined in the first embodiment.

FIG. 13 illustrates the window sequence, random number sequence, and correction value and also illustrates a table in which the scalar multiple information storage unit holds the randomized table data.

FIG. 14 compares the first embodiment, third comparative example, and the fourth comparative example concerning the number of entries of the table data where the window size is 3.

FIG. 15 schematically explains the range of the values used as an index of the scalar multiple information storage unit in the first embodiment.

FIG. 18 schematically explains the range of the values used as an index of the scalar multiple information storage unit in the second embodiment.

FIG. 20B is one (No. 2) of figures for illustrating the specific example of the window sequence, random number sequence, and correction value determined in the second embodiment.

FIG. 21 illustrates the window sequence, random number sequence, and correction value as well as illustrating a table in which the scalar multiple information storage unit holds the randomized table data.

FIG. 22 compares the second embodiment, third comparative example, and the fourth comparative example in regard to the number of entries in the table data where the window size is 3.

FIG. 25B is one (No. 2) of figures for illustrating the specific example of the window sequence, random number sequence, and correction value determined in the third embodiment.

FIG. 26 illustrates the window sequence, random number sequence, and correction value and also illustrates a table in which the scalar multiple information storage unit holds the randomized table data.

FIG. 27 compares the third embodiment, third comparative example, and the fourth comparative example in regard to the number of entries in the table data where the window size is 3.

FIG. 32 is a table for comparison in the number of entries in the table data.

DESCRIPTION OF EMBODIMENTS

Figure 3:
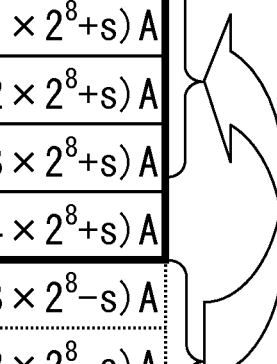
FIG. 3 explains the approach which is common to the first to third embodiments.

In a device which performs scalar multiplication of a point on an elliptic curve, when a window method (or a variety thereof) with a window size of k bits is employed as a countermeasure against an SPA attack, the data which indicates a point on the elliptic curve is stored in the memory for each k-bit index. Therefore, the memory usage is of an exponential order of the window size k, and the larger the window size k, the greater the memory usage.

On the other hand, in recent years, cryptographic technologies have been widely used not only in general-purpose computers such as server computers, personal computers, and the like, but also in the other various devices including, for example, embedded devices. A device which performs scalar multiplication is required to implement countermeasures for both SPA attacks and DPA attacks regardless of the type of the device.

The memory capacity of some types of devices, however, is quite small compared with the memory capacity of general-purpose computers. It is preferable that the processing be performed with a small memory usage in devices in which the memory capacity is small.

Therefore, one object of the embodiments described below is to provide a cryptographic processing device which performs scalar multiplication by maintaining security against both SPA attacks and DPA attacks, while suppressing the memory usage.

As described below in detail, according to the embodiments below, a window operation which uses a window value $w[i]$ realizes a scalar multiplication which is secure against an SPA attack. In addition, with the introduction of a random value $s[i]$, security against a DPA attack is also realized.

Further, in the embodiments, a processing unit appropriately determines each random value $s[i]$ to be +s or −s, where s is a random value, under a certain constraint condition instead of uniformly determining each random value $s[i]$ to be the random value s. By so doing, reduction in the range of the absolute value of the window value $w[i]$ is realized. Therefore, according to the cryptographic processing device of the embodiments described below, the amount of memory smaller than the order of $2^k$ is sufficient for storing pieces of data each indicating a point on the elliptic curve corresponding to each index for the window operation.

Therefore, each cryptographic processing device of each embodiment enables execution of scalar multiplication which maintains security against both SPA attacks and DPA attacks while using a small amount of memory.

Hereinafter, a detailed explanation is given for the present embodiments, referring to the drawings. The order of the explanation is as follows.

The later-mentioned cryptographic processing device according to the first to third embodiments is a device which generates data (specifically, the later-mentioned window sequence $w[i]$, random number sequence $s[i]$, and correction value c) for performing scalar multiplication of the point on the elliptic curve, and performs the scalar multiplication using the generated data. In order to help in understanding of the first to third embodiments, the operation on the elliptic curve is explained first. In addition, explanation is also given for the first to fourth comparative examples in order to help in understanding of the first to third embodiments.

After that, explanation is given for the findings obtained from consideration of the comparative examples by the inventors, and explanation is given for some points common to the processing methods of the first to third embodiments developed by the inventors on the basis of the above-mentioned findings. The configuration of a device common to the first to third embodiments is also explained. Subsequently, explanation is given for the first to third embodiment sequentially and finally, explanation is given for the other embodiments.

Presently, explanation is given for the operation on the elliptic curve. The main elliptic curves used in the ECC are the elliptic curve of formula (1.1) defined over the prime field GF (p) and the elliptic curve of formula (1.2) defined over the binary extension field GF ($2^n$)(n.b., GF is an abbreviation of Galois field and p is a prime).

$$y^2 = x^3 + \alpha x + \beta \pmod{p}, \text{ where } \alpha, \beta, x, y \in GF(p) \quad (1.1)$$

$$y^2 + xy = x^3 + \alpha x^2 + \beta \pmod{F(x)}, \text{ where } \alpha, \beta, x, y \in GF(2^n)$$
and $F(x)$ is an irreducible polynomial over $GF(2^n)$ \quad (1.2)

The point P on the elliptic curve represented by formula (1.1) is represented as P=(x, y) by the set of x and y which satisfies formula (1.1). Similarly, the point P on the elliptic curve represented by formula (1.2) is represented as P=(x, y) by the set of x and y which satisfies formula (1.2). Further, as a special point on the elliptic curve, the point at infinity (or the infinite point) is defined. Hereinafter, the point at infinity is represented as "O" (capital letter "O").

The following discussion described herein applies not only to the elliptic curve of formula (1.1) but also to the elliptic curve of formula (1.2). Therefore, instead of referring to the differentiation between formula (1.1) and formula (1.2), simple representations of "elliptic curve", "point P", "point (x, y)", "x-coordinate", "y-coordinate", and "elliptic curve parameters $\alpha$ and $\beta$" may hereinafter be used.

It is known that when a certain operation (hereinafter called "addition" and represented as "+") is defined with respect to the points on the elliptic curve, a set of points on the elliptic curve form a commutative group. The point at infinity O corresponds to the zero element (that is, the identity element in the addition). In addition, with respect to any point P on the elliptic curve (the point P may be the point at infinity O), formula (1.3) holds true.

$$P + O = O + P = P \quad (1.3)$$

Hereinafter, the inverse element of the point P is represented as −P. It is possible to calculate the x-coordinate and y-coordinate of the point −P by addition or subtraction in the field GF(p) or GF($2^n$), over which the elliptic curve is defined. Specifically, the point −P, which is the inverse element of the point P=(x, y), is represented by formula (1.4) when the elliptic curve is defined by formula (1.1), while the point −P is represented by formula (1.5) when the elliptic curve is defined by formula (1.2).

$$-P = (x, -y) \quad (1.4)$$

$$-P = (x, x+y) \quad (1.5)$$

As understood from formulae (1.4) and (1.5), the computational complexity for obtaining the point −P from the point P is small. In the signed window method or the later-mentioned first to third embodiments, computational ease of the inverse element is utilized for a reduction in memory usage. The computational ease of the inverse element as mentioned above is contrasted to the computational difficulty, which is utilized in the RSA cryptography, of the division in the prime field.

In addition, the x-coordinate and y-coordinate of the point $P_3$ represented as $P_3 = P_1 + P_2$ with respect to certain points $P_1$ and $P_2$ can also be calculated with the x-coordinates and y-coordinates of the points $P_1$ and $P_2$ by carrying out addition, subtraction, multiplication, and division in the field GF(p) or GF($2^n$). Here, when $P_2 = P_1$, $P_3 = P_1 + P_1$ is also represented as $2P_1$, and the operation of obtaining the point $P_3 = 2P_1$ from the point $P_1$ is called doubling. The doubling is also realized by carrying out addition, subtraction, multiplication, and division in the field GF(p) or GF($2^n$).

Further, the subtraction is defined as the addition of the inverse element as formula (1.6).

$$P_1 - P_2 = P_1 + (-P_2) \quad (1.6)$$

Moreover, with respect to the point on the elliptic curve, the operation called scalar multiplication is defined. The scalar multiplication is realized by combinations of addition, subtraction, and doubling. Specifically, with respect to the scalar value d and the point P on the elliptic curve, the point Q represented as Q=dP is defined as the following formula, (1.7).

$$Q = dP \quad (1.7)$$
$$= \underbrace{P + P + \ldots + P}_{d}$$
$$= O + \underbrace{P + P + \ldots + P}_{d}$$

With respect to any integers $d_1$ and $d_2$, and any point P on the elliptic curve, the following formulae, (1.8) and (1.9), hold true.

$$d_1 P + d_2 P = (d_1 + d_2) P \quad (1.8)$$

$$d_1(d_2 P) + d_2(d_1 P) = (d_1 d_2) P \quad (1.9)$$

In the ECC, the scalar value is used as a private key and is kept secret. Conversely, a certain point G, called a "base point" on the elliptic curve, and parameters $\alpha$ and $\beta$ of the elliptic curve are pieces of information to be made public. Corresponding to the private key d, the public key is given by a point V which satisfies V=dG.

Even if the points G and V are known to an attacker, it is very difficult to compute the private key d from the points G and V since a huge computational complexity is required. This computational difficulty is known as the computational difficulty of discrete logarithm problem.

Meanwhile, the ECC is available for key agreement according to the Diffie-Hellman (DH) algorithm, digital signature algorithm (DSA), and the like. Regardless of the purpose of using the ECC, the processing using the ECC includes the scalar multiplication. Explanation of this, taking DH key agreement as an example, is as follows.

As an example, let $d_A$ be the private key of the first device and $d_B$ be the private key of the second device. Then, the public key $Q_A$ of the first device is computed as $Q_A = d_A G$ from the base point G, and the public key $Q_B$ of the second device is computed as $Q_B = d_B G$ from the base point G. In this way, the scalar multiplication is performed for generating the public key.

Further, the first device transmits its public key $Q_A$ to the second device, and the second device transmits its public key $Q_B$ to the first device. Then, the first device computes $d_A Q_B$ by the scalar multiplication, and likewise, the second device computes $d_B Q_A$ by the scalar multiplication as well. As a result, as indicated in formula (1.10), the first device and the second device are enabled to share the same key K.

$$K = d_A Q_B = d_A(d_B G) = d_B(d_A G) = d_B Q_A \quad (1.10)$$

When the ECC is used for purposes other than the DH key agreement as exemplified above, the scalar multiplication is also performed.

Incidentally, a PA attack is a non-destructive attack which tries to break the scalar value d used as a private key by measuring the power consumption of the device that is executing the scalar multiplication. Therefore, regardless of the purposes for which the ECC is used, as a countermeasure for preventing leakage of the private key d, it is effective for the waveform of the power consumption of the device executing the scalar multiplication to not indicate the characteristics of the private key d.

Unless a countermeasure is taken against a PA attack, there is a risk that the private key d might be broken from the characteristics of the waveform of the power consumption of the device during execution of the scalar multiplication. Specifically, an SPA attack is an attack method which tries to break the private key d from the waveform of the power consumption during processing of a certain scalar multiplication focusing on the operational procedure for efficiently performing the scalar multiplication. In addition, the DPA attack is an attack method which tries to break the private key d focusing on the difference in the waveform of the power consumption in the scalar multiplication with respect to the plurality of different points.

The later-mentioned cryptographic processing devices of the first to third embodiments are designed so as to be secure against both SPA attacks and DPA attacks as well as to suppress memory usage. Therefore, to help in understanding of the advantages of the first to third embodiments, explanation is given for some comparative examples as follows.

First, as the first comparative example, explanation is given for a "binary method". A binary method is vulnerable to both SPA attacks and DPA attacks.

For example, when the private key d is 160 bits long, there is a possibility that d may be a very large number (for example, a number close to $2^{160}$). Therefore, executing the scalar multiplication exactly as defined by formula (1.7) is unrealistic since it involves a great number of additions of points. The binary method is a method for suppressing the order of the computational complexity of the scalar multiplication to the order of the number of bits of the private key d.

Here, for convenience of explanation, let u be the bit length of the private key d. In addition, the i-th bit of the private key d is expressed as d[i] (0≤i≤u−1). d[0] is the least significant bit (LSB) and d[u−1] is the most significant bit (MSB). From formula (2.1), formula (2.2) is obtained.

$$d = \sum_{i=0}^{u-1} 2^i d[i] \quad (2.1)$$

$$dA = 2^{u-1} d[u-1]A + \ldots + 2^1 d[1]A + 2^0 d[0]A \quad (2.2)$$

The binary method is an operational procedure which utilizes formula (2.2). For example, specifically explaining a case where the private key d is $(1100101)_2$, the binary method is a method of realizing the scalar multiplication in accordance with formula (2.3).

$$dA = 2(2(2(2(2(2(2O+A))+A)))+A))+A = 2^6 A + 2^5 A + 2^2 A + A \quad (2.3)$$

In other words, letting a variable V represent the result of the scalar multiplication, the binary method first initializes the variable V to be the point at infinity, as in formula (2.4).

$$V = O \quad (2.4)$$

Subsequently, processes of "obtaining 2V by the doubling and after that, when d[i]=1, adding the point A and having the obtained result substituted into variable V" are repeated from the MSB to the LSB sequentially. Specifically, since d[6]=1, as in formula (2.5), the doubling and the addition are performed corresponding to the 6th bit.

$$V = 2O + A \quad (2.5)$$

Then, since d[5]=1, as in formula (2.6), the doubling and the addition are performed corresponding to the 5th bit.

$$V = 2(2O+A) + A \quad (2.6)$$

Further, since d[4]=0, as in formula (2.7), only the doubling is performed and no addition is performed with respect to the 4th bit.

$$V = 2(2(2O+A)+A) \quad (2.7)$$

Similarly, since d[3]=0, as in formula (2.8), only the doubling is performed and no addition is performed with respect to the 3rd bit.

$$V = 2(2(2(2O+A)+A)) \quad (2.8)$$

With respect to the next bit, the 2nd bit, since d[2]=1, the doubling and the addition are performed as in formula (2.9).

$$V = 2(2(2(2(2O+A)+A)))+A \quad (2.9)$$

With respect to the next bit, the 1st bit, since d[1]=0, as in formula (2.10), only the doubling is performed and no addition is performed.

$$V = 2(2(2(2(2(2+A)+A)))+A) \quad (2.10)$$

With respect to the final bit, the 0th bit, since d[0]=1, as in formula (2.11), the doubling and the addition are performed.

$$V = 2(2(2(2(2(2(2O+A)+A)))+A))+A \quad (2.11)$$

The coefficient of the point A which is thus added corresponding to the i-th bit where d[i]=1, as understood from formula (2.11), is $2^i$. Therefore, by the procedure illustrated with the above-mentioned formulae (2.4) to (2.11), V=dA is actually obtained in accordance with formula (2.3).

As is clear from the above-mentioned example, according to the binary method, the number of doublings is equal to the bit length u of the private key d, and the number of additions is equal to the Hamming weight of the private key d. Therefore, the computational complexity of the scalar multiplication according to the binary method is suppressed to the order of u instead of the order of $2^u$.

When the waveform of the power consumption in the doubling and the waveform of the power consumption in the addition are distinguishable, the binary method is vulnerable to an SPA attack.

In other words, from the operational procedure of the binary method, an attacker is able to analyze "if the waveform of the power consumption in the addition appears following the waveform of the power consumption in the doubling, the bit value d[i] is 1". Similarly, an attacker is able to analyze "if the waveform of the power consumption in the addition does not appear following the waveform of the power consumption in the doubling, the bit value d[i] is 0".

The binary method is also vulnerable to a DPA attack. To help understand the explanation of security against a DPA attack, explanation is given as follows for an outline of a DPA attack.

That is, an attacker who conducts a DPA attack breaks the private key d by observing each waveform of the power consumption during the scalar multiplication which is performed, using the private key d, on each of the L (where L≥2) known points $A_1, A_2, \ldots, A_L$ on the elliptic curve. Explanation is given for the breaking of the private key d by a DPA attack, and in the explanation, the power consumption observed corresponding to the point $A_j$ is represented as $\text{Pow}_j(t)$. Note that t represents time information.

For convenience of explanation, a concatenation of the bit strings, each of whose length is not less than 1 bit, is defined to be represented by the symbol "||". Then, the private key d is represented by formula (3.1).

$$d=d[u-1]\|d[u-2]\|\ldots\|d[1]\|d[0] \tag{3.1}$$

The binary method exemplified in formulae (2.3) to (2.11) is a method which calculates d[6]A first according to formula (2.5) to substitute it for variable V, and then successively updates the value of variable V while increasing the number of bits. That is, (d[6]||d[5])A is calculated by formula (2.6), (d[6]||d[5]||d[4])A is calculated by formula (2.7), and (d[6]||d[5]||d[4]||d[3])A is calculated by formula (2.8). Then, (d[6]||d[5]||d[4]||d[3]||d[2])A is calculated by formula (2.9), and (d[6]||d[5]||d[4]||d[3]||d[2]||d[1])A is calculated by formula (2.10). Finally, dA is obtained by formula (2.11).

Generally, hardware consumes power in accordance with a Hamming weight of a data value to be loaded or stored. Therefore, an attacker breaks the bit value d[i] by performing the following processing sequentially from the MSB (i.e., (u−1)-th bit) to the LSB (i.e., 0-th bit).

An attacker guesses at the bit value d[i]. Then the attacker calculates the point $B_j$ represented by formula (3.2) for each j where 1≤j≤L using the already broken more significant bit values d[u−1], ..., d[i+1] and the guessed bit value d[i].

$$B_j(d[u-1]\|\ldots\|d[i])A_j \tag{3.2}$$

Further, the attacker classifies the power consumption $\text{Pow}_j(t)$ into either of two sets $S_0$ or $S_1$ in accordance with the bit value of a particular position within the data which represents the point $B_j$. Hereinafter, let $S_0$ be the set in which the bit value of the above-mentioned particular position is 0, and let $S_1$ be the set in which the bit value of the above-mentioned particular position is 1. The attacker calculates difference waveform Diff(t), which is obtained by subtracting the average of instances of the power consumption $\text{Pow}_j(t)$ belonging to the set $S_0$ from the average of instances of the power consumption $\text{Pow}_j(t)$ belonging to the set $S_1$.

If a spike appears in the difference waveform Diff(t), the attacker judges that his/her guessed bit value d[i] is correct. Conversely, if the difference waveform Diff(t) is flat, the attacker judges that his/her guessed value d[i] is wrong. As a result, the attacker is capable of breaking the bit value d[i].

Thus, in a DPA attack, an attacker breaks the bit values d[i] sequentially from the MSB, utilizing the characteristics of the binary method which calculates (d[u−1]||...||d[i])A, while increasing the number of bits sequentially from the MSB.

As mentioned above, the binary method is vulnerable to both an SPA attack and a DPA attack. In contrast to this, "a window method" exemplified next as a second comparative example is secure against an SPA attack.

In the binary method, as illustrated in formulae (2.4) to (2.11), the processing of "doubling and addition" or "doubling" is performed for every bit of the private key d in accordance with its bit value. In contrast, in the window method, the processing of "k doublings and one addition" is always performed for every k bits of the private key d regardless of their bit values. Therefore, the scalar multiplication by the window method is secure against an SPA attack even if the waveform of the power consumption in the doubling and the waveform of the power consumption in the addition are different.

For simplification of the explanation, hereinafter, assume that the number of bits, u, of the private key d is divisible by the window size k. That is, m is an integer where m=u/k. Further, for each i where 0≤i≤(m−1), the i-th window value w[i] is defined by formula (4.1).

$$w[i]=d[ik+k-1]\|\ldots\|d[ik] \tag{4.1}$$

The meaning of "[i]" in the notation "w[i]", where it represents the i-th window value, is different from the meaning of "[i]" in the notation "d[i]", where it represents the i-th bit of the private key d. However, since the meaning of "[i]" is clear from the context, hereinafter the notation as "w[i]" is used as appropriate.

For example, when the window size k is 3 bits and the private key d is $(011111101)_2$, the window values are represented by the following formulae (4.2) to (4.4). Hereinafter, a sequence of window values such as w[m−1], ..., w[1], w[0] is also called a "window sequence".

$$w[2]=(011)_2=3 \tag{4.2}$$

$$w[1]=(111)_2=7 \tag{4.3}$$

$$w[0]=(101)_2=5 \tag{4.4}$$

In addition, in the window method, for each h where $0 \le h \le 2^k-1$, a scalar multiple hA is calculated beforehand using coordinates of the point A given as a target of the scalar multiplication. The calculated scalar multiple hA is stored in a memory by being associated with an index h.

Hereinafter, the scalar multiple hA associated with the index h is represented as tab[h] and the tab[h] (=hA) is also called "table data". For more detail, the table data tab[h] is represented by the set of x-coordinate and y-coordinate of the scalar multiple hA.

In the window method, the calculation of the point dA is performed by using the table data as in formula (4.5).

$$dA=2^3(2^3(2^3(O)+\text{tab}[(011)_2])+\text{tab}[(111)_2])+\text{tab}[(101)_2] \tag{4.5}$$

To be more specific, letting variable V represent the result of the scalar multiplication of the scalar value d and the point A, in the window method, as in formula (4.6), variable V is initialized by the point at infinity O first.

$$V=O \tag{4.6}$$

Then, sequentially from i=m−1 to i=0, the processing of "performing k (i.e., 3) doublings, adding tab[w[i]], and substituting the obtained result for variable V" is performed. That is, first, three doublings and one addition are performed as in formula (4.7) corresponding to the window value w[2].

$$V=2^3(O)+\text{tab}[(011)_2] \tag{4.7}$$

Subsequently, three doublings and one addition are performed as in formula (4.8) corresponding to the window value w[1].

$$V=2^3(2^3(O)+\text{tab}[(011)_2])+\text{tab}[(111)_2] \tag{4.8}$$

And finally, three doublings and one addition are performed as in formula (4.9) corresponding to the window value w[0].

$$V=2^3(2^3(2^3(O)+\text{tab}[(011)_2])+\text{tab}[(111)_2])+\text{tab}[(101)_2] \quad (4.9)$$

As mentioned above, according to the window method, regardless of what values the bit values included in the private key d have, processes of the same type are performed. Therefore, the window method is secure against an SPA attack.

Next, as a third comparative example, explanation is given for a "randomized window method" in which the window method is improved so as to be secure not only against an SPA attack but also against a DPA attack. In the randomized window method, pieces of table data are randomized by the b-bit random value s. By randomization, correlation of the data content and the power consumption is concealed. That is, randomization prevents the difference waveform Diff(t) from changing in response to whether an attacker guesses the bit value right or wrong. Accordingly, randomization realizes security against a DPA attack.

The number of bits, b, of the random value s is preferably, for example, not greater than 30. Also assume that formula (5.1) holds true, where m is an integer and u is the number of bits of the private key d.

$$u=b+km \quad (5.1)$$

For example, when the private key d is defined to be $378=(101111010)_2$, u=9. In addition, let the window size k be 2, b be 3, and the random value s be $3=(011)_2$. In this case, from formula (5.1), m=3. In the randomized window method, the k-bit window value w[i] is calculated for each i where $0\leq i\leq (m-1)$ and further, the b-bit correction value c is calculated so that formula (5.2) holds true.

$$d = c + \sum_{i=0}^{m-1} 2^{ki}(w[i]\|s) \quad (5.2)$$

Here, since the random value is b bits long, formula (5.3) is obtained from formula (5.2).

$$d = c + \sum_{i=0}^{m-1} (2^{ki+b}w[i] + 2^{ki}s) \quad (5.3)$$

Then, formula (5.4) is obtained from formula (5.3) by transposition.

$$d - \sum_{i=0}^{m-1} 2^{ki}s = c + \sum_{i=0}^{m-1} 2^{ki+b}w[i] \quad (5.4)$$

The left-hand side of formula (5.4) represents the value calculated from the private key d and the random value s. The right-hand side of formula (5.4) represents that the window sequence is obtained by splitting the value calculated by the left-hand side of formula (5.4) into k-bit parts from the most significant bit and that the least significant b bits of the value calculated by the left-hand side of formula (5.4) constitute the correction value c.

For example, in the case where $d=378=(101111010)_2$ and the random value s is $3=(011)_2$ as mentioned above, the calculation result of the left-hand side of formula (5.4) is as in formula (5.5).

$$378 - (2^0 \times 3 + 2^2 \times 3 + 2^4 \times 3) = 378 - (3 + 12 + 48) \quad (5.5)$$
$$= 315$$
$$= (100111011)_2$$

Accordingly, by splitting the value $(100111011)_2$ obtained by formula (5.5) into 2-bit parts, the window sequence constituted by w[2], w[1], and w[0] is obtained. In addition, the correction value c is obtained from the least significant b (=3) bits of this value $(100111011)_2$. Specifically, they are as illustrated in formulae (5.6) to (5.9).

$$w[2]=(10)_2=2 \quad (5.6)$$

$$w[1]=(01)_2=1 \quad (5.7)$$

$$w[0]=(11)_2=3 \quad (5.8)$$

$$c=(011)_2=3 \quad (5.9)$$

In the randomized window method, the window values w[i] (where $0\leq i\leq m-1$) and the correction value c are calculated as mentioned above. Further, in the randomized window method, for each h where $0\leq h\leq 2^k-1$, the table data of formula (5.10) is calculated beforehand by using the coordinates of the point A, which is a target of scalar multiplication, and then stored in the memory in association with the index h.

$$\text{tab}[h]=(2^b h+s)A \quad (5.10)$$

For example, in the case where b=3 and $s=(011)_2=3$ as mentioned above, the pieces of data of the following formulae, (5.11) to (5.14), are stored in the memory as the pieces of table data.

$$\text{tab}[(00)_2]=\text{tab}[0]=(2^3\times 0+3)A=3A \quad (5.11)$$

$$\text{tab}[(01)_2]=\text{tab}[1]=(2^3\times 1+3)A=11A \quad (5.12)$$

$$\text{tab}[(10)_2]=\text{tab}[2]=(2^3\times 2+3)A=19A \quad (5.13)$$

$$\text{tab}[(11)_2]=\text{tab}[3]=(2^3\times 3+3)A=27A \quad (5.14)$$

Then, the calculation of the point dA is performed by the following formula (5.15).

$$dA = 2^2(2^2(2^2(O) + \text{tab}[w[2]]) + \text{tab}[w[1]]) + \text{tab}[w[0]] + cA \quad (5.15)$$
$$= 4(4(4(O) + 19A) + 11A) + 27A + 3A$$
$$= 4(4(O) + 19A) + 11A) + 27A + 3A$$
$$= 4(4(19A) + 11A) + 27A + 3A$$
$$= 4(76A + 11A) + 27A + 3A$$
$$= 4(87A) + 27A + 3A$$
$$= 348A + 27A + 3A$$
$$= 378A$$

Since the correction value c of formula (5.9) is calculated by formula (5.5) so as to satisfy formula (5.2), dA (i.e., 378A in this example) is actually obtained by the calculation of formula (5.15).

Further, formula (5.15) illustrates that, regardless of the bit values of the private key d, the processing of "performing k doublings (in the above-mentioned example, k=2) and one addition" is repeated m times (in the above-mentioned example, m=3), and then one scalar multiplication using the correction value c and the addition of the point cA are performed. Therefore, the randomized window method is, similarly to the window method, secure against an SPA attack. In addition, since the table data are randomized by the random value s, the randomized window method is also secure against a DPA attack.

Either in the window method or in the randomized window method, $2^k$ entries are created in the table in accordance with the widow size k. On the other hand, in some devices such as embedded devices, and the like, it is desirable to reduce the memory usage for performing various processing since the memory capacity is low.

One example of the embedded devices is a smart card. Another example of the embedded devices is a component to be authenticated by an electronic device such as a printer. For example, for excluding counterfeits, a Large Scale Integration (LSI) called an "authentication chip" may be incorporated in an accessory part such as a secondary battery or a printer cartridge. The authentication of the printer cartridge by the printer may be performed in order to, for example, invalidate attempts at printing using printer cartridges other than genuine products. Needless to say, there are various types of other embedded devices.

For example, devices such as smart cards and printer cartridges with authentication functions are, in particular, equipped with a memory of small capacity. Therefore, concerning scalar multiplication as well, a processing algorithm which reduces the memory usage is preferable.

Then, subsequently, as a fourth comparative example, explanation is given for a "signed window method". Similarly to the window method, the signed window method is secure against an SPA attack. The signed window method is a method with less memory usage compared with the window method.

Specifically, when letting the window size be k, while the number of entries in the table data is $2^k$ in the window method, the number of entries in the table data is $2^{k-1}+1$ in the signed window method. Therefore, the memory usage of the signed window method is about a half the memory usage of the window method. Similarly, the memory usage of the signed window method is about a half the memory usage of the randomized window method.

The signed window method is a method which takes notice of the fact that a processing load of the calculation for obtaining, from the point P on the elliptic curve, the point −P which is the inverse element of the point P is relatively light (i.e., the calculation cost of the inverse element is low) (see formulae (1.4) and (1.5) as well as the explanation thereof). The index h of the table data in the signed window method is, specifically, $0 \leq h \leq 2^{k-1}$.

For example, when letting the window size k be 3, five indexes, namely 0, 1, 2, 3, and 4, are used in the signed window method. The pieces of table data which correspond to these five indexes are 0A, 1A, 2A, 3A, and 4A. In the signed window method, by utilizing the relationship of the following formulae (6.1) to (6.3), the pieces of table data 5A, 6A, and 7A, which correspond to the three indexes 5, 6, and 7, are omitted.

$$5A = 2^k A - 3A = 8A - 3A \quad (6.1)$$

$$6A = 2^k A - 2A = 8A - 2A \quad (6.2)$$

$$7A = 2^k A - 1A = 8A - 1A \quad (6.3)$$

For example, let the window size k be 3 bits and the private key d be $241 = (011110001)_2$. In the signed window method, the temporary window values are first obtained in a way similar to that in the window method. That is, the temporary window values are as illustrated in the following formulae (6.4) to (6.6). Since there is no particular concern about confusion, both the temporary window values and the determined actual window values are represented as w[i] in the following.

$$w[2] = (011)_2 = 3 \quad (6.4)$$

$$w[1] = (110)_2 = 6 \quad (6.5)$$

$$w[0] = (001)_2 = 1 \quad (6.6)$$

Then, the temporary window values are sequentially scanned from the lowest order (i.e., from w[0]) and each window value is determined in the following way. That is, if $w[i] \geq 2^{k-1}+1$, the value (i.e., $w[i] - 2^k$) obtained by subtracting $2^k$ from the temporary window value w[i] is set as the window value w[i]. When the subtraction of $2^k$ from the i-th temporary window value w[i] is performed, 1 is added to the temporary window value w[i+1], whose order is higher by one order, to cancel out the effect of the subtraction.

Hereinafter, the above-mentioned subtraction of $2^k$ is called "window correction" and the above-mentioned addition of one is called "carry correction". Further, although the condition of $w[i] \geq 2^{k-1}$ may be used instead of the above-mentioned condition $w[i] \geq 2^{k-1}+1$, for convenience of explanation, hereinafter, assume that the condition of $w[i] \geq 2^{k-1}+1$ is used.

The actual window values are obtained from the temporary window values of formulae (6.4) to (6.6) as follows.

That is, according to formula (6.6), $w[0] < 2^{k-1}+1$ holds true. Accordingly, the 0th (i.e., the lowest-order) window value w[0] is 1, which is the same as the temporary window value.

In addition, according to formula (6.5), $w[1] \geq 2^{k-1}+1$ holds true. Accordingly, the 1st window value is obtained by subtracting $8 (=2^k)$ from the temporary window value 6 and it is determined as $w[1] = -2$. Accordingly, by the carry correction, 1 is added to the temporary window value w[2] of formula (6.4), thereby obtaining $w[2] = 4$.

The temporary window value $w[2] = 4$ with the carry correction applied satisfies $w[2] < 2^{k-1}+1$. Therefore, the 2nd (i.e., the highest-order) window value is determined as $w[2] = 4$.

In the signed window method, the point dA is calculated by formula (6.7) using the window values w[0] to w[2] determined as mentioned above.

$$dA = 2^3(2^3(2^3(O) + tab[w[2]]) - tab[-w[1]]) + tab[w[0]] \quad (6.7)$$

To be more specific, letting variable V represent the result of scalar multiplication, variable V is initialized first by the point at infinity O as illustrated in formula (6.8).

$$V = O \quad (6.8)$$

After that, sequentially from $i = m-1$ to $i = 0$, the processing of "performing k doublings, adding tab[w[i]] when the window value w[i] is not less than 0, subtracting tab[−w[i]] when the window value w[i] is negative, and substituting the obtained result for variable V". Note that m is a value obtained by dividing the bit length u of the private key d by the window size k, and in this example, $m = 3$.

Subsequent to the initialization of formula (6.8), the processing which corresponds to $i = m-1$ is performed. That is, corresponding to the window value $w[2] (=4)$, three doublings and one addition are performed as illustrated in formula (6.9).

$$V = 2^3(O) + tab[w[2]] \quad (6.9)$$

Subsequently, corresponding to the window value w[1] (=−2), three doublings and one subtraction are performed as illustrated in formula (6.10).

$$V=2^3(2^3(O)+\text{tab}[w/2]])-\text{tab}[-w/1]] \tag{6.10}$$

And finally, corresponding to the window value w[0] (=1), three doublings and one subtraction are performed as illustrated in formula (6.11).

$$V=2^3(2^3(2^3(O)+\text{tab}[w/2]])-\text{tab}[-w/1]])+\text{tab}[w/0]] \tag{6.11}$$

Expanding the right-hand side of formula (6.11), formula (6.12), as indicated below, is obtained. In addition, in this example, the private key d is 241. Accordingly, it will be appreciated that the point dA is correctly calculated by the signed window method as mentioned above.

$$V=2^3(2^3(2^3(O)+\text{tab}[4])-\text{tab}[2])+\text{tab}[1]=2^3(2^3(4A)-2A)+1A=8(32A-2A)+1A=241A \tag{6.12}$$

Although the signed window method is secure against an SPA attack, it is vulnerable to a DPA attack for a similar reason to that of the window method.

Explanation has been given to the first to the fourth comparative examples as mentioned above; the amount of memory consumption of the randomized window method, which is secure against both an SPA attack and a DPA attack, is relatively large and the signed window method, in which the amount of memory consumption is smaller, is vulnerable to a DPA attack. In other words, there is no method having the characteristics of "being secure against both an SPA attack and a DPA attack and having a smaller amount of memory consumption" in the above-mentioned four comparative examples.

On the other hand, it is highly possible that a PA attack, which is one of the side channel attacks, will be made against embedded devices as well. Some of the embedded devices have limited memory capacities for some reasons. Therefore, it is preferable that the processing of the scalar multiplication in the devices in which the memory capacity is small, such as embedded devices, for example, be secure against both an SPA attack and a DPA attack as well as having small memory usage.

It has become clear, however, that from the study by the inventors of the subject application, the simple and naïve combination of the randomized window method and the signed window method fails to obtain the characteristics of "being secure against both an SPA attack and a DPA attack and having a smaller amount of memory consumption". Rather, the inventors have obtained the findings that it is infeasible to simply and naïvely combine the randomized window method and the signed window method. The following is a more detailed statement of the findings.

The usage of random numbers blocks the simple application of the signed window method. Therefore, when the randomized window method is used as a countermeasure against an SPA attack, it becomes infeasible to reduce the memory usage by the simple application of the signed window method. In other words, the attempt of "ensuring security against both an SPA attack and a DPA attack with smaller memory usage by the simple and naïve combination of the signed window method and the randomized window method" is not successful.

Since the above-mentioned findings are useful in understanding the later-mentioned first to third embodiments, hereinafter, a detailed explanation is given for the above-mentioned findings.

FIG. 1 illustrates the attempt to combine the randomized window method and the signed window method. As explained hereinafter, the attempt illustrated in FIG. 1 is unsuccessful.

The private key d in the example of FIG. 1 has a 23-bit value as illustrated in formula (7.1).

$$d=(01001010110100011011011)_2 \tag{7.1}$$

In addition, the random value s in the example of FIG. 1 has an 8-bit value as illustrated in formula (7.2).

$$s=(10001101)_2 \tag{7.2}$$

Accordingly, in the example of FIG. 1, u=23 and b=8. In addition, let the window size k be 3. Therefore, the integer m (i.e., the number of the widow values included in the window sequence) of formula (5.1) is 5 from formula (7.3).

$$m=(u-b)/k=(23-8)/3=5 \tag{7.3}$$

As mentioned above, in the randomized window method, the window values w[i] (0≤i≤m−1) and the correction value c are determined following formula (5.4) so that formula (5.2) is satisfied. Therefore, it is assumed that the window values w[i] and the correction value c are temporarily calculated similarly to the randomized window method following formula (5.4) in the example of FIG. 1 as well. Then, since the calculation result of the left-hand side of formula (5.4) is as illustrated in formula (7.4), the temporary window values w[i] and the correction value c are obtained as illustrated in FIG. 1 and formulae (7.5) to (7.10).

$$d-(2^0 s+2^3 s+2^6 s+2^9 s+2^{12}s)=(00110110101011010100110)_2 \tag{7.4}$$

$$w/4]=(001)_2=1 \tag{7.5}$$

$$w/3]=(101)_2=5 \tag{7.6}$$

$$w/2]=(101)_2=5 \tag{7.7}$$

$$w/1]=(010)_2=2 \tag{7.8}$$

$$w/0]=(110)_2=6 \tag{7.9}$$

$$c=(10100110)_2 \tag{7.10}$$

It is assumed that the window correction and the carry correction are then performed for each of the window values w[i], which are obtained as illustrated in the above-mentioned formulae (7.5) to (7.9), similarly to the signed window method. In the example of FIG. 1, the window size k is 3; therefore, 8(=$2^k$) is subtracted from the temporary window value w[i] by the window correction and the carry correction is performed to the window value w[i+1] when w[i]≥5(=$2^{k-1}$+1).

In other words, when the lowest-order window value w[0] satisfies w[0]≥$2^{k-1}$+1, $2^k$ is subtracted from the window value w[0] by the window correction and a carry correction is performed to the window value w[1], whose order is higher by one order. Concerning the window value w[i] (1≤i≤m−1), whose order is other than the lowest order, when the total of the temporary window value w[i] and the carry correction value is not less than $2^{k-1}$+1, the window correction is performed and the carry correction is performed to the window value w[i+1], whose order is higher by one order.

Specifically, as illustrated in FIG. 1, first, the window correction is performed to the lowest-order temporary window value w[0]=6 (≥5), and the window value w[0] is determined as illustrated in formula (7.11)

$$w/0]=6-8=-2 \tag{7.11}$$

Then, to the next window value w[1], 1 is added by the carry correction, and the window value w[1] is determined as in formula (7.12). Since 3<5, no window correction is performed to the window value w[1].

$$w[1]=2+1=3 \quad (7.12)$$

Subsequently, to the next window value w[2]=5 (≥5), the window correction is performed, and the window value w[2] is determined as illustrated in formula (7.13).

$$w[2]=5-8=-3 \quad (7.13)$$

Then, to the further next window value w[3], 1 is added by the carry correction. Since the window value w[3] with the carry correction applied is not less than 5, it becomes the target of the window correction. Therefore, the window value w[3] is determined as illustrated in formula (7.14).

$$w[3]=5+1-8=-2 \quad (7.14)$$

To the next (i.e., the highest-order) window value w[4], 1 is added by the carry correction. Since the window value w[4] with the carry correction applied is less than 5, it is not the target of the window correction; the window value w[4] is eventually determined as illustrated in formula (7.15).

$$w[4]=1+1=2 \quad (7.15)$$

FIG. 1 illustrates the window values w[0] to w[4] of formulae (7.11) to (7.15) and the correction value c of formula (7.10) determined as mentioned above. The absolute values of the window values w[i] obtained as mentioned above are, as seen from the above examples, not greater than $2^{k-1}$.

Unlike the signed window method exemplified as the fourth comparative example, however, the example of FIG. 1 attempting to combine the randomized window method and the signed window method fails to reduce the table data even though the absolute values of all the window values are not greater than $2^{k-1}$. In other words, the attempt to "satisfy both tamper-proof property and reduction in memory usage by combining the randomized window method and the signed window method" is unsuccessful. Hereinafter, explanation is given for the reason by referring to FIG. 2.

FIG. 2 explains the reason that the attempt of FIG. 1 is unsuccessful. Similarly to FIG. 1, FIG. 2 illustrates the example in which the window size k is 3, and the bit length b of the random value s is 8. In FIG. 2, a table 101 corresponds to the signed window method, whereas a table 102 corresponds to the attempt of FIG. 1.

According to the signed window method, $2^k$ is subtracted from the window value of not less than $2^{k-1}+1$ by the window correction. For example, when k=3, 8 is subtracted from the window value of not less than 5.

Therefore, when the window value with the carry correction applied is appropriate is 5, the window value with the window correction applied is -3. Since the computational complexity for obtaining the inverse point from the point on the elliptic curve is small, as illustrated in formulae (1.4) and (1.5), the scalar multiple -3A is easily calculated from the scalar multiple 3A with a small computational complexity.

Therefore, according to the signed window method, the table 101 does not need to hold the table data of the scalar multiple 5A in association with the index of 5, or the table 101 does not need to hold the table data of the scalar multiple -3A in association with the index of 5, either. In other words, in the signed window method, the entry whose index is 5 may be omitted in the table 101 and the entry whose index is 3 may be used instead, as illustrated in the table 101 of FIG. 2.

Similarly, according to the signed window method, as illustrated in the table 101, entries whose indexes are 6 and 7 may also be omitted and the entries whose indexes are 2 and 1 may be used instead. As a result, according to the signed window method, the table 101 does not need to hold $2^k$ entries. In other words, it is sufficient for the table 101 to hold the entries whose indexes are not greater than $2^{k-1}$. Therefore, in the signed window method, memory usage is smaller than that in the window method (or the randomized window method).

In contrast, in the table 102, which corresponds to the attempt of FIG. 1, the entries whose indexes are not less than $2^{k-1}+1$ are not omissible and it is impossible to reduce the memory usage compared with the window method (or the randomized window method). The reason is as follows.

In the table 102, the table data tab[1] of the entry whose index is 1 is $(1\times2^8+s)A$. Therefore, the subtraction of the table data tab[1] means the addition of the point $(-1\times2^8-s)A$. Similarly, the subtraction of the table data tab[2] in the table 102 means the addition of the point $(-2\times2^8-s)A$, and the subtraction of the table data tab[3] of the table 102 means the addition of the point $(-3\times2^8-s)A$.

In contrast, in the attempt of FIG. 1, although the initial window value might be corrected by the window correction and/or the carry correction, the random value s is constant. Therefore, when the window value with the carry correction applied as appropriate is 5, for example, the window value is corrected to be -3; it is the addition of the point $(-3\times2^8+s)A$ that corresponds to the window value thus corrected to be -3.

Meanwhile, the point $(-3\times2^8+s)A$ is not the inverse element $(-3\times2^8-s)A$ of the point represented by the table data of the entry whose index is 3. That is, the formula "$(-3\times2^8+s)A$" and the formula "$(-3\times2^8-s)A$" have different sign of the random value s.

Therefore, the point $(-3\times2^8+s)A$ is not a point calculated with the small computational complexity from the table data of the entry whose index is 3. Accordingly, the table 102 needs to hold the scalar multiple $(-3\times2^8+s)A$ as table data which corresponds to the window value of -3 resulting from the window correction. In other words, the entry which corresponds to the index 5 is not omissible from the table 102.

Similarly, the point $(-2\times2^8+s)A$ is different from the point $(-2\times2^8-s)A$, which is calculable with a small computational complexity from the table data tab[2]=$(2\times2^8+s)A$ of the entry whose index is 2. Therefore, the entry which corresponds to the index 6 is not omissible from the table 102.

In addition, the point $(-1\times2^8+s)A$ is different from the point $(-1\times2^8-s)A$, which is calculable with a small computational complexity from the table data tab[1]=$(1\times2^8+s)A$ of the entry whose index is 1. Therefore, the entry which corresponds to the index 7 is not omissible from the table 102, either.

As mentioned above, in the event, it is impossible to reduce the number of entries in the table 102. Therefore, the attempt of FIG. 1 to satisfy both the tamper-proof property and the reduction in memory usage is unsuccessful. That is to say, since the use of the random value in the randomized window method is the factor that inhibits the simple application of the signed window method, the attempt of FIG. 1 to simply combine the randomized window method and the signed window method is unsuccessful.

The matter explained above with reference to FIG. 2 is stated more generally as follows.

In the attempt of FIG. 1, similarly to the randomized window method, the initial window values and the correction value are calculated by formula (5.4) so that formula (5.2) is satisfied. In addition, as mentioned above, formula (5.2) is rewritten as formula (5.3). Further, the inside of the parentheses in formula (5.3) is rewritten as formula (7.16). The right-hand side of formula (7.16) corresponds to the fact that the table data tab[h] in the entry which is associated with the index h is $(2^b h+s)A$.

$$2^{ki+b}w[i]+2^{ki}s=2^{ki}(2^b w[i]+s) \quad (7.16)$$

Further, formula (7.17) is obtained when rewriting formula (5.3) with ellipsis while focusing on the case where a certain window value w[i] is the target of the window correction and therefore the carry correction is performed to the window value w[i+1].

$$d=c+\ldots+2^{ki+b}w[i]+2^{ki}s+2^{k(i+1)+b}w[i+1]+2^{k(i+1)}s+ \quad (7.17)$$

Here, formula (7.18) is obtained by adding the term "$-2^{k(i+1)+b}$" and the term "$+2^{k(i+1)+b}$", which offset each other, to the right-hand side of formula (7.17).

$$d=c+\ldots+2^{ki+b}w[i]-2^{k(i+1)+b}+2^{ki}s+2^{k(i+1)+b}w[i+1]+\\ 2^{k(i+1)+b}+2^{k(i+1)}s+ \quad (7.18)$$

And when formula (7.18) is modified, formula (7.19) is obtained.

$$d=c+\ldots+2^{ki}((w[i]-2^k)2^b+s)+2^{k(i+1)}((w[i+1]+1)\\ 2^b+s)+ \quad (7.19)$$

In formula (7.19), $(w[i]-2^k)$ represents the window value after the window correction is applied and $(w[i+1]+1)$ represents the window value whose order is higher by one order and to which the carry correction has been applied. In addition, $((w[i]-2^k)2^b+s)$ in formula (7.19) represents that "in the attempt of FIG. 1, $(2^b(h-2^k)+s)A$ is required as the table data whose index h is the window value resulting from the window correction applied".

Thus, the sign of the random value s in formula (7.19) is not different from the sign of the random value s in formula (7.16). Therefore, even though the window correction and the carry correction are performed as in the attempt of FIG. 1, it is not possible to omit any piece of the table data as long as the pieces of table data are randomized by the random value s.

In other words, the point $(2^b)(h-2^k)+s)A$ corresponding to index h where $h \geq 2^{k-1}+1$ is not the inverse element of the table data $tab[-(h-2^k)]=(-2^b(h-2^k)+s)A$. Therefore, even if the window correction and the carry correction are performed, it is impossible to omit the table data $tab[h]=(2^b(h-2^k)+s)A$, which corresponds to the index h of $h \geq 2^{k-1}+1$, from the table.

The example of the table 102 of FIG. 2 illustrates that, in the case where k=3, it is impossible to omit the table data tab[5] corresponding to h=5 even if the window correction and the carry correction are performed; this is because the table data tab[5] is not the inverse element of the table data tab[3]. Similarly, the example of the table 102 of FIG. 2 illustrates that, it is impossible to omit the table data tab[6] since the table data tab[6] is not the inverse element of the table data tab[2]. In addition, the example of the table 102 of FIG. 2 also illustrates that, it is impossible to omit the table data tab[7] since the table data tab[7] is not the inverse element of the table data tab[1].

As explained above, the attempt to simply and naively combine the randomized window method and the signed window method is unsuccessful. Therefore, in the first to third embodiments, other approaches different from that of the attempt in FIG. 1 are taken to satisfy both security against an SPA attack and a DPA attack and the reduction in the memory usage.

Hereinafter, explanation is given for the outline of the approaches taken in the first to third embodiments to satisfy both security against an SPA attack and a DPA attack and the reduction in the memory usage by referring to FIGS. 3 to 5.

FIG. 3 explains the approach common to the first to third embodiments. A table 103 in FIG. 3 illustrates an example in the case where the window size k is 3 and the bit length b of the random value s is 8. In order to ensure security against a DPA attack, the table data held by the table 103 is randomized by the random value s.

Meanwhile, the reason that the attempt of FIG. 1 is unsuccessful lies in the fact that a constant random value s is always used regardless of the result of the window correction. With this reason taken into consideration, in the approach of FIG. 3, the sign of the random value s is reversed in accordance with the window value. That is, in the approach of FIG. 3, when the window value becomes negative as a result of the window correction, the sign of the random value s is reversed accordingly.

For example, let k be 3. When the window value with the carry correction applied as appropriate is not less than 5 ($=2^{k-1}+1$), it becomes the target of the window correction and 8 ($=2^k$) is subtracted therefrom. The window value with the window correction applied becomes negative as a result. As illustrated in the table 103, in the approach of FIG. 3, instead of the original random value s, −s is associated with the window value corrected to be negative as mentioned above.

For example, when the window value with the carry correction applied as appropriate is 5, the window value with the window correction applied is −3 (=5−8) and therefore negative. Accordingly, omission of the entry whose index is 5 is enabled by associating the point $(-3 \times 2^8-s)A$, which is randomized by −s instead of +s, with the window value corrected to be −3. This is because the point $(-3 \times 2^8-s)A$ is the inverse element of the point $(3 \times 2^8+s)A$ and thus is calculable with a small computational complexity from the table data in the entry whose index is 3.

Similarly, when the window value with the carry correction applied as appropriate is 6, the window value with the window correction applied is −2 (=6−8) and therefore negative. Accordingly, omission of the entry whose index is 6 is enabled by associating the point $(-2 \times 2^8-s)A$ with the window value corrected to be −2. This is because the point $(-2 \times 2^8-s)A$ is the inverse element of the point $(2 \times 2^8+s)A$ and thus is calculable with a small computational complexity from the table data in the entry whose index is 2.

Similarly, when the window value with the carry correction applied as appropriate is 7, the window value with the window correction applied is −1 (=7−8) and therefore negative. Accordingly, omission of the entry whose index is 7 is enabled by associating the point $(-1 \times 2^8-s)A$ with the window value corrected to be −1. This is because the point $(-1 \times 2^8-s)A$ is the inverse element of the point $(1 \times 2^8+s)A$ and thus is calculable with a small computational complexity from the table data in the entry whose index is 1.

In this way, the random value s is associated with the window value of not less than 0 and not greater than $2^{k-1}$ which is not the target of the window correction, while on the other hand, the random value −s with the reversed sign is associated with the window value which is corrected to be negative as a result of being targeted for the window correction. And so, hereinafter, the random value which corresponds to a certain window value w[i] is represented as s[i]. The random value s[i] takes either +s or −s in accordance with the value of i.

Setting the random value s[i], which corresponds to the window value w[i], as s[i]=+s or s[i]=−s in accordance with the window value w[i] in the above-mentioned manner enables both the randomization for ensuring security against a DPA attack and the reduction in the memory usage to be compatibly achieved. Needless to say, security against an SPA attack is ensured by the use of the window. Therefore, preferable in various fields is a cryptographic processing device which generates the table data such as that in the table 103 of FIG. 3 and performs the operation on the basis of the generated table data to obtain the scalar multiple dA for a certain point A and the private key d.

Hereinafter, for simplification of the notation, sometimes the window value which corresponds to a certain i is represented as a "window value $w[i]$" and sometimes the window sequence (i.e., the sequence of the window values $w[m-1], \ldots, w[1], w[0]$) as a whole is represented as a "window values $w[i]$". Similarly, sometimes the sequence of the random values $s[m-1], \ldots, s[1], s[0]$ is called a "random number sequence" and sometimes the random value which corresponds to a certain i is expressed as a "random value $s[i]$" and sometimes the random number sequence as a whole is expressed as a "random number sequence $s[i]$".

Figure 4:
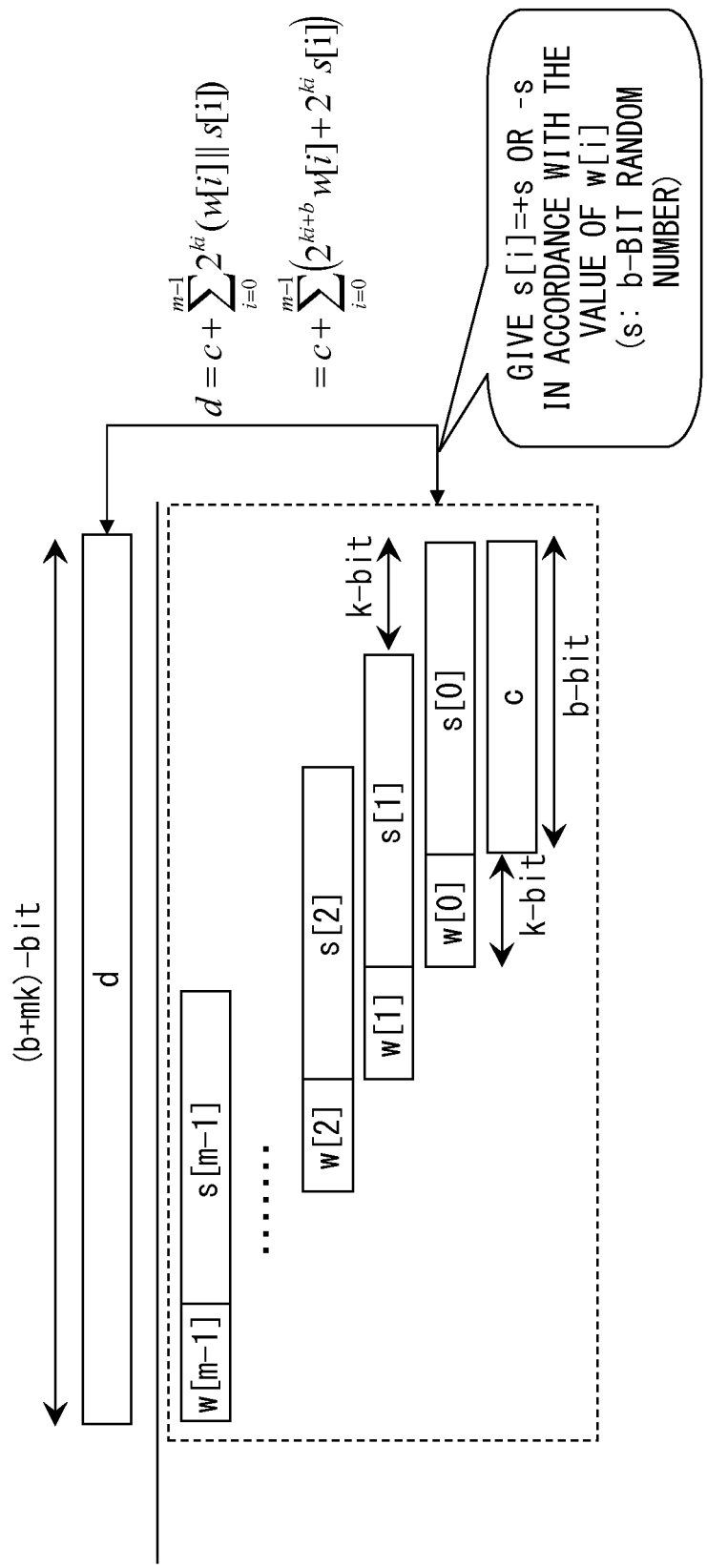
FIG. 4 indicates the approach in the first to third embodiments in another respect.

FIG. 4 illustrates the above-explained approach of the first to third embodiments in another respect. In other words, formula (8.1) holds true among the $u(=b+km)$-bit private key d, the window sequence $w[i]$, the random number sequence $s[i]$, and the correction value c.

$$d = c + \sum_{i=0}^{m-1} 2^{ki}(w[i]\|s[i]) \qquad (8.1)$$
$$= c + \sum_{i=0}^{m-1} (2^{ki+b}w[i] + 2^{ki}s[i])$$

For each i where $0 \leq i \leq m-1$, the random value $s[i]$ is set to be $+s$ or $-s$ in accordance with the window value $w[i]$ under the constraint condition where formula (8.1) holds true. In other words, it is appropriate that the random value $s[i]$ is set to be $+s$ when the window value $w[i]$, to which the carry correction and the window correction have been applied as appropriate, is not less than 0. It is appropriate that the random value $s[i]$ is set to be $-s$ when the window value $w[i]$, to which the carry correction and the window correction have been applied as appropriate, is negative.

Setting the random value $s[i]$ to be $+s$ or $-s$ in accordance with the window value $w[i]$ under the constraint condition where formula (8.1) holds true as mentioned above enables the operation using a randomized table with a smaller number of entries, such as the table 103 in FIG. 3. That is to say, both security against a PA attack and the reduction in the memory usage are realized.

However, when actually attempting to set the random value $s[i]$ to be $+s$ or $-s$ in accordance with the window value $w[i]$ under the constraint condition where formula (8.1) holds true, the difficulty of treating a circular reference arises. Needless to say, the cryptographic processing devices of the first to third embodiments are designed to overcome such difficulty. Therefore, subsequently, explanation is given for the above-mentioned difficulty for help in understanding the first to third embodiments.

As already explained referring to FIGS. 3 and 4, each random value $s[i]$ is determined in accordance with the window value $w[i]$ corresponding thereto. That is to say, the values in the random number sequence $s[i]$ depend on the values in the window sequence $w[i]$. On the other hand, as hereinafter explained referring to FIG. 5, the values in the window sequence $w[i]$ depend on the values in the random number sequence $s[i]$. Therefore, the window sequence $w[i]$ and the random number sequence $s[i]$ circularly refer to each other. Therefore, there is no obvious method to determine the values in the window sequence $w[i]$ and the values in the random number sequence $s[i]$.

Figure 5:
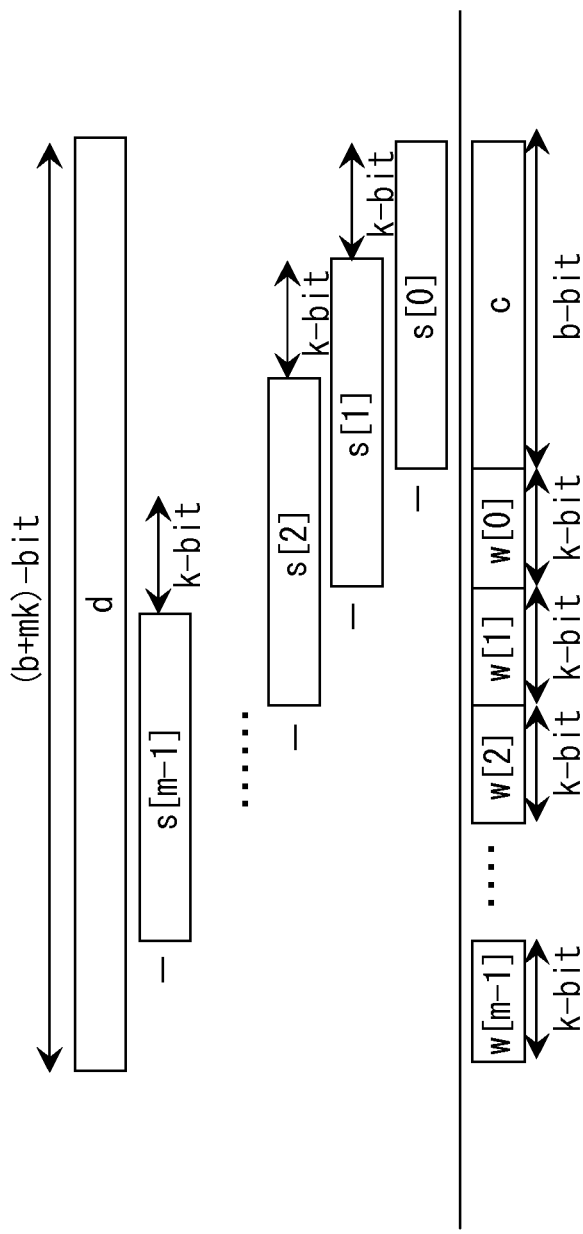
FIG. 5 explains that the values of the window sequence depend on the values of the random number sequence.

FIG. 5 explains that the values in the window sequence $w[i]$ depend on the values in the random number sequence $s[i]$. Likewise, in FIG. 5, the window size is k, the bit length of the random value s is b, m is a positive integer, and the bit length of the private key d is $u=b+mk$. Therefore, each window value $w[i]$ and each random value $s[i]$ is the signed k-bit value and the correction value c is the signed b-bit value.

In the specification of the subject application, when N is a positive integer, a "signed N-bit value" is a value which is represented by a combination of a positive or negative sign and an integer which is represented by N bits and which is not less than 0 and not greater than $(2^N-1)$. Accordingly, the signed N-bit value is not less than $-(2^N-1)$ and not greater than $(2^N-1)$.

Although the signed N-bit value may be represented by (N+1) bits including one bit representing the sign and the above-mentioned N bits, the signed N-bit value is different from two's-complement representation in (N+1) bits. For example, the two's-complement representation of $-5$ is "1011". On the other hand, since $5=(101)_2$, when $-5$ is represented as a signed 3-bit value, it is $-(101)_2$.

In addition, when extracting only one or more most significant bits or one or more least significant bits from a signed N-bit value, the sign of the extracted bit value is the same as the sign of the original signed N-bit value. For example, when extracting the most significant 2 bits of a signed 4-bit value $-(1011)_2$, $-(10)_2=-2$ is obtained; when extracting the least significant 2 bits of the signed 4-bit value $-(1011)_2$, $-(11)_2=-3$ is obtained.

In the following explanation, for the signed N-bit value as well, the symbol "[i]", which represents the i-th bit of a bit string, and the symbol "$\|$", which represents the concatenation, are used. When these symbols are used for the signed N-bit value(s), the positive or negative sign is inherited as well. For example, when $a=-(1011)_2$, $(a[3]\|a[2])=-(10)_2=-2$ and $(a[1]\|a[0])=-(11)_2=-3$.

FIG. 5 represents formula (8.2), which is obtained by transposition from formula (8.1).

$$d - \sum_{i=0}^{m-1} 2^{ki}s[i] = c + \sum_{i=0}^{m-1} 2^{ki+b}w[i] \qquad (8.2)$$

The left-hand side of formula (8.2) indicates the result of subtracting, from the private key d, the sum of each value $2^{ik}s[i]$, which is a value obtained by shifting each random value $s[i]$ to the left by ik bits. In addition, the right-hand side of formula (8.2) indicates that the window sequence $w[i]$ is obtained by splitting the most significant mk bits of the subtraction result indicated by the left-hand side into every k bits and that the least significant b bits of the subtraction result indicated by the left-hand side becomes the correction value c.

Formula (8.1) is similar to formulae (5.2) and (5.3), and formula (8.2) is similar to formula (5.4) obtained from formula (5.3). And in the third comparative example, as illustrated in the specific example of formula (5.5), the window sequence and the correction value are obtained uniquely by calculating the value of the left-hand side of formula (5.4). Therefore, in appearance, formula (8.2) may seem to be a formula to derive the window sequence and the correction value uniquely by calculating the value of its left-hand side, similarly to the third comparative example.

However, there is a big difference between formulae (5.4) and (8.2). That is, in formula (5.4), the random value that is constant regardless of the variable i, which represents the window position, is used, while in formula (8.2), the random value s[i] varies in accordance with the variable and the random value s[i] is +s or −s.

Therefore, unfortunately, it is impossible to uniquely determine the window sequence and the correction value from formula (8.2). More specifically, since each random value s[i] may take either of two values, there are $2^m$ patterns for the value to be subtracted from the private key d in the left-hand side of formula (8.2) (i.e., the sum of each value $2^{ik}$s[i], which is obtained by shifting each random value s[i] to the left by ik bits). Therefore, unless it is determined which out of $2^m$ patterns the value to be subtracted from the private key d in the left-hand side of formula (8.2) belongs to, it is impossible to determine the values in the window sequence w[i] and the value of the correction value c from the right-hand side of formula (8.2).

For example, when letting the bit length u of the private key d be 160, letting the bit length b of the random value be 10, and letting the window size k be 3, m=50 according to formula (8.3).

$$m=(u-b)/k=(160-10)/3=50 \quad (8.3)$$

In this case, the value to be subtracted from the private key d in the left-hand side of formula (8.2) indicates one of a vast number of patterns, namely $2^{50}$ patterns. That is, in this case, the random number sequence s[i] is one of the potentially possible $2^{50}$ patterns.

Therefore, when trying to calculate the window sequence w[i] and the correction value c by formula (8.2), unless one of the $2^{50}$ patterns that are potentially possible as the random number sequence s[i] is selected, the window sequence w[i] and the correction value c are not obtained. That is, the values of the window sequence w[i] depend on the values of the random number sequence s[i].

On the other hand, as explained by referring to FIGS. 3 and 4, the values of the random number sequence s[i] depend on the values of the window sequence w[i]. Therefore, the window sequence w[i] and the random number sequence s[i] circularly refer to each other.

When the circular reference as mentioned above is present, there is no obvious method of uniquely determining the values of the window sequence w[i], the values of the random number sequence s[i], and the correction value c. This is in contrast to the fact that there exists an obvious method of uniquely determining the values of the window sequence w[i] in the third comparative example, where there is no circular reference present, as illustrated in formula (5.4). In the first to third embodiments, in order to overcome the difficulty caused by the circular reference, the values of the window sequence w[i], the values of the random number sequence s[i], and the correction value c are determined in accordance with the later-mentioned method.

As mentioned above, the cryptographic processing devices of the first to third embodiments share in common that they determine the values of the window sequence w[i], the values of the random number sequence s[i], and the correction value c by overcoming the difficulty caused by the circular reference, following the approach illustrated in FIG. 3. Further, the cryptographic processing devices of the first to third embodiments also share in common some other features. Therefore, hereinafter explanation is given for the commonality shared by the cryptographic processing devices of the first to third embodiments referring to FIGS. 6 to 10, and then detailed explanation is given for each embodiment.

Figure 6:
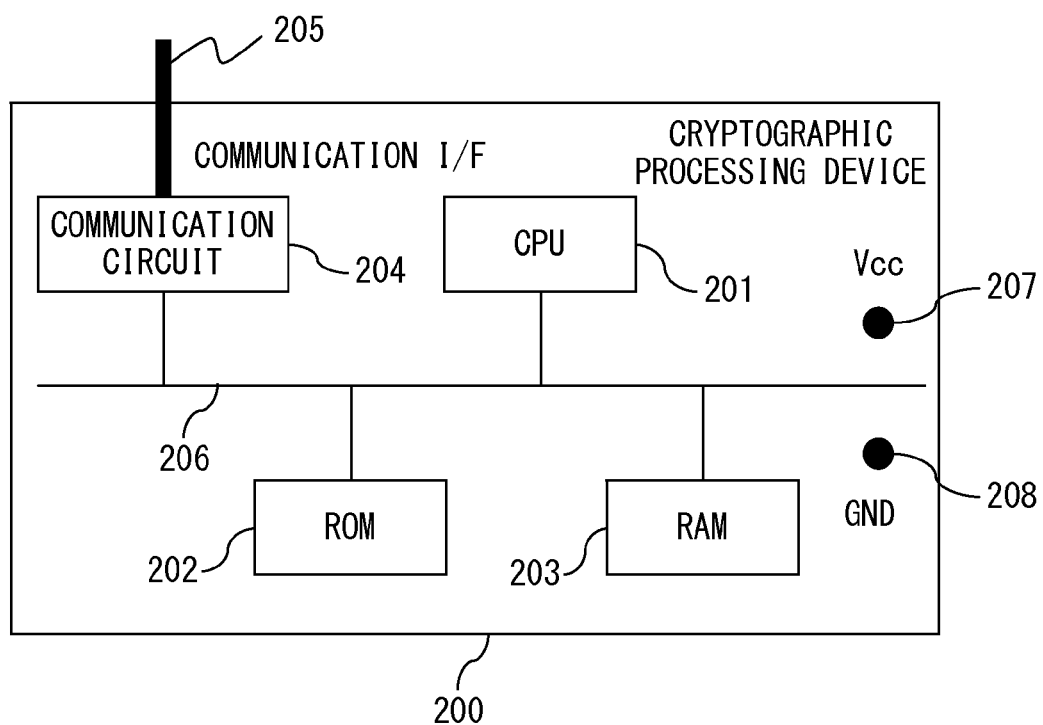
FIG. 6 illustrates a first example of a hardware configuration for the cryptographic processing devices of the first to third embodiments.

FIG. 6 illustrates a first example of a hardware configuration for the cryptographic processing devices of the first to third embodiments.

The cryptographic processing device 200 of FIG. 6 has a central processing unit (CPU) 201, a read only memory (ROM) 202, a random access memory (RAM) 203, a communication circuit 204, and a communication interface (I/F) 205. The communication circuit 204 performs communication with other devices via the communication I/F 205.

The CPU 201, the ROM 202, the RAM 203, and the communication circuit 204 are connected with each other by a bus 206. Further, the cryptographic processing device 200 has a power supply terminal 207 and a ground terminal 208. To each component in the cryptographic processing device 200, a power supply voltage is supplied via not-illustrated wiring and the power supply terminal 207. Each component in the cryptographic processing device 200 is also connected to the ground terminal 208 via the not-illustrated wiring.

The CPU 201 performs various types of processing by loading a program, which is stored in advance in the ROM 202, into the RAM 203 and by executing the program using the RAM 203 as a working area. For example, the CPU 201 performs the processing of FIG. 9. As is mentioned later, the processing of FIG. 9 includes the processing of FIG. 10 as well as the processing of FIG. 11, FIG. 19 or FIG. 24.

Instead of the ROM 202, other types of non-volatile memory devices including flash memories and the like may be used. When a rewritable memory device such as a flash memory and the like instead of the ROM 202 is used, the program may be downloaded to the cryptographic processing device 200 via the communication interface I/F 205, and installed in the cryptographic processing device 200.

In addition, the cryptographic processing device 200 is capable of communicating with other devices via the communication I/F 205. For example, the cryptographic processing device 200 may send information such as the public key of the cryptographic processing device 200 itself to any other device via the communication I/F 205 or may receive information such as the public key of any other device via the communication interface I/F 205.

The type of the communication I/F 205 may be any of the types in accordance with the type of the cryptographic processing device 200. For example, the cryptographic processing device 200 may be a smart card, an LSI chip incorporated in an accessory part such as a printer cartridge, or an LSI chip incorporated in a home electrical appliance. For example, when the cryptographic processing device 200 is a contact smart card, the communication I/F 205 may include a communication terminal; when the cryptographic processing device 200 is a contactless smart card, the communication I/F 205 may include an antenna.

The communication circuit 204 performs appropriate processing in accordance with the type of the communication I/F 205 and the communication protocol. For example, the communication circuit 204 may perform such processing as digital-to-analog conversion, analog-to-digital conversion, modulation, demodulation, encoding, decoding, and the like.

An attacker of a PA attack estimates the private key of the cryptographic processing device 200 by inputting the data of a point on the elliptic curve via the communication I/F 205 and by measuring the power consumption while the cryptographic processing device 200 is performing the processing with respect to the inputted point. For example, an attacker measures the power consumption by connecting the resistor to the power supply terminal 207.

FIG. 7 illustrates a second example of a hardware configuration for the cryptographic processing devices of the first to third embodiments. The cryptographic processing device 210 of FIG. 7 includes an ECC hardware circuit 211 instead of the CPU 201 and the ROM 202.

In addition, the cryptographic processing device 210 includes the RAM 203, the communication circuit 204, and the communication I/F 205 similarly to those of the cryptographic processing device 200 of FIG. 6. In the cryptographic processing device 210, the ECC hardware circuit 211, the RAM 203, and the communication circuit 204 are connected with each other by the bus 206. Further, the cryptographic processing device 210 also includes the power supply terminal 207 and the ground terminal 208 similarly to those of the cryptographic processing device 200 of FIG. 6.

In the cryptographic processing device 210, the ECC hardware circuit 211 performs the processing of FIG. 9 instead of the CPU 201, which reads the program from the ROM 202 and executes the program. The ECC hardware circuit 211 may be an application-specific integrated circuit (ASIC); at least a part of the ECC hardware circuit 211 may be realized by a field-programmable gate array (FPGA). Further, the ECC hardware circuit 211 is also connected with the power supply terminal 207 and the ground terminal 208 by the not-illustrated wiring.

Further, in some embodiments, the cryptographic processing device may include the CPU 201 of FIG. 6 as a general-purpose processor, the ROM 202 of FIG. 6 which stores the program executed by the CPU 201, and the ECC hardware circuit 211 of FIG. 7 as a coprocessor. The CPU 201 may perform a portion of the processing of FIG. 9, while the ECC hardware circuit 211 may perform the remaining portion of the processing of FIG. 9. In such a case, similarly to what is illustrated in FIGS. 6 and 7, the cryptographic processing device includes the RAM 203, the communication circuit 204, and the communication I/F 205.

Figure 8:
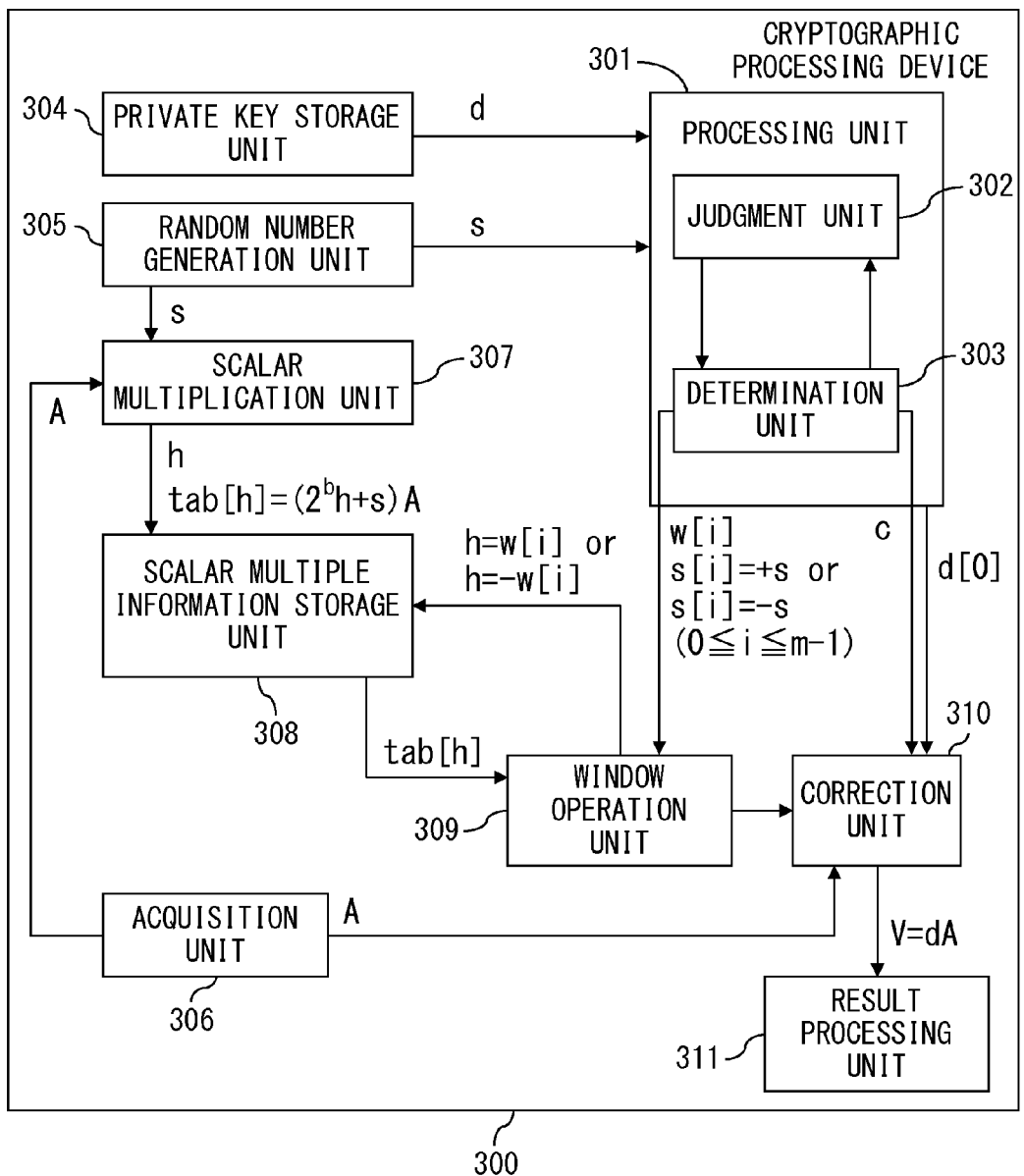
FIG. 8 explains a functional configuration of the cryptographic processing device of the first to third embodiments.

FIG. 8 illustrates the functional configuration of the cryptographic processing devices of the first to third embodiments. The cryptographic processing device 300 illustrated in FIG. 8 may be realized by the hardware illustrated in FIG. 6 or FIG. 7.

The cryptographic processing device 300 includes a processing unit 301, and the processing unit 301 includes a judgment unit 302 and a determination unit 303. The cryptographic processing device 300 further includes a private key storage unit 304, a random number generation unit 305, an acquisition unit 306, a scalar multiplication unit 307, a scalar multiple information storage unit 308, a window operation unit 309, a correction unit 310, and a result processing unit 311.

The processing unit 301 executes processing for obtaining the window sequence w[i], the random number sequence s[i], and the correction value c from the u-bit private key d and the b-bit random value s.

The judgment unit 302 in the processing unit 301 judges which is appropriate to set each random value s[i] as +s or −s. Since the criterion used by the judgment unit 302 varies in accordance with the embodiments, the detailed explanation is given later.

Further, the determination unit 303 in the processing unit 301 determines the random values s[i], the window values w[i], and the correction value c following the determination by the judgment unit 302. The determination unit 303 also feeds back the value that depends on the determined random value s[i] and the determined window value w[i] (specifically, feeds back the later-mentioned corrected difference value "diff") to the judgment unit 302 for the judgment of the next random value s[i−1]. The determination unit 303 outputs the determined window sequence w[i] and the determined random number sequence [i] to the window operation unit 309 and outputs the determined correction value c to the correction unit 310.

Moreover, although detailed explanation is given later, in the first to third embodiments, the processing unit 301 executes preprocessing to the private key d in step S102 of FIG. 9 and the correction unit 310 executes post-processing in steps S109 to S111 of FIG. 9. Therefore, the processing unit 301 outputs d[0], which is the LSB of the private key d, to the correction unit 310 for the post-processing.

The processing unit 301, which includes the judgment unit 302 and the determination unit 303, may be realized by the CPU 201 of FIG. 6, by the ECC hardware circuit 211 of FIG. 7, or by a combination of the CPU 201 and the ECC hardware circuit 211. In addition, when the processing unit 301 is realized by the CPU 201, the program module for realizing the judgment unit 302 and the program module for realizing the determination unit 303 may be separate program modules or may be integrated into one.

Additionally, the private key storage unit 304 stores the private key d and is realized, for example, by the ROM 202. The processing unit 301 reads the private key d from this private key storage unit 304. The private key d is an unsigned positive value.

The random number generation unit 305 generates a b-bit random value s and outputs the random value s to the processing unit 301. For simplification of explanation, in the explanation of the first to second embodiments as follows, it is assumed that the random value s is not less than 0, and in the explanation of the third embodiment, it is assumed that the random value s is positive; however, the modification example where the random value s is negative is also mentioned later. The random number generation unit 305 is realized by the CPU 201 or the ECC hardware circuit 211.

The acquisition unit 306 acquires the x-y coordinates of the point A, which is on the elliptic curve and is the target of the scalar multiplication, and outputs the acquired x-y coordinates of the point A to the scalar multiplication unit 307 and the correction unit 310. The acquisition unit 306 may acquire the x-y coordinates of the point A, either by reading the x-y coordinates of the point A from the not-illustrated storage unit of the cryptographic processing device 300, or by communicating with an external device and receiving the x-y coordinates of the point A from the external device.

For example, the point A may be a base point determined by the cryptographic processing device 300 itself in advance. In this case, the acquisition unit 306 acquires the x-y coordinates of the point A by referring to the not-illustrated storage unit in the cryptographic processing device 300 for storing the x-y coordinates of the base point.

The storage unit for storing the x-y coordinates of the base point may be realized, for example, by the ROM 202. The acquisition unit 306 may be realized by the CPU 201 or the ECC hardware circuit 211, either of which reads the data from the ROM 202.

In another case, the point A may be a point which is given to the cryptographic processing device 300 from a device other than the cryptographic processing device 300. For example, the point A may be the public key of the external device. The public key of the external device may be reported to the cryptographic processing device 300 from the external device for DH key agreement, or may be reported to the cryptographic processing device 300 from the external device for the authentication by the DSA.

When the point A is a point which is given to the cryptographic processing device 300 from a device other than the cryptographic processing device 300, the acquisition unit 306, specifically, is realized by the communication I/F 205 and the communication circuit 204. In other words, the acquisition unit 306 acquires the x-y coordinates of the point A by receiving the x-y coordinates of the point A from the external device.

In addition, the scalar multiplication unit 307 calculates the x-y coordinates of the point $(2^b h+s)A$ for each index h within the range appropriately determined in accordance with the embodiment. Since the point $(2^b h+s)A$ is the scalar multiple of the point A, hereinafter, the information which represents the point $(2^b h+s)A$ (i.e., the x-y coordinates of the point $(2^b h+s)A$) is also called "scalar multiple information". The scalar multiplication unit 307 outputs the index and the scalar multiple information to the scalar multiple information storage unit 308. The scalar multiplication unit 307 may be realized by the CPU 201, by the ECC hardware circuit 211, or by a combination of both.

Further, the scalar multiple information storage unit 308 stores the scalar multiple information, which is generated by the scalar multiplication unit 307, in association with the index. The scalar multiple information storage unit 308 is realized by the RAM 203.

Since the scalar multiple information storage unit 308 of the first to third embodiments stores pieces of the scalar multiple information and their indexes as data in a table format, hereinafter, the scalar multiple information associated with the index his also called "table data" and is also represented as tab[h]. In addition, since the table data tab[h] is randomized by the random value s, hereinafter, the table data tab[h] is also called "randomized table data".

Needless to say, any data format of the scalar multiple information may be arbitrarily used in accordance with the embodiment, and a data format other than the table format is also available. For example, the scalar multiple information storage unit 308 may simply store the x-y coordinates of the point $(2^b h+s)A$ at the memory address which is uniquely determined from the base address and the index h. That is to say, it is sufficient as long as the scalar multiple information storage unit 308 stores the x-y coordinates of the point $(2^b h+s)A$ in association with the index h; the index h itself need not be stored explicitly.

Further, the window operation unit 309 performs an operation which uses the window by referring to pieces of the scalar multiple information tab[h] stored in the scalar multiple information storage unit 308 using the window sequence w[i] and the random number sequence s[i] obtained by the processing unit 301. The window operation unit 309 then outputs the operation result to the correction unit 310. The window operation unit 309 may be realized by the CPU 201, by the ECC hardware circuit 211, or by a combination of both.

Specifically, the window operation unit 309 refers to the scalar multiple information storage unit 308 by using, as the index h, the window value w[i] obtained by the processing unit 301 or the value −w[i], which is obtained by reversing the sign of the window value w[i]. Then, the window operation unit 309 reads the scalar multiple information tab[h] corresponding to the index h from the scalar multiple information storage unit 308 and executes the operation which uses the read scalar multiple information tab[h]. The detailed operation of the window operation unit 309 is mentioned later together with FIG. 10.

The correction unit 310 calculates the point cA from the correction value c, which is inputted from the determination unit 303, and from the x-y coordinates of the point A, which coordinates are inputted from the acquisition unit 306. Then, the correction unit 310 adds the point cA to the point that is on the elliptic curve and is the input from the window operation unit 309, and then executes the post-processing by referring to the value of d[0], which is the LSB of the private key d and is reported from the processing unit 301; the correction unit 310 thereby corrects the operation result of the window operation unit 309. The point V obtained as a result is the point which satisfies V=dA. The correction unit 310 outputs the x-y coordinates of the point V to the result processing unit 311.

The correction unit 310 may be realized by the CPU 201, by the ECC hardware circuit 211, or by a combination of both. In addition, although a detailed explanation is given later with step S107 of FIG. 9, since the correction unit 310 holds local table data, the RAM 203 is also used for realizing the correction unit 310.

The result processing unit 311 executes certain appropriate processing by using the x-y coordinates of the point V. For example, the result processing unit 311 may send the point V to another device, may execute processing for the authentication by the DSA, or may execute processing for DH key agreement. The result processing unit 311 may be realized by the CPU 201, by the ECC hardware circuit 211, or by a combination of both. Further, in accordance with the content of the processing, the communication circuit 204, the communication I/F 205, and the like may further be used for realizing the result processing unit 311.

For example, when the cryptographic processing device 300 is included in an accessory part (such as a printer cartridge) to be authenticated by a host (such as a printer), the result processing unit 311 includes the communication circuit 204 and the communication I/F 205 for communicating with the host.

Subsequently, referring to FIGS. 9 and 10, explanation is given for the processing commonly executed by the cryptographic processing devices 300 of the first to third embodiments.

FIG. 9 is a flowchart of the processing in which the cryptographic processing device 300 of the first to third embodiments obtains the scalar multiple V=dA from the private key d and the point A. As mentioned above, the purpose for the cryptographic processing device 300 obtaining the scalar multiple V=dA is arbitrary; in other words, it is arbitrary how the result processing unit 311 utilizes the scalar multiple V.

In step S101, the processing unit 301 reads the private key d from the private key storage unit 304. The relationship between the bit length u of the private key d, the bit length b of the random value s, and the window size k is represented as formula (8.4) using the positive integer m.

$$u=b+km \qquad (8.4)$$

Therefore, the private key d is represented by formula (8.5).

$$d=d[u-1]\|d[u-2]\|\ldots\|d[1]\|d[0]=d[b+km-1]\|d[b+km-2]\|\ldots\|d[1]\|d[0] \qquad (8.5)$$

Next, in step S102, the processing unit 301 executes the preprocessing. The preprocessing in step S102 is linked with the post-processing in the later-mentioned steps S109 to S111 in pairs.

Specifically, the processing unit 301 obtains, as indicated in formula (8.6), the value e which results from shifting the private key d to the right by one bit so that the MSB equals zero. When formula (8.6) is represented in another format, it is as represented in formula (8.7). Hereinafter, the value e represented by formulae (8.6) and (8.7) is called a "dummy key" for convenience of explanation.

$$e = 0\|d[u-1]\|d[u-2]\| \ldots \|d[1]$$
$$= 0\|d[b+km-1]\|d[d+km-2]\| \ldots \|d[1] \quad (8.6)$$

$$e = \left\lfloor \frac{d}{2} \right\rfloor \quad (8.7)$$

Although the detailed explanation is given later, in the first to third embodiments, the carry correction is performed. There are some techniques for appropriately processing the carry correction value generated corresponding to the highest-order window value w[m−1]; the combination of the preprocessing of step S102 and the post-processing of steps S109 to S111 is one of these techniques. Other techniques are mentioned later.

From the definition of formula (8.6), the dummy key e is u bits long same as the private key d, and e[u−1], which is the MSB of the dummy key e, is always 0. Since the property wherein the MSB is 0 is conducive to the simplification of the processing of the later-mentioned step S106, in the first to third embodiments, the preprocessing of step S102 is executed.

The processing unit 301 further outputs d[0], which is the LSB of the private key d, to the correction unit 310.

Next, in step S103, the random number generation unit 305 generates the random value s and outputs the generated random value s to the processing unit 301 and the scalar multiplication unit 307. Then, the processing unit 301 uses the random value s to generate the window sequence w[i], the random number sequence s[i], and the correction value c from the dummy key e. Details of step S103 vary in accordance with the embodiments and specific explanation thereof is given later together with FIGS. 11, 19, and 24.

In any of the first to third embodiments, the processing unit 301 determines, in step S103, the window sequence w[i], the random number sequence s[i], and the correction value c under the constraint condition where formula (8.8) holds true, while determining each random value s[i] to be +s or −s.

$$d = 2\left(c + \sum_{i=0}^{m-1} (2^{ki+b}w[i] + 2^{ki}s[i])\right) + d[0] \quad (8.8)$$

Although formula (8.8) is similar to formula (8.1), it differs from formula (8.1) itself. Formula (8.8) reflects the contents of the preprocessing in step S102 and the post-processing in steps S109 to S111.

In other words, in the first to third embodiments, the processing unit 301 determines the window sequence w[i], the random number sequence s[i], and the correction value c under the constraint condition that formula (8.9), in which the private key d in formula (8.1) is replaced by the dummy key e, holds true.

$$e = c + \sum_{i=0}^{m-1} (2^{ki+b}w[i] + 2^{ki}s[i]) \quad (8.9)$$

Here, formula (8.10) holds true by the definition of formula (8.6). In addition, formula (8.8) is obtained by substituting formula (8.9) in formula (8.10). Therefore, the constraint condition that "formulae (8.8) and (8.10) hold true" is equivalent to the constraint condition that "formula (8.9) holds true".

$$d = 2e + d[0] \quad (8.10)$$

Subsequently, the processing unit 301 (in more detail, the determination unit 303) outputs the determined window sequence w[i] and the determined random number sequence s[i] to the window operation unit 309 and outputs the determined correction value c to the correction unit 310.

Then, in the next step, namely in step S104, the acquisition unit 306 acquires the x-y coordinates of the point A and outputs the x-y coordinates of the point A to the scalar multiplication unit 307 and the correction unit 310.

Subsequently, in the next step, namely in step S105, the scalar multiplication unit 307 generates the scalar multiple information (specifically, the randomized table data tab[h]= ($2^b$h+s)A), which depends on the random value s, for each index h within the appropriately predetermined range in accordance with the embodiments. The random value s, as mentioned above, is outputted from the random number generation unit 305 to the scalar multiplication unit 307 as well when the random value s is generated in step S103 by the random number generation unit 305.

In addition, the above-mentioned predetermined range is, specifically, $-2 \leq h \leq 2^{k-1}+1$ in the first embodiment, $-1 \leq h \leq 2^{k-1}+1$ in the second embodiment, and $-1 \leq h \leq 2^{k-1}$ in the third embodiment.

Further, in step S105, the scalar multiplication unit 307 outputs the randomized table data tab[h] to the scalar multiple information storage unit 308, while associating it with its index h. Then, the scalar multiple information storage unit 308 stores the randomized table data tab[h] in association with its index h.

Figure 10:
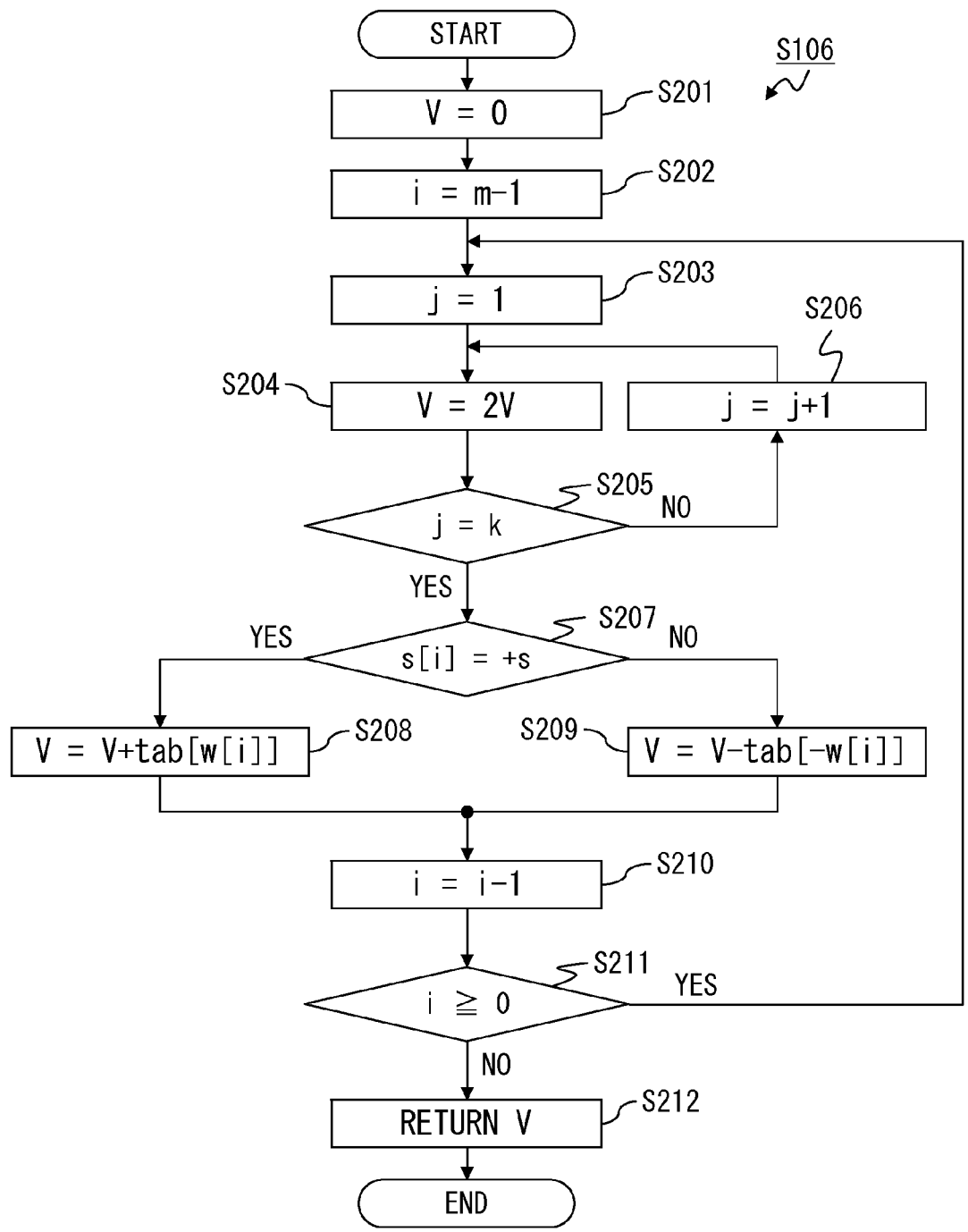
FIG. 10 is a flowchart of an operation which the cryptographic processing device of the first to third embodiments performs using the determined window sequence and random number sequence as well as generated scalar multiple information.

Then, in the next step, namely in step S106, the window operation unit 309 performs the operation illustrated in FIG. 10 using the window sequence w[i], the random number sequence s[i], and the randomized table data tab[h], and stores the calculation result in variable V. Hereinafter, the point represented by variable V is called the point V since there is no particular concern that there will be confusion. The window operation unit 309 reports the contents of variable V (i.e., the x-y coordinates of the point V) to the correction unit 310 after completion of the operation of FIG. 10.

In addition, in the next step, namely in step S107, the correction unit 310 calculates the x-y coordinates of the point cA from the correction value c and the x-y coordinates of the point A. The calculation in step S107 is performed by the simple window method, which is explained as the second comparative example, or by the signed window method, which is explained as the fourth comparative example.

Let the window size in step S107 be q. Specifically, the correction unit 310 creates a local table including $2^q$ entries, and using the data in the created table, calculates the x-y coordinates of the point cA by the window method. Alternatively, the correction unit 310 creates a local table including $2^{q-1}+1$ entries and, using the data in the created table, calculates the x-y coordinates of the point cA by the signed window method. The window size q may be the same as the window size represented as "k" in formula (8.4) or may be different from the window size k.

The reason that the simple window method or the signed window method is used in step S107 is as follows.

Even though the cryptographic processing device 300 may execute processing of FIG. 9 many times using the same private key d, the correction value c randomly changes in accordance with the random value s every time the processing of FIG. 9 is executed. Therefore, the calculation of the point cA is secure against a DPA attack. Also, as mentioned above, the window method and the signed window method are secure against an SPA attack. Accordingly, the correction unit 310 is able to ensure security against both an SPA attack and a DPA attack by calculating the point cA by the window method or the signed window method.

After calculating the point cA as mentioned above, in the next step, namely in step S108, the correction unit 310 adds the point cA to the point V, which is reported from the window operation unit 309, and stores the result of the addition in variable V. The point V obtained as a result of the processing of step S108 is the point eA because the window sequence w[i], the random number sequence s[i], and the correction value c, which are obtained in step S103, satisfy formula (8.9).

The subsequent steps, namely steps S109 to S111, constitute the post-processing corresponding to the preprocessing of step S102. Specifically, the correction unit 310, in step S109, performs the doubling of the point V, and newly stores the point 2V obtained as a result in variable V.

Then, in the next step, namely in step S110, the correction unit 310 judges whether the bit value d[0], which is reported from the processing unit 301, is 1 or not. If d[0]=1, the processing proceeds to step S111. On the contrary, if d[0]=0, then the processing proceeds to step S112.

The correction unit 310, in step S111, adds the point A to the point V and stores the result of the addition in variable V.

Supplementing the meaning of the post-processing in steps S109 to S111, it is as follows. From formula (8.10), formula (8.11) holds true.

$$dA=(2e+d[0])A=2(eA)+d[0]A \qquad (8.11)$$

As mentioned above, the point V at the completion of step S108 satisfies V=eA. Accordingly, the point V obtained as a result of the doubling in step S109 satisfies V=2(eA).

In addition, from the definition of scalar multiplication of formula (1.7), when d[0]=0, the point d[0]A is the point at infinity O, and as illustrated in formula (1.3), the point at infinity O is the zero element. Therefore, when d[0]=0, the point V=2(eA) obtained in step S109 is exactly the point dA according to formula (8.11). Accordingly, when judged that d[0]=0 in the above-mentioned step, namely in step S110, the process proceeds from step S110 to S112 because the addition in step S111 is unnecessary.

On the other hand, when d[0]=1, the point d[0]A is the point A itself. Therefore, when d[0]=1, the point obtained by adding the point A to the point V=2(eA), which is obtained in step S109, is the point dA according to formula (8.11). Accordingly, when judged that d[0]=1 in the above-mentioned step, namely in step S110, the addition of the point A is performed in step S111 and then the processing proceeds to step S112.

Finally, in step S112, the correction unit 310 outputs the x-y coordinates of the point V to the result processing unit 311. The point outputted in this way satisfies V=dA.

With that, the processing of FIG. 9 is completed; however, the execution order of the steps of FIG. 9 may appropriately be modified in accordance with the embodiments. For example, the acquisition of the point A in step S104 may be at any time as long as it is before step S105. Further, the execution order of steps S106 and S107 may be reversed or steps S106 and S107 may be executed in parallel.

In addition, the processing in step S103 includes the generation of the random value s as mentioned above; after the random value s is generated and outputted to the scalar multiplication unit 307, the remaining parts of step S103 and step S105 may be executed in parallel. Further in this case, after the generation of the random value s, step S106 may also be executed in parallel with step S103 if the processing of step S103 still continues even after step S105 is completed. For example, in parallel with the processing by the window operation unit 309 using the window value w[i] and the random value s[i] in step S106, the processing unit 301 may calculate the window value w[i−M] and the random value s[i−M] in step S103 (where M≥2).

FIG. 10 is a flowchart of the operation performed by the cryptographic processing devices of the first to third embodiments using the determined window sequence w[i] and random number sequence s[i] as well as the generated scalar multiple information. In other words, FIG. 10 is a flowchart of the processing of step S106 in FIG. 9. How the specific pieces of data are processed by the processing of FIG. 10 is mentioned later together with FIGS. 13, 21, and 26.

The window operation unit 309 initializes variable V with the point at infinity O in step S201.

Next, in step S202, the window operation unit 309 initializes the loop variable i to be (m−1). That is to say, the window operation unit 309 focuses on the highest-order window value w[m−1].

Subsequently, in step S203, the window operation unit 309 initializes the loop variable j for counting the number of doublings to be 1.

Next, in step S204, the window operation unit 309 performs the doubling of the point V, which is represented by variable V, and then stores the result of the doubling in variable V.

Next, in step S205, the window operation unit 309 judges whether the value of the variable j equals the window size k. When j≠k (i.e., in the case of j<k), the processing proceeds to step S206; when j≠k, the processing proceeds to step S207.

In step S206, the window operation unit 309 increments the value of the variable j by 1. Then the processing goes back to step S204. The processing of steps S203 to S206 as mentioned above is the processing of successively performing the doubling k times.

In addition, in step S207, the window operation unit 309 judges whether the random value s[i] equals the random value s. As already explained with regard to step S103 of FIG. 9, each random value s[i] is either +s or −s; therefore, the judgment in step S207 is, in other words, the judgment of whether s[i]=+s or whether s[i]=−s.

In the embodiment where the random value s is limited to not less than 0, the window operation unit 309 may refer to the sign of the random value s[i] and may judge that "when the sign indicates being positive, s[i]=+s, and when the sign indicates being negative, s[i]=−s". In addition, in the embodiment which uses the negative random value s, the window operation unit 309 is also able to judge whether or not the random value s[i] equals the random value s by simply comparing the sign of the random value s and the sign of the random value s[i].

When s[i]=+s, the processing proceeds to step S208 and when s[i]=−s, the processing proceeds to step S209.

In step S208, the window operation unit 309 refers to the scalar multiple information storage unit 308 using the window value w[i] as the index and thereby obtains the table data tab[w[i]], which corresponds to the window value w[i]. Then, the window operation unit 309 adds the point represented by the table data tab[w[i]] to the point V and stores the addition result as a new point V.

In other words, in step S208, the window operation unit 309 performs the operation of formula (8.12). Then, the processing proceeds to step S210.

$$V = V + \text{tab}[w[i]] \quad (8.12)$$

Meanwhile, in step S209, the window operation unit 309 refers to the scalar multiple information storage unit 308 using the value −w[i], which is obtained by reversing the sign of the window value w[i], as the index and thereby obtains the table data tab[−w[i]]. Then, the window operation unit 309 subtracts the point represented by the table data tab[−w[i]] from the point V and stores the subtraction result as a new point V. In other words, the window operation unit 309 calculates the inverse element of the point represented by the table data tab[−w[i]], adds the calculated inverse element to the point V, and stores the addition result as a new point V.

That is to say, in step S209, the window operation unit 309 performs the operation of formula (8.13). The processing then proceeds to step S210.

$$V = V - \text{tab}[-w[i]] \quad (8.13)$$

In step S210, the window operation unit 309 decrements the value of the loop variable i by 1. Then the processing proceeds to step S211.

In step S211, the window operation unit 309 judges whether or not the value of the loop variable i is not less than 0. When i≥0, the processing goes back to step S203 because not all pairs of the window value w[i] and the random value s[i] down to the lowest-order have been focused on yet. On the other hand, when i<0 (i.e., in the case of i=−1), the processing proceeds to step S212 because all pairs of the window value w[i] and the random value s[i] down to the lowest-order have already been focused on.

In step S212, the window operation unit 309 outputs the point V as a return value to the correction unit 310. Then, the processing of FIG. 10 is completed.

Figure 11:
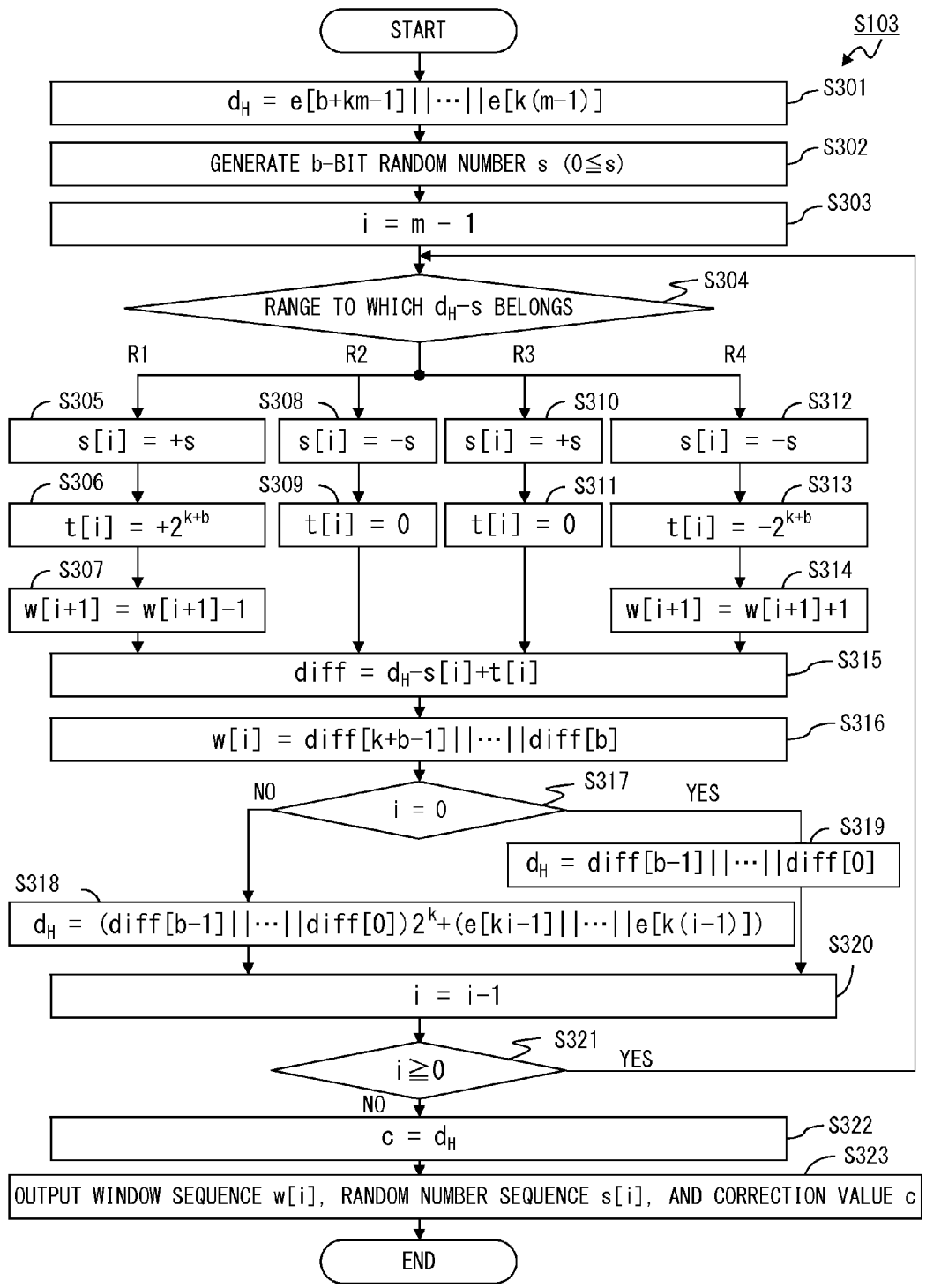
FIG. 11 is a flowchart of a process in which the cryptographic processing device in the first embodiment determines the window sequence, random number sequence, and correction value.

Next, explanation is given for the first embodiment. Concerning the first embodiment, first of all, the processing of FIG. 11, which corresponds to step S103 of FIG. 9, is explained. Subsequently, referring to FIGS. 12A to 13, which include the numerical examples of the private key d and the random value s, the specific example of the processing of FIGS. 9 to 11 is explained. Concerning the meaning of each step in FIG. 11, explanation is given later by referring to FIGS. 14 to 16.

FIG. 11 is a flowchart of the processing in which the cryptographic processing device 300 determines the window sequence w[i], the random number sequence s[i], and the correction value c in the first embodiment. That is to say, FIG. 11 is a flowchart of step S103 of FIG. 9 in the first embodiment.

In step S301, the judgment unit 302 initializes the signed (k+b)-bit value $d_H$ as illustrated in formula (9.1). That is, the judgment unit 302 sets the leading (k+b) bits of the dummy key e, which is obtained by the processing unit 301, as the signed (k+b)-bit value $d_H$.

$$d_H = e[b + km - 1] \| \ldots \| e[k(m-1)] \quad (9.1)$$

In the next step, namely in step S302, the random number generation unit 305 generates the b-bit random value s and outputs the random value s to the processing unit 301 and the scalar multiplication unit 307. For simplification of explanation, it is assumed that 0≤s in the first embodiment. Concerning the case where the random value s is negative, explanation is given later as a modification of the first embodiment.

Accordingly, the random value s generated in step S302 satisfies formula (9.2).

$$0 \leq s \leq 2^b - 1 \quad (9.2)$$

In the next step, namely in step S303, the processing unit 301 initializes the loop variable i to be (m−1). Then, the processing proceeds to step S304.

In step S304, the judgment unit 302 in the processing unit 301 calculates the value of the criterion value ($d_H$−s), judges to which range of the ranges R1 to R4 below the calculated value belongs, and reports the judgment result to the determination unit 303.

Range R1: not greater than $-2^{k+b-1}$
Range R2: not less than $(-2^{k+b-1}+1)$ and not greater than −1
Range R3: not less than 0 and not greater than $(2^{k+b-1}-1)$
Range R4: not less than $2^{k+b-1}$ When the criterion value ($d_H$−s) is included in the range R1, the processing proceeds to step S305. When the criterion value ($d_H$−s) is included in the range R2, the processing proceeds to step S308. When the criterion value ($d_H$−s) is included in the range R3, the processing proceeds to step S310. When the criterion value ($d_H$−s) is included in the range R4, the processing proceeds to step S312. Concerning the meaning of the judgment in step S304, explanation is given later together with FIGS. 15 and 16.

Here, it is arbitrary in accordance with the embodiments whether the boundary value $-2^{k+b-1}$ of the ranges R1 and R2 is included in the range R1 or the range R2, whether the boundary value 0 of the ranges R2 and R3 is included in the range R2 or the range R3, and whether the boundary value $2^{k+b-1}$ of the ranges R3 and R4 is included in the range R3 or the range R4. However, the preferable definition is as mentioned above. The reason is that the above-mentioned definition of the ranges R1 to R4 makes it possible to simplify the processing as below and thereby achieves the effect of shortening the time period taken for the judgment unit 302's executing step S304 in accordance with the simplified processing.

That is to say, for simplification of the processing of step S304, the judgment unit 302 may judge the range in which the criterion value ($d_H$−s) is included by checking the sign of the criterion value ($d_H$−s) and the value of the (k+b−1)-th bit (i.e., the MSB) of the criterion value ($d_H$−s).

Specifically, the criterion value ($d_H$−s) is included in the range R1 when its sign is negative and the value of its MSB is 1. The criterion value ($d_H$−s) is included in the range R2 when its sign is negative and the value of its MSB is 0. The criterion value ($d_H$−s) is included in the range R3 when its sign is positive and the value of its MSB is 0. The criterion value ($d_H$−s) is included in the range R4 when its sign is positive and the value of its MSB is 1.

In the first embodiment, the processing of FIG. 11 is executed with respect to the dummy key e instead of the private key d. And since the dummy key e is the value obtained as illustrated in formula (8.6) from the private key d, which is the unsigned positive value, it holds true that 0≤e[b+km−1]∥ . . . ∥e[k(m−1)]=0∥ . . . ∥e[k(m−1)]≤$2^{k+b-1}$−1. Therefore, from the definition of the criterion value ($d_H$−s), the criterion value ($d_H$−s) is included in the range R2 or the range R3 when i=m−1. Accordingly, the carry correction in step S307 or S314 as mentioned below does not occur when i=m−1.

The first embodiment is so designed as to simplify the processing of FIG. 10, which corresponds to step S106 of FIG. 9, by guaranteeing that no carry correction occurs when i=m−1 as mentioned above. In other words, the guarantee that no carry correction occurs when i=m−1 allows the initialization of step S201 of FIG. 10 to be the simple processing of setting variable V as the point at infinity O.

In other words, in the first embodiment, by using the dummy key e, it is guaranteed that the carry correction value corresponding to the highest-order window value w[m−1] is 0. Under this guarantee, appropriate processing for the highest-order carry correction value is "to do nothing". In this way, in the first embodiment, the appropriate handling of the carry correction value is realized by the preprocessing of step S102 of FIG. 9 and the post-processing of steps S109 to S111 accompanying the introduction of the dummy key e.

In step S305, the determination unit 303 determines the random value s[i] to be +s. In addition, in the next step, namely in step S306, the determination unit 303 determines the window correction value t[i] to be $+2^{k+b}$.

In the subsequent step, namely in step S307, the determination unit 303 performs the carry correction to the window value w[i+1], whose order is higher by one order, to offset the effect of the window correction value $t[i]=2^{k+b}$. That is to say, the determination unit 303 decrements the window value w[i+1] by 1.

The execution order of steps S305 to S307 as mentioned above may be permuted arbitrarily and steps S305 to S307 may be executed in parallel. After the execution of steps S305 to S307, the processing proceeds to step S315.

Meanwhile, in step S308, the determination unit 303 determines the random value s[i] to be −s. In the next step, namely in step S309, the determination unit 303 determines the window correction value t[i] to be 0.

The execution order of steps S308 and S309 may be permuted arbitrarily and steps S308 and S309 may be executed in parallel. After the execution of steps S308 and S309, the processing proceeds to step S315.

Meanwhile, in step S310, the determination unit 303 determines the random value s[i] to be +s. In the next step, namely in step S311, the determination unit 303 determines the window correction value t[i] to be 0.

The execution order of steps S310 and S311 may be permuted arbitrarily and steps S310 and S311 may be executed in parallel. After the execution of steps S310 and S311, the processing proceeds to step S315.

Meanwhile, in step S312, the determination unit 303 determines the random value s[i] to be −s. In the next step, namely in step S313, the determination unit 303 determines the window correction value t[i] to be $−2^{k+b}$.

In the subsequent step, namely in step S314, the determination unit 303 performs the carry correction to the window value w[i+1], whose order is higher by one order, to offset the effect of the window correction value $t[i]=−2^{k+b}$. That is to say, the determination unit 303 increments the window value w[i+1] by 1.

The execution order of steps S312 to S314 as mentioned above may be permuted arbitrarily and steps S312 to S314 may be executed in parallel. After the execution of steps S312 to S314, the processing proceeds to step S315.

And in step S315, the determination unit 303 calculates the corrected difference value diff which is the signed (k+b)-bit value illustrated in formula (9.3). In addition, the determination unit 303 feeds back the corrected difference value diff to the judgment unit 302.

$$\text{diff}=d_H-s[i]+t[i] \quad (9.3)$$

In the subsequent step, namely in step S316, the determination unit 303 sets the most significant k bits of the corrected difference value diff as the window value w[i]. In other words, the window value w[i] is as illustrated in formula (9.4). By the definition of the signed N-bit value, the sign of the window value w[i] equals the sign of the corrected difference value diff.

$$w[i]=\text{diff}[k+b-1]\|\ldots\|\text{diff}[b] \quad (9.4)$$

Then, in step S317, the processing unit 301 judges whether the value of the loop variable i is 0 or not. When the value of the loop variable i is not 0 (i.e., when i>0), the processing proceeds to step S318. On the other hand, when the value of the loop variable i is 0, the processing proceeds to step S319.

In step S318, the judgment unit 302 extracts the least significant b bits of the corrected difference value diff and calculates the value which is obtained by adding k bits from the (ki−1)-th bit to k (i−1)-th bit of the dummy key e to $2^k$ times the extracted signed b-bit value. And the judgment unit 302 newly stores the calculated value as the signed (k+b)-bit value $d_H$. That is, in preparation for the next judgment, the judgment unit 302 updates the signed (k+b)-bit value $d_H$ according to formula (9.5).

$$d_H=(\text{diff}[b-1]\|\ldots\|\text{diff}[0])2^k+(e[ki-1]\|\ldots\|e[k(i-1)]) \quad (9.5)$$

Meanwhile, in step S319, the judgment unit 302 newly stores the least significant b bits of the corrected difference value diff as the signed (k+b)-bit value $d_H$. That is, the judgment unit 302 updates the signed (k+b)-bit value $d_H$ according to formula (9.6).

$$d_H=\text{diff}[b-1]\|\ldots\|\text{diff}[0] \quad (9.6)$$

After the update of the signed (k+b)-bit value $d_H$ in step S318 or step S319, the processing proceeds to step S320. Then in step S320, the processing unit 301 decrements the loop variable i by 1.

In addition, in the next step, namely in step S321, the processing unit 301 judges whether or not the value of the loop variable i is not less than 0. When i≥0, the processing goes back to step S304; when i<0, the processing proceeds to step S322.

In step S322, the judgment unit 302 reports the signed (k+b)-bit value $d_H$ obtained by formula (9.6) to the determination unit 303. Then, the determination unit 303 determines that the signed (k+b)-bit value $d_H$ be the correction value c as illustrated in formula (9.7).

$$c=d_H \quad (9.7)$$

Then, in the next step, namely in step S323, the determination unit 303 outputs the determined window sequence w[i] and the determined random number sequence s[i] to the window operation unit 309 and outputs the determined correction value c to the correction unit 310. The processing of FIG. 11 is thus completed.

Subsequently, taking the specific numerical values as examples, further detailed explanation is given for the first embodiment, referring to FIGS. 12A to 12B.

Assume that the dummy key e, which is obtained by the processing unit 301 in step S102 of FIG. 9, is the 15-bit value as illustrated in formula (9.8). The specific examples of the private key d corresponding to formula (9.8) are mentioned later together with FIG. 13.

$$e=(010110010010101)_2=11413 \quad (9.8)$$

Subsequently, the processing of FIG. 11, which corresponds to step S103 of FIG. 9, is started. In the example of FIGS. 12A to 12B, let the window size k be 3, and let the bit length b of the random value s be 6. Therefore, m=3 as illustrated in formula (9.9).

$$m=(u-b)/k=(15-6)/3=3 \quad (9.9)$$

When the processing of FIG. 11 is started, the judgment unit 302, in step S301, initializes the signed (k+b)-bit value $d_H$ as illustrated in formula (9.10).

$$d_H = e[14] \| \ldots \| e[6] = (010110010)_2 = 178 \quad (9.10)$$

In addition, it is assumed that the random number generation unit 305, in step S302, generates the value of formula (9.11) as the b(=6)-bit random value s.

$$s = (001101)_2 = 13 \quad (9.11)$$

Then, in the next step, namely in step S303, the processing unit 301 initializes the loop variable i to be 2 (=m−1) according to formula (9.9). And the judgment unit 302, in step S304, calculates the criterion value ($d_H$−s) as illustrated in formula (9.12) according to formulae (9.10) and (9.11).

$$d_H - s = 178 - 13 = 165 = (010100101)_2 = (010\|100101)_2 \quad (9.12)$$

The criterion value ($d_H$−s) of formula (9.12) is positive. In addition, the MSB of the criterion value ($d_H$−s) is 0. Accordingly, the criterion value ($d_H$−s) belongs to the range R3.

Therefore, the determination unit 303, in step S310, determines the random value s[2] to be +s as illustrated in formula (9.13) and, in step S311, determines the window correction value t[2] to be 0 as illustrated in formula (9.14). Since the window correction value t[2] is 0, no carry correction is performed.

$$s[2] = +s = 13 = (001101)_2 \quad (9.13)$$

$$t[2] = 0 = (0000000000)_2 \quad (9.14)$$

Then, the determination unit 303, in step S315, calculates the corrected difference value diff, according to formula (9.3), specifically as illustrated in formula (9.15).

$$\begin{aligned} \text{diff} &= d_H - s[2] + t[2] \\ &= 178 - 13 + 0 \\ &= 165 \\ &= 2 \times 2^6 + 37 \\ &= (010100101)_2 \\ &= (010\|100101)_2 \end{aligned} \quad (9.15)$$

Further, the determination unit 303, in step S316, calculates the window value w[2] as illustrated in formula (9.16). Note that the window value w[2] obtained here has not been settled. The reason is that there is a potential possibility that the window value w[2] will be incremented or decremented by the carry correction at the stage where the loop variable i becomes 1 later.

$$w[2] = \text{diff}[8]\|\text{diff}[7]\|\text{diff}[6] = (010)_2 = 2 \quad (9.16)$$

In addition, since i=2, the processing proceeds to step S318. In step S318, the judgment unit 302 updates the signed (k+b)-bit value $d_H$ according to formula (9.5), specifically as illustrated in formula (9.17).

$$\begin{aligned} d_H &= (\text{diff}[5]\|\ldots\|\text{diff}[0])2^3 + (e[5]\|\ldots\|e[3]) \\ &= 37 \times 2^3 + (010)_2 \\ &= 296 + 2 \end{aligned} \quad (9.17)$$

$$= 298$$

$$= (100101010)_2$$

Then, since the processing unit 301 decrements the loop variable i in step S320, i≥1. Since the processing goes back from step S321 to step S304.

In step S304, the judgment unit 302 calculates the criterion value ($d_H$−s) as illustrated in formula (9.18) using the signed (k+b)-bit value $d_H$ as updated in formula (9.17).

$$(d_H - s) = 298 - 13 = 285 = (100\|011101)_2 \quad (9.18)$$

The criterion value ($d_H$−s) in formula (9.18) is positive and its MSB is 1. Therefore, the criterion value ($d_H$−s) belongs to the range R4.

Accordingly, in step S312, the determination unit 303 determines the random value s[1] to be −s as illustrated in formula (9.19), and in step S313, determines the window correction value t[1] to be $-2^{k+b}$ as illustrated in formula (9.20).

$$s[1] = -s = -13 = -(001101)_2 \quad (9.19)$$

$$t[1] = -2^{3+6} = -512 = -(1000000000)_2 \quad (9.20)$$

And since the window correction value t[1] is a nonzero value, in step S314, the determination unit 303 performs the carry correction. That is to say, the determination unit 303 adds 1 to the window value w[2] obtained in formula (9.16). As a result, it is settled that the window value w[2] is the value of formula (9.21).

$$w[2] = 2 + 1 = 3 \quad (9.21)$$

And in step S315, the determination unit 303 calculates the corrected difference value diff, according to formula (9.3), specifically as illustrated in formula (9.22).

$$\begin{aligned} \text{diff} &= d_H - s[1] + t[1] \\ &= 298 + 13 - 512 \\ &= -201 \\ &= -3 \times 2^6 - 9 \\ &= -(011001001)_2 \\ &= -(011\|001001)_2 \end{aligned} \quad (9.22)$$

Further, in step S316, the determination unit 303 calculates the window value w[1] as illustrated in formula (9.23). Note that the window value w[1] obtained here has not yet been settled because there is a potential possibility that the carry correction will be applied to the window value w[1] later.

$$w[1] = \text{diff}[8]\|\text{diff}[7]\|\text{diff}[6] = -(011)_2 = -3 \quad (9.23)$$

Then, the processing proceeds to step S318 since i=1. And in step S318, the judgment unit 302 updates the signed (k+b)-bit value $d_H$, according to formula (9.5), specifically as illustrated in formula (9.24).

$$\begin{aligned} d_H &= (\text{diff}[5]\|\ldots\|\text{diff}[0])2^3 + (e[2]\|\ldots\|e[0]) \\ &= -9 \times 2^3 + (101)_2 \\ &= -72 + 5 \end{aligned} \quad (9.24)$$

-continued $$= -67$$

$$= -(001000011)_2$$

And then, since the processing unit 301 decrements the loop variable i in step S320, i=0. Since the processing goes back from step S321 to step S304.

In step S304, the judgment unit 302 calculates the criterion value ($d_H$–s) as illustrated in formula (9.25) using the signed (k+b)-bit value $d_H$ as updated in formula (9.24).

$$d_H-s=-67-13=-80=-(001\|010000)_2 \qquad (9.25)$$

The criterion value ($d_H$–s) of formula (9.25) is negative, and its MSB is 0. Therefore, the criterion value ($d_H$–s) belongs to the range R2.

Accordingly, the determination unit 303 determines the random value s[0] to be –s as illustrated in formula (9.26) in step S308, and determines the window correction value t[0] to be 0 as illustrated in formula (9.27) in step S309.

$$s[0]=-s=-13=-(001101)_2 \qquad (9.26)$$

$$t[0]=0=(0000000000)_2 \qquad (9.27)$$

Since the window correction value t[0] is 0, naturally, the carry correction is not performed. In other words, the determination unit 303 sets the carry correction value to 0 implicitly. Therefore, it is settled that the window value w[1], whose order is higher by one order, is –3, namely the value illustrated in formula (9.23).

Further, in step S315, the determination unit 303 calculates the corrected difference value diff according to formula (9.3), specifically as illustrated in formula (9.28).

$$\text{diff} = d_H - s[0] + t[0] \qquad (9.28)$$

$$= -67 + 13 + 0$$

$$= -54$$

$$= -(000\|110110)_2$$

Further, in step S316, the determination unit 303 calculates the window value w[0] as illustrated in formula (9.29). Since the window value w[0] is the lowest-order window value, no carry correction is applied thereto and the value is settled here.

$$w[0]=\text{diff}[8]\|\text{diff}[7]\|\text{diff}[6]=-(000)_2=(000)_2=0 \qquad (9.29)$$

In addition, since i=0, the processing proceeds to step S319. Then, in step S319, the judgment unit 302 updates the signed (k+b)-bit value $d_H$ according to formula (9.6), specifically as illustrated in formula (9.30).

$$d_H=(\text{diff}[5]\|\ldots\|\text{diff}[0])=-(110110)_2=-54 \qquad (9.30)$$

Then, since the processing unit 301 decrements the loop variable i in step S320, i=–1. Accordingly, the processing proceeds from step S321 to step S322 since i<0. Therefore, in step S322, the determination unit 303 obtains the correction value c as illustrated in formula (9.31).

$$c=d_H=-54 \qquad (9.31)$$

Finally, in step S323, the determination unit 303 outputs the window sequence w[i] illustrated in formula (9.32) and the random number sequence s[i] illustrated in formula (9.33) to the window operation unit 309 and outputs the correction value c illustrated in formula (9.31) to the correction unit 310.

Formula (9.32) is clear from formulae (9.21), (9.23), and (9.29), and formula (9.33) is clear from formulae (9.13), (9.19), and (9.26).

$$w[2]=3, w[1]=-3, w[0]=0 \qquad (9.32)$$

$$s[2]=13, s[1]=-13, s[0]=-13 \qquad (9.33)$$

When the processing of FIG. 11, which corresponds to step S103 of FIG. 9, is completed as mentioned above, in step S104 of FIG. 9, the acquisition unit 306 acquires the x-y coordinates of the point A. Then, in step S105, the scalar multiplication unit 307 generates the randomized table data tab[h] of formula (9.34) as scalar multiple information in accordance with the random value s=13 (see formula (9.11)) for each index h within the range of $-2\leq h\leq 2^{k-1}+1=5$.

$$\text{tab}[h]=(2^b h+s)A=(2^6 h+13)A=(64h+13)A \qquad (9.34)$$

Then, the scalar multiple information storage unit 308 stores the generated randomized table data tab[h] in association with the index h.

FIG. 13 illustrates the window sequence w[i], the random number sequence s[i], and the correction value c obtained as mentioned above, and FIG. 13 also illustrates a table 104 in which the scalar multiple information storage unit 308 holds the randomized table data tab[h].

According to the processing as explained above referring to FIGS. 11 to 12B, formula (8.9) holds true as illustrated in FIG. 13. Specifically, when the values of k=3, b=6, m=3, e=11413, which are exemplified in the example of FIGS. 12A to 12B, and the values illustrated in formulae (9.31) to (9.33) are substituted for the respective variables in formula (8.9), the following formula, namely formula (9.35), is obtained.

$$c + 2^6 w[0] + 2^0 s[0] + 2^9 w[1] + 2^3 s[1] + 2^{12} w[2] + 2^6 s[2] = \qquad (9.35)$$

$$-54 + 64\times 0 + 1\times(-13) + 512\times(-3) +$$

$$8\times(-13) + 4096\times 3 + 64\times 13 = 11413$$

In addition, as illustrated in formula (9.34), in the table 104 of FIG. 13, the x-y coordinates of each of the scalar multiples –115A, –51A, 13A, 77A, 141A, 205A, 269A, and 333A are stored corresponding to each index h within the range of $-2\leq h\leq 5$.

Accordingly, the x-y coordinates of the scalar multiple dA are calculated as illustrated in formula (9.36) by the processing of FIG. 10, which corresponds to step S106 of FIG. 9, and by steps S107 to S111 of FIG. 9.

$$dA=2(2^3(2^3(2^3(O)+\text{tab}[w[2]])-\text{tab}[-w[1]])-\text{tab}[-w[0]]+cA)+d[0]A \qquad (9.36)$$

That is to say, the point at infinity O in formula (9.36) corresponds to the initialization of step S201 of FIG. 10. In addition, the factors "$2^3$" in formula (9.36) correspond to the k(=3) doublings performed in steps S203 to S206 of FIG. 10.

Since s[2]=+s from formula (9.33), step S208 is executed when i=2, and this corresponds to "+tab[w[2]]" in formula (9.36). Similarly, since s[1]=–s from formula (9.33), step S209 is executed when i=1, and this corresponds to "–tab[–w[1]]" in formula (9.36). Further, since s[0]=–s from formula (9.33), step S209 is executed when i=0, and this corresponds to "–tab[–w[0]]" in formula (9.36).

Then, "+cA" in formula (9.36) corresponds to steps S107 to S108 in FIG. 9. And the first "2" on the right-hand side of formula (9.36) corresponds to the doubling of step S109 of FIG. 9 and "+d[0]A" of formula (9.36) corresponds to steps S110 to S111 of FIG. 9.

When the part which represents the target of the doubling of step S109 on the right-hand side of formula (9.36) is modified, the following formula, namely formula (9.37), is obtained. Formula (9.37) also illustrates that formula (8.9) holds true in the first embodiment.

$$2^3(2^3(2^3(O) + \text{tab}[3]) - \text{tab}[3]) - \text{tab}[0] + cA = \quad (9.37)$$
$$8(8(O + 205A) - 205A) - 13A - 54A =$$
$$8(1640A - 205A) - 67A = 8(1435A) - 67A = 11413A$$

And as exemplified in FIG. 13, the dummy key e of formula (9.8) is obtained from the private key d illustrated in formula (9.38) or (9.39). In FIG. 13, as an example, the private key d of formula (9.38) is illustrated.

$$d=(101100100101010)_2=22826 \quad (9.38)$$

$$d=(101100100101011)_2=22827 \quad (9.39)$$

When the private key d is indicated by formula (9.38), d[0]=0 according to formula (9.38); therefore, formula (9.40) is obtained by substituting formula (9.37) on the right-hand side of formula (9.36).

$$2(11413A)+d[0]A=22826A+O=22826A=dA \quad (9.40)$$

Meanwhile, when the private key d is indicated by formula (9.39), d[0]=1 according to formula (9.39); therefore, formula (9.41) is obtained by substituting formula (9.37) on the right-hand side of formula (9.36).

$$2(11413A)+d[0]A=22826A+A=22827A=dA \quad (9.41)$$

From the above, according to the first embodiment, the desired point dA is actually obtained by the processing illustrated in FIGS. 9 to 11.

In the first embodiment, as explained with respect to step S105 of FIG. 9, the range of the index h corresponding to the scalar multiple information tab[h] stored in the scalar multiple information storage unit 308 is $-2 \leq h \leq 2^{k-1}+1$. Therefore, in the first embodiment, the number of entries in the table held by the scalar multiple information storage unit 308 is ($2^{k-1}+4$).

FIG. 14 compares the first embodiment, the third comparative example, and the fourth comparative example with respect to the number of entries of the table data where the window size k is 3. In FIG. 14, the table 105 is the table in which the scalar multiple information storage unit 308 stores the scalar multiple information in the first embodiment. Since k=3, in the table 105, the x-y coordinates of the point $(h \times 2^b + s)A$ are stored as the table data tab[h] for each index h where $-2 \leq h \leq 2^{3-1}+1=5$. That is to say, the number of entries in the table 105 is 8.

In addition, the table 106 is the table in the case where the window size k is 3 in the signed window method, which is explained as the fourth comparative example. In the table 106, the x-y coordinates of the point hA are stored as the table data tab[h] for each index h where $0 \leq h \leq 2^{3-1}=4$. That is to say, the number of entries in the table 106 is 5.

In addition, the table 107 is the table in the case where the window size k is 3 in the randomized window method, which is explained as the third comparative example. In the table 107, the x-y coordinates of the point $(h \times 2^b + s)A$ are stored as the table data tab[h] for each index h where $0 \leq h \leq 2^3 - 1 = 7$. That is to say, the number of entries in the table 107 is 8.

When the tables 105 to 107 as mentioned above are compared, the table 106 of the signed window method has an advantage in that the number of entries is less than that in the table 105; however, the signed window method has the disadvantage of being vulnerable to a DPA attack. On the other hand, the table 105 according to the first embodiment, when compared with the table 106, has the three more entries which correspond to the three indexes, h=−2, h=−1, and h=$2^{k-1}+1$. However, the first embodiment is superior to the signed window method in that it provides a secure method against a DPA attack as well. Further, the table 105 according to the first embodiment and the table 106 share in common the feature that the number of entries is in the order of $2^{k-1}$.

Further, the number of entries in the table 107 of the randomized window method is in the order of $2^k$. When k=3 as mentioned above, the numbers of entries in the tables 106 and 107 are the same; however, when k≥4, the number of entries in the table in the first embodiment is smaller than the number of entries in the table of the randomized window method owing to the difference in order. Accordingly, the first embodiment has a remarkable effect of realizing both security against a PA attack and reduction in the memory usage.

The three entries increased in the table 105 compared with the table 106, that is, the entries which correspond to the three indexes h=−2, h=−1, and h=$2^{k-1}+1$, play the role of absorbing errors generated by the random numbers. Hereinafter, explanation is given for the reason why the range of the index h of the scalar multiple information is $-2 \leq h \leq 2^{k-1}+1$ as well as the meaning of the judgment of step S304 of FIG. 11 by referring to FIGS. 15 to 16.

As mentioned above, in step S304 of FIG. 11, the determination unit 303 calculates the criterion value ($d_H - s$). This calculation of the criterion value ($d_H - s$) semantically corresponds to estimation of the window value w[i] under the assumption that the random value s[i] equals +s. The reason for this is as follows.

When FIG. 4 is interpreted after replacing the private key d in FIG. 4 with the dummy key e in consideration of the preprocessing, the signed (k+b)-bit value $d_H$ corresponds to (w[i]∥s[i]) of FIG. 4. Accordingly, the window value w[i] is constituted by the most significant k bits of the value obtained by subtracting the random value s[i] from the signed (k+b)-bit value $d_H$. Therefore, the window value w[i] estimated under the presupposition that s[i]=+s is constituted by the most significant k bits of the criterion value ($d_H - s$), which is obtained by subtracting the random value s from the signed (k+b)-bit value $d_H$.

Meanwhile, in the first embodiment, as illustrated in FIG. 3, the processing unit 301 attempts to make the absolute value of the window value w[i] not greater than $2^{k-1}$, thereby intending to reduce the memory consumption amount of the scalar multiple information storage unit 308. Accordingly, the processing unit 301 of the first embodiment specifically estimates the window value w[i] under the presupposition that the "random value s[i] is +s" and, in accordance with the estimated window value w[i], judges whether the presupposition is appropriate or not. Then, the processing unit 301 determines the random value s[i] to be +s by formally employing the above-mentioned presupposition or determines the random value s[i] to be −s in accordance with the result of the judgment.

Subsequently, it is described how the estimation under the presupposition that s[i]=+s as explained above, the determination of the window value w[i] and the random value s[i] in accordance with the estimated result, and the range of the index h of the scalar multiple information are related to each other, in reference to FIGS. 15 to 16.

FIG. 15 schematically explains the range of the values used as an index of the scalar multiple information storage unit in the first embodiment. FIG. 15 illustrates an example where the window size k is 2 and the length b of the random value s is 3.

From the definition of the ranges R1 to R4 explained with respect to step S304 of FIG. 11, the criterion value ($d_H$−s), which is the signed 5(=k+b)-bit value, belongs to the range R1 when it satisfies formula (9.42) (to be more specific, when it satisfies formula (9.43)).

$$-2^{k+b}+1 \le d_H-s \le -2^{k+b-1} \qquad (9.42)$$

$$2^5+1=-(100000)_2+1 \le d_H-s \le 2^4=-(10000)_2 \qquad (9.43)$$

In FIG. 15, the criterion value ($d_H$−s) belonging to the range R1 is illustrated by rectangle E101. A white dot at the left end of rectangle E101 illustrates that −32 (=−$2^5$=−$2^{k+b}$) is not included in the range R1, and a black dot at the right end of rectangle E101 illustrates that −16(=−$2^4$=−$2^{k+b-1}$) included in the range R1. The white dots or the black dots at the left end or the right end of the other rectangles illustrate a similar meaning.

In addition, the criterion value ($d_H$−s) belongs to the range R2 when it satisfies formula (9.44) (to be more specific, when it satisfies formula (9.45)). In FIG. 15, the criterion value ($d_H$−s) belonging to the range R2 is illustrated by rectangle E102.

$$-2^{k+b-1}+1 \le d_H-s \le -1 \qquad (9.44)$$

$$-2^4+1=-(01111)_2 \le d_H-s \le -1=-(00001)_2 \qquad (9.45)$$

In addition, the criterion value ($d_H$−s) belongs to the range R3 when it satisfies formula (9.46) (to be more specific, when it satisfies formula (9.47)). In FIG. 15, the criterion value ($d_H$−s) belonging to the range R3 is illustrated by rectangle E103.

$$0 \le d_H-s \le 2^{k+b-1}-1 \qquad (9.46)$$

$$0 \le d_H-s \le 2^4-1=(01111)_2 \qquad (9.47)$$

In addition, the criterion value ($d_H$−s) belongs to the range R4 when it satisfies formula (9.48) (to be more specific, when it satisfies formula (9.49)). In FIG. 15, the criterion value ($d_H$−s) belonging to the range R4 is illustrated by rectangle E104.

$$2^{k+b-1} \le d_H-s \le 2^{k+b}-1 \qquad (9.48)$$

$$2^4 \le (10000)_2 \le d_H-s \le 2^5-1=(11111)_2 \qquad (9.49)$$

Subsequently, in the order of the ranges R3, R1, R2, and R4, explanation is given for the relationship between the above-mentioned ranges of the criterion value ($d_H$−s) illustrated by rectangles E101 to E104 and the range of the window value w[i].

As illustrated by rectangle E103 of FIG. 15, when the criterion value ($d_H$−s) belongs to the range R3, the sign of the criterion value ($d_H$−s) is positive, and the value of the MSB of the criterion value ($d_H$−s) is 0. In addition, the window value w[i] estimated under the presupposition that s[i]=+s is constituted by the most significant k bits of the criterion value ($d_H$−s). Therefore, when the criterion value ($d_H$−s) belongs to the range R3, the window value w[i] estimated under the presupposition that s[i]=+s has the positive sign and has an absolute value which is not less than 0 and is less than $2^{k-1}$.

That is to say, when the criterion value ($d_H$−s) belongs to the range R3, the window value w[i] estimated under the presupposition that s[i]=+s does not need any window correction. Therefore, naturally, the carry correction value is also 0. And since such a desirable window value w[i] is obtained, the presupposition that s[i]=+s is appropriate. Accordingly, the determination unit 303 performs the processing of steps S310 to S311 of FIG. 11 when the criterion value ($d_H$−s) belongs to the range R3.

As a result, as illustrated by rectangle E113 in FIG. 15, the range of the corrected difference value diff, which is calculated by the determination unit 303 in step S315, is exactly the same as the range R3, which corresponds to rectangle E103. Therefore, the window value w[i] calculated to be the most significant k bits of the corrected difference value diff in step S316 is not less than 0 and not greater than $2^{k-1}$−1 (when k=2 as illustrated in FIG. 15, not less than 0 and not greater than 1).

In addition, as illustrated by rectangle E101 in FIG. 15, when the criterion value ($d_H$−s) belongs to the range R1, the absolute value of the criterion value ($d_H$−s) is not less than $2^{k+b-1}$. That is to say, the absolute value of the window value w[i] estimated under the presupposition that s[i]=+s is not less than $2^{k-1}$. Accordingly, in this case, in order to reduce the memory usage of the scalar multiple information storage unit 308, it is appropriate to perform the window correction. When the criterion value ($d_H$−s) belongs to the range R1, the sign of the criterion value ($d_H$−s) is negative; therefore, the window correction in this case is, specifically, a correction of adding a positive number.

Figure 12A:
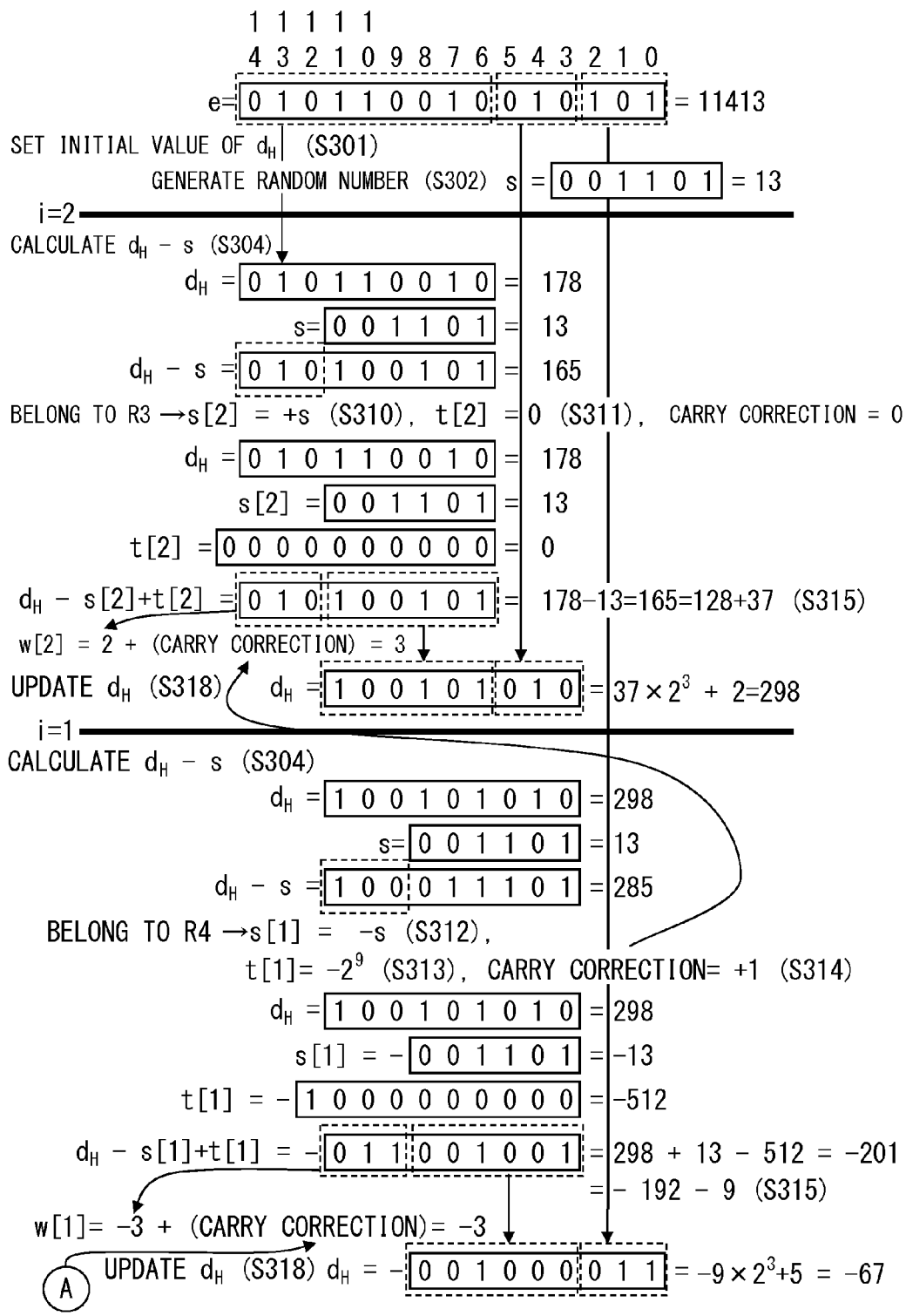
FIG. 12A is one (No. 1) of figures for illustrating a specific example of the window sequence, random number sequence, and correction value determined in the first embodiment.

The correction of adding $2^k$ to the signed k-bit window value w[i] is, as understood from FIGS. 4, 12A, and 12B, equivalent to the correction of adding $2^{k+b}$ to the signed (k+b)-bit value (w[i]||s[i]). Therefore, when the criterion value ($d_H$−s) belongs to the range R3, the determination unit 303 determines the window correction value t[i] to be $2^{k+b}$, as illustrated in step S306 of FIG. 11. Note that this positive window correction value t[i]=$2^{k+b}$ offsets the negative carry correction value (i.e., −1) to the window value w[i+1], whose order is higher by one order.

According to formula (9.42), the value obtained by adding the window correction value t[i]=$2^{k+b}$ to the criterion value ($d_H$−s) is included in the range of formula (9.50).

$$-2^{k+b}+1+2^{k+b}=1 \le d_H-s+t[i] \le -2^{k+b-1}+2^{k+b}=2^{k+b-1} \qquad (9.50)$$

The range of not less than 1 and not greater than $2^{k+b-1}$ illustrated in formula (9.50) is illustrated by rectangle E111 in FIG. 15. The range illustrated by rectangle E111 is the same as the above-mentioned range illustrated by rectangle E113, excluding both end points. In other words, when the criterion value ($d_H$−s) belongs to the range R1, the window value w[i] estimated under the presupposition that s[i]=+s becomes the preferable value with the positive sign and with an absolute value of not greater than $2^{k-1}$ by being corrected by the window correction value t[i]=$2^{k+b}$.

Therefore, when the criterion value ($d_H$−s) belongs to the range R1, the presupposition that s[i]=+s is appropriate. Accordingly, the determination unit 303 formally determines s[i]=+s as illustrated in step S305 of FIG. 11. In addition, as mentioned above, the determination unit 303 determines the window correction value t[i] to be $2^{k+b}$ in step S306, and in step S307, adds the carry correction value −1, which offsets the window correction value t[i], to the window value w[i+1], whose order is higher by one order.

As a result, the range of the corrected difference value diff, which is calculated by the determination unit 303 in step S315, is the range illustrated by rectangle E111 in FIG. 15 (i.e., the above-mentioned range of formula (9.50)). Therefore, the window value w[i] calculated to be the most significant k bits of the corrected difference value diff in step S316 is not less than 0 and not greater than $2^{k-1}$ (when k=2 as illustrated in FIG. 15, not less than 0 and not greater than 2).

In addition, as illustrated by rectangle E102 in FIG. 15, when the criterion value ($d_H$−s) belongs to the range R2, the sign of the criterion value ($d_H$–s) is negative. Thus, the window value w[i] estimated under the presupposition that [i]=+s is also negative because it is constituted by the most significant k bits of the criterion value ($d_H$–s) as mentioned above.

Here, according to the approach of FIG. 3 employed in the first embodiment, the processing unit 301 tries to unify the signs of the window value w[i] and the random value s[i]. That is to say, when the criterion value ($d_H$–s) belongs to the range R2, the judgment unit 302 judges that "the presupposition that s[i]=+s does not match the negative window value w[i]". In other words, the judgment unit 302 judges that "the presupposition that s[i]=+s is not appropriate". Then, when the criterion value ($d_H$–s) belongs to the range R2, the determination unit 303 determines the random value s[i] to be –s, as illustrated in step S308 of FIG. 11.

In addition, when s[i]=–s, formula (9.51) holds true. And when the criterion value ($d_H$–s) belongs to the range R2, formula (9.52) is obtained from formulae (9.44) and (9.51).

$$d_H-s[i]=d_H+s=(d_H-s)+2s \qquad (9.51)$$

$$-2^{k+b-1}+1+2s \leq d_H-s[i] \leq -1+2s \qquad (9.52)$$

In FIG. 15, rectangle E112 resulting from shifting rectangle E102 by +2s graphically illustrates the range of ($d_H$–s[i]) of formula (9.51) (i.e., the range illustrated by formula (9.52)).

Here, the random value s satisfies $0 \leq s \leq 2^b-1$. In addition, the window size k is any arbitrary integer of not less than 2. Therefore, formula (9.53) holds true.

$$0 \leq 2s \leq 2^{b+1}-2 \leq 2^{b+k-1}-2 \qquad (9.53)$$

From formulae (9.52) and (9.53), no matter how large the random value s is, the maximum value of the range illustrated by rectangle E112 is less than $2^{k+b-1}$. In addition, from formulae (9.52) and (9.53), no matter how small the random value s is, the minimum value of the range illustrated by rectangle E112 is more than $-2^{k+k-1}$. Therefore, the value of the MSB of any value included in the range illustrated by rectangle E112 is 0. That is to say, the absolute value of the most significant k bits of ($d_H$–s[i]) is less than $2^{k-1}$.

Therefore, the value indicated by the most significant k bits of ($d_H$–s[i]) is a preferable value as a window value w[i], namely, is a value whose absolute value is less than $2^{k-1}$ even though the window correction is not performed. Accordingly, when the criterion value ($d_H$–s) belongs to the range R2, the determination unit 303 sets the window correction value t[i] to be 0 as illustrated in step S309 of FIG. 11.

Since t[i]=0, the range of the corrected difference value diff, which is calculated by the determination unit 303 in step S315, is the same as the range illustrated by rectangle E112 of FIG. 15.

Meanwhile, when the criterion value ($d_H$–s) belongs to the range R2, the determination unit 303 has determined that s[i]=–s, as mentioned above. Therefore, as illustrated in steps S207 and S209 of FIG. 10, the window operation unit 309 uses, as the index, the value –w[i], which is obtained by reversing the sign of the window value w[i], instead of the window value w[i] and thereby refers to the scalar multiple information storage unit 308.

That is, the entry which corresponds to the value –w[i], whose sign is reverse to that of the window value w[i] to be determined by the determination unit 303 when the criterion value ($d_H$–s) belongs to the range R2, need be present in the table of the scalar multiple information storage unit 308. The window value w[i] in the case where the criterion value ($d_H$–s) belongs to the range R2 is constituted by the most significant k bits of the value included in the range illustrated by rectangle E112 of FIG. 15. Therefore, the most significant k bits of the value included in the range whose sign is reverse to that of the range illustrated by rectangle E112 are used as an index of the table.

In FIG. 15, the range whose sign is reverse to that of the range illustrated by rectangle E112 is illustrated by rectangle E122. Since formula (9.54) is obtained from formula (9.52) and t[i]=0, the range illustrated by rectangle E122 is as illustrated in formula (9.55).

$$-2^{k+b-1}+1+2s \leq d_H-s[i]+t[i]=\text{diff} \leq -1+2s \qquad (9.54)$$

$$-2s+1 \leq -\text{diff} \leq 2^{k+b-1}-1-2s \qquad (9.55)$$

In other words, as illustrated by formula (9.55) and rectangle E122 of FIG. 15, the most significant k bits of the negative number may be used as an index. Specifically, –1 may be used as an index. The reason is as follows.

Since the random value s satisfies $0 \leq s \leq 2^b-1$, it satisfies $-2^{b+1}+2 \leq -2s \leq 0$. Accordingly, although there is no possibility that (–2s+1) in formula (9.55) is less than $-2^{b+1}$, there is a possibility that (–2s+1) is less than $-2^b$. And the most significant k bits of the bit string representing $-2^b$ as the signed (k+b)-bit value form the bit string whose sign is negative and in which the bit "1" follows after the (k–1)-bit zeros.

Therefore, depending on the value of the random value s, it is possible that the most significant k bits of the value included in the range illustrated by rectangle E122 (i.e., the signed k-bit value used as an index) may indicate –1 (i.e., the bit string whose sign is negative and in which the 1-bit one follows after the (k–1)-bit zeros). Therefore, in the first embodiment, the entry for the table data tab[–1]=(–1×$2^b$+s)A associated with the index "–1" is provided in the table of the scalar multiple information storage unit 308.

Note that when the window value w[i] is 0, regardless of whether the random value s[i] is –s or +s, the index used by the window operation unit 309 for referring to the scalar multiple information storage unit 308 is 0 because –0 equals +0. In other words, even if –diff<0, when all the most significant k bits of –diff are 0, the index is 0 (to be precise, when there is no effect due to the carry correction, if all the most significant k bits of the corrected difference value diff are 0, the index is 0 regardless of whether the corrected difference value diff is positive or negative).

Meanwhile, as illustrated by rectangle E104 of FIG. 15, when the criterion value ($d_H$–s) belongs to the range R4, the criterion value ($d_H$–s) is not less than $2^{k+b-1}$. In other words, the window value w[i] estimated under the presupposition that s[i]=+s is not less than $2^{k-1}$.

Therefore, in this case, in order to reduce the memory usage of the scalar multiple information storage unit 308, it is appropriate to perform the window correction. When the criterion value ($d_H$–s) belongs to the range R4, the criterion value ($d_H$–s) is positive; therefore, the window correction in this case is, specifically, the correction of adding a negative number.

To be more specific, the determination unit 303 determines the window correction value t[i] to be $-2^{k+b}$ as illustrated in step S313 of FIG. 11. This negative window correction value t[i]=$-2^{k+b}$ offsets the positive carry correction value (i.e., +1) to the window value w[i+1], whose order is higher by one order.

In addition, according to formula (9.48), the value obtained by adding the window correction value t[i]=$-2^{k+b}$ to the criterion value ($d_H$–s) is included in the range of formula (9.56).

$$2^{k+b-1}-2^{k+b}=-2^{k+b-1} \leq d_H-s+t[i] \leq 2^{k+b}-1-2^{k+b}=-1 \qquad (9.56)$$

Only negative numbers are included in the range of formula (9.56). And the value obtained by correcting the window value w[i] estimated under the presupposition of s[i]=+s so as to have a smaller absolute value is constituted by the most significant k bits of the value obtained by correcting the criterion value ($d_H$−s) with the window correction value t[i]. Therefore, when formula (9.56) holds true, the value obtained by correcting the estimated window value w[i] is also negative.

Therefore, similarly to the case where the criterion value ($d_H$−s) belongs to the range R2, the judgment unit 302 judges that "the presupposition that s[i]=+s does not match the window value w[i] which is made negative by the correction". In other words, the judgment unit 302 judges that "the presupposition that s[i]=+s is not appropriate".

Then, when the criterion value ($d_H$−s) belongs to the range R4, the determination unit 303 determines the random value s[i] to be −s, as illustrated in step S312 of FIG. 11.

Further, when s[i]=−s, the above-mentioned formula, namely formula (9.51), holds true. And when the criterion value ($d_H$−s) belongs to the range R4, formula (9.57) is obtained from formulae (9.51) and (9.56).

$$-2^{k+b-1}+2s \le d_H - s[i] + t[i] \le -1+2s \qquad (9.57)$$

In FIG. 15, rectangle E114 resulting from shifting rectangle E104 by ($-2^{k+b}$+2s) graphically illustrates the range of formula (9.57). The range illustrated by rectangle E114 is the same as the range illustrated by rectangle E112, excluding the end point on the left. Therefore, an argument similar to the above-mentioned argument with respect to the range R2 holds true.

That is to say, rectangle E124 of FIG. 15 illustrates the range whose sign is reverse to that of the range illustrated by rectangle E114. And the most significant k bits of the range illustrated by rectangle E124 are used as the index of the table. Specifically, the signed k-bit value used as the index may be −1 in accordance with the random value s.

As explained above referring to FIG. 15, according to the first embodiment, when the carry correction effect is not considered, the value used as the index at the scalar multiple information storage unit 308 is not less than −1 and not greater than $2^{k-1}$. Therefore, when the carry correction effect is considered, the value used as the index at the scalar multiple information storage unit 308 is not less than −2 and not greater than ($2^{k-1}$+1). FIG. 16 summarizes the values used as the index at the scalar multiple information storage unit 308 in the first embodiment. Similarly to FIG. 15, FIG. 16 also illustrates the example in the case where the window size k is 2.

Figure 16:
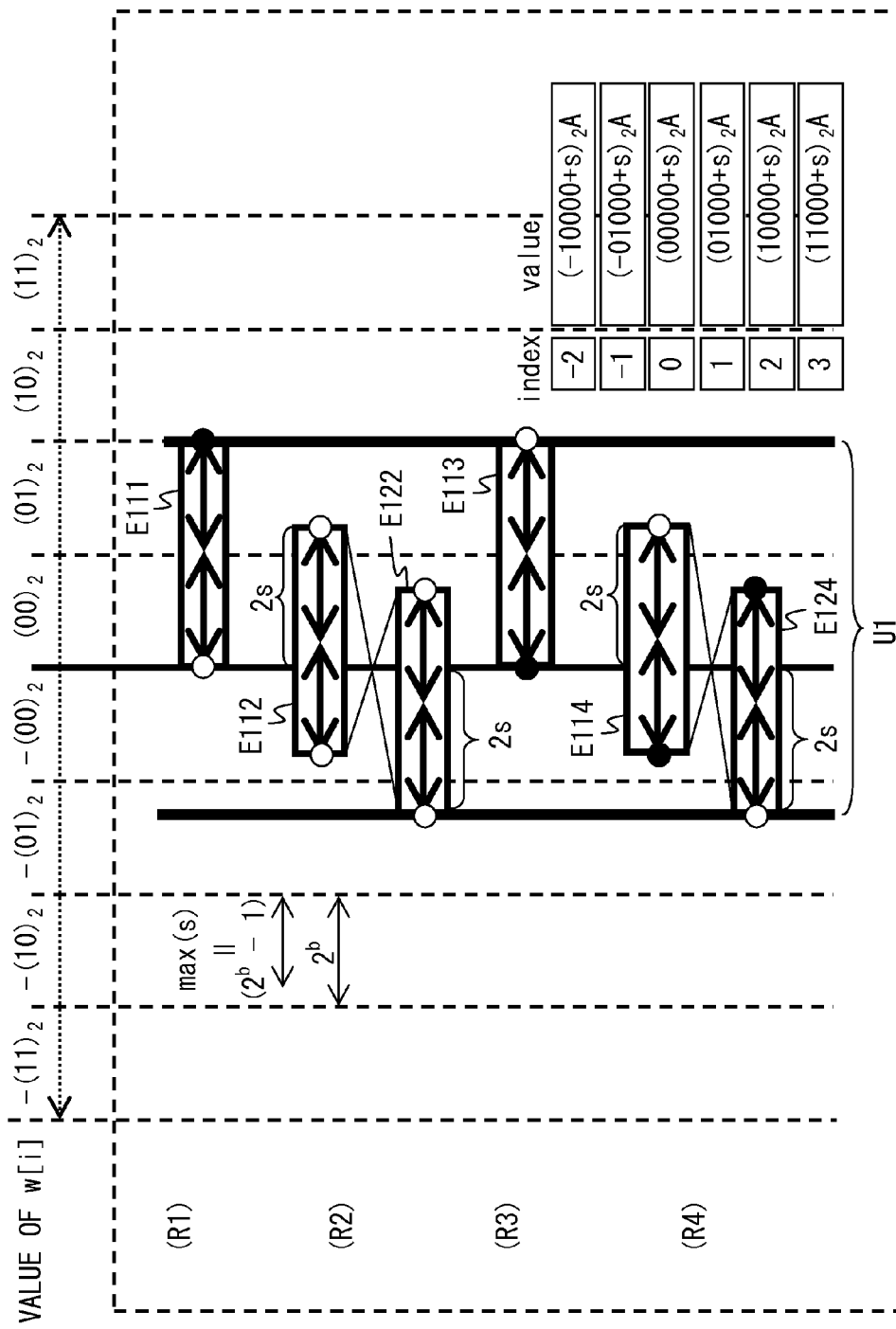
FIG. 16 summarizes the values used as an index of the scalar multiple information storage unit in the first embodiment.

Similarly to FIG. 15, FIG. 16 illustrates: rectangle E111, which corresponds to the range R1; rectangle E112, which corresponds to the range R2; rectangle E122, whose sign is reverse to that of rectangle E112; rectangle E113, which corresponds to the range R3; rectangle E114, which corresponds to the range R4; and rectangle E124, whose sign is reverse to that of rectangle E114. As explained with respect to FIG. 15, the value used as the index at the scalar multiple information storage unit 308 is constituted by the most significant k bits of a value included in any of the ranges illustrated by rectangles E111, E122, E113, and E124, respectively. In addition, in FIG. 16, the size of the maximum value ($2^b$−1) of the random value s is illustrated by a double-pointed arrow. As illustrated in FIG. 16, the size 1 in the window value w[i] is equivalent to the size of $2^b$; therefore, the maximum value of the random value s is less than the size 1 in the window value w[i].

The window value w[i] corresponding to rectangle E111 is used as the index as it is. The window value w[i] corresponding to rectangle E111 is not less than 0 and not greater than $2^{k-1}$ (when k=2, not less than 0 and not greater than 2).

The window value w[i] corresponding to rectangle E112 is not used as the index as it is, but the value obtained by reversing the sign of the window value w[i] is used as the index. That is to say, the value used as the index is constituted by the most significant k bits of the value included in the range illustrated by rectangle E122.

Therefore, as explained above with respect to FIG. 15, the minimum value of the values used as the index corresponding to rectangle E122 is −1. In addition, the maximum value of the values used as the index corresponding to rectangle E122 is either ($2^{k-1}$1) or ($2^{k-1}$2), although it differs in accordance with the random value s. As a specific example in the case where the window size k is 2, in FIG. 16, an example is illustrated in which the value used as the index corresponding to rectangle E122 is not less than −1 and not greater than 0.

The window value w[i] corresponding to rectangle E113 is used as the index as it is. The window value w[i] corresponding to rectangle E113 is not less than 0 and not greater than ($2^{k-1}$−1) (when k=2, not less than 0 and not greater than 1).

The window value w[i] corresponding to rectangle E114 is not used as the index as it is, but the value obtained by reversing the sign of the window value w[i] is used as the index. That is to say, the value used as the index is constituted by the most significant k bits of the value included in the range illustrated by rectangle E124.

Therefore, as explained above with respect to FIG. 15, the minimum value of the values used as the index corresponding to rectangle E124 is −1. In addition, the maximum value of the values used as the index corresponding to rectangle E124 varies depending on the random value s, and is largest, namely $2^{k-1}$, when s=0. In FIG. 16, as a specific example in the case where the window size k is 2, an example is illustrated in which the value used as the index corresponding to rectangle E124 is not less than −1 and not greater than 0.

As mentioned above, the range of the index corresponding to the window value w[i] obtained by extracting the most significant k bits of the corrected difference value diff (i.e., the window value w[i] to which the carry correction has not yet been applied) is the range U1 of not less than −1 and not greater than $2^{k-1}$ as illustrated in FIG. 16. To be more specific, when k=2, the range U1 is the range of not less than −1 and not greater than 2.

However, the window value w[i] obtained from the corrected difference value diff may sometimes be corrected later by the carry correction value of +1 or −1. Accordingly, the range of the value with the possibility of being actually used as the index of the scalar multiple information storage unit 308 is not less than −2 and not greater than ($2^{k-1}$+1).

FIG. 16 illustrates the table data of the scalar multiple information storage unit 308 in the case where the window size k is 2 and the number of bits, b, of the random value s is 3. That is to say, in FIG. 16, each index h where $-2 \le h \le 2^{k-1}+1=3$ and the value ($h \times 2^3$+s)A corresponding to the index h are illustrated.

Subsequently, explanation is given for the second embodiment. The second embodiment intends to further save memory by narrowing the range of the value having the possibility of being used as the index of the scalar multiple information storage unit 308, compared with the first embodiment.

Figure 17:
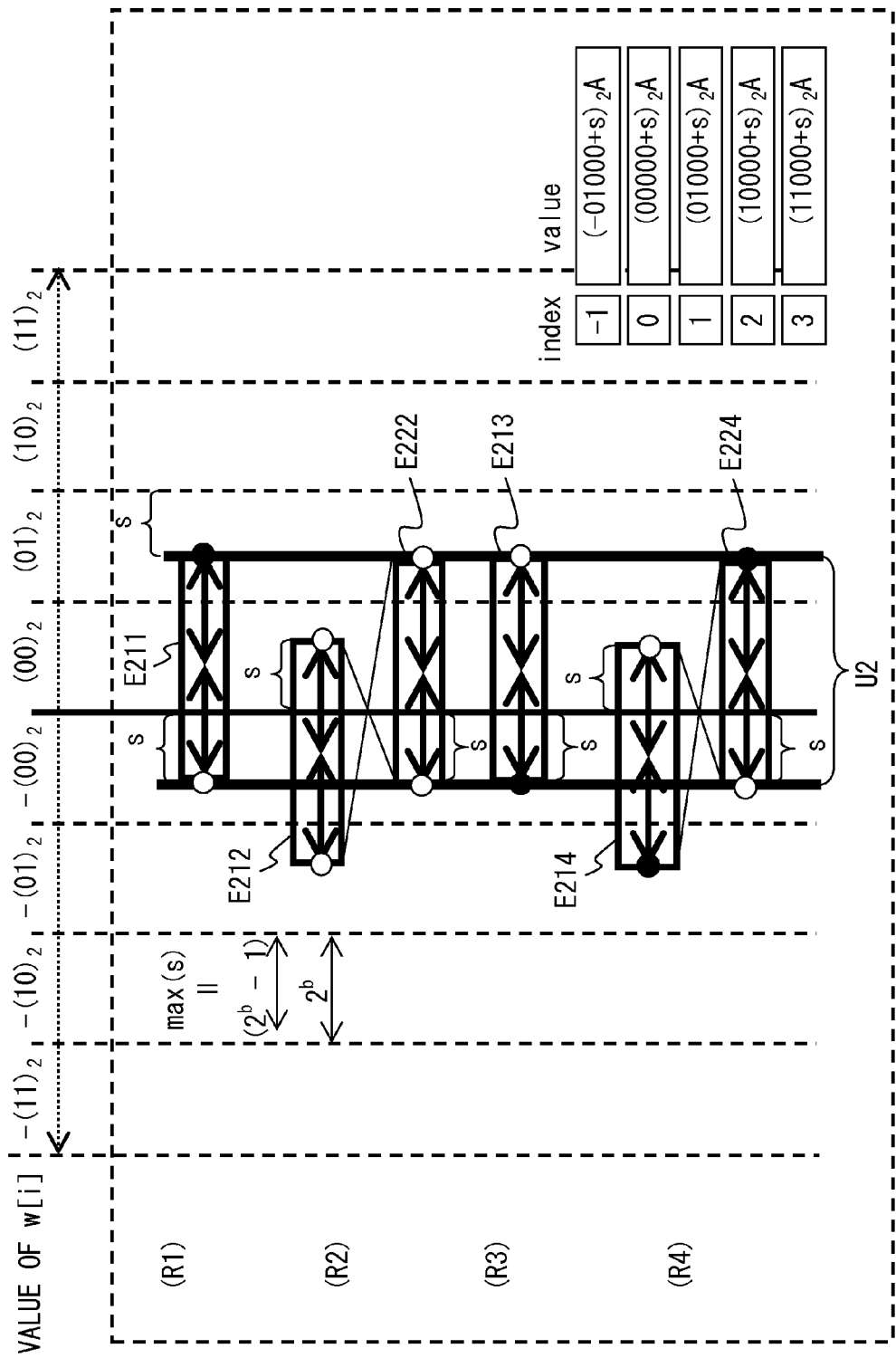
FIG. 17 summarizes the values used as an index of the scalar multiple information storage unit in the second embodiment.

Then, concerning the second embodiment, explanation is first given as to how to make it possible to narrow the range of the index by referring to FIGS. 17 to 18. After that, by referring to FIGS. 19 to 22, details of the operation of the cryptographic processing device 300 in the second embodiment are explained.

FIG. 17 summarizes the values used as the index at the scalar multiple information storage unit 308 in the second embodiment. The format of FIG. 17 is similar to that in FIG. 16 concerning the first embodiment. Hereinafter, explanation is given comparing FIGS. 17 and 16.

As illustrated by FIG. 16, the reason for the possibility that the window value w[i] before the carry correction might be −1 in the first embodiment is that the minimum value of the range illustrated by rectangle E122 or E124 is (−2s+1) when the criterion value ($d_H$−s) belongs to the range R2 or R4. Specifically, when the random value s is ($2^b$−1), the minimum value of −diff, whose sign is reverse to that of the corrected difference value diff, becomes the smallest (i.e., the left end of rectangle E122 or E124 is positioned leftmost). That is to say, when the random value s is ($2^b$−1), the minimum value (−2s+1) of −diff becomes (−$2^{b+1}$−1).

As illustrated in FIGS. 16 and 17, the size "1" in the window value w[i] corresponds to the size "$2^b$" in the corrected difference value diff. Accordingly, in the first embodiment, in order to cope with the case where the minimum value of −diff is (−$2^{b+1}$−1), the entry which corresponds to the index of −1 is prepared in the scalar multiple information storage unit 308. Further, in preparation for the carry correction to be performed, in the first embodiment, the entry which corresponds to the index of −2 is prepared as well in the scalar multiple information storage unit 308.

In other words, when the window value of w[i]=1 is set in accordance with the random value of s[i]=−s in the stage prior to the carry correction being performed, and further, when the carry correction value is +1, the random value of s[i]=−s and the window value of w[i]=2 become a pair. Accordingly, the window operation unit 309 obtains the point of tab[−2]=(−2×$2^b$+s)A by referring to the scalar multiple information storage unit 308 using the index of −w[i]=−2. In the first embodiment, in preparation for such a case, the scalar multiplication unit 307 generates the table data tab[−2], which corresponds to the index of −2, and stores it in the scalar multiple information storage unit 308.

Meanwhile, as illustrated in FIG. 17, since the size "1" in the window value w[i] corresponds to the size "$2^b$" in the corrected difference value diff, the maximum value of the random value s is less than the size "1" in the window value w[i]. In rectangles E122 and E124 of FIG. 16, the size of the part on the left side of 0 is 2s; however, if it is possible to change this size of the part on the left side of 0 to s, it is possible to exclude the necessity for one entry (i.e., the entry corresponding to the index of −2).

Accordingly, in the second embodiment, rectangles E111, E112, E113, and E114 of FIG. 16 in the first embodiment are replaced by rectangles E211, E212, E213, and E214 of FIG. 17, with the shift of −s from rectangles E111, E112, E113, and E114, respectively.

As mentioned above, the maximum value of the random value s is less than the size 1 in the window value w[i]. Therefore, the range of the window value w[i] corresponding to rectangle E211 of FIG. 17, where rectangle E211 is obtained by shifting, by −s, rectangle E111 of FIG. 16 corresponding to the window value w[i] of not less than 0 and not greater than $2^{k-1}$, is not less than 0 and not greater than ($2^{k-1}$−1) when s>0, and not less than 0 and not greater than $2^{k-1}$ when s=0. Regardless of whether the corrected difference value diff is positive or negative, as long as all the most significant k bits thereof are 0, the window value w[i] before the carry correction is 0 because −0=+0=0.

The range whose sign is reverse to that of the range illustrated by rectangle E212 in FIG. 17, rectangle E212 being the one obtained by shifting rectangle E112 of FIG. 16 by −s, is illustrated by rectangle E222 in FIG. 17. The minimum value of the range illustrated by rectangle E222 is (−s+1). Accordingly, even if the random value s is the maximum ($2^b$−1), all the most significant k bits of the minimum value of the range illustrated by rectangle E222 are 0. That is to say, rectangle E222 never corresponds to the index of −1.

In addition, the range of the window value w[i] corresponding to rectangle E213 of FIG. 17, where rectangle E213 is obtained by shifting, by −s, rectangle E113 of FIG. 16 corresponding to the window value w[i] of not less than 0 and not greater than ($2^{k-1}$−1) is not less than 0 and not greater than ($2^{k-1}$−1).

The range whose sign is reverse to that of the range illustrated by rectangle E214 in FIG. 17, rectangle E214 being the one obtained by shifting rectangle E114 of FIG. 16 by −s, is illustrated by rectangle E224 in FIG. 17. The minimum value of the range illustrated by rectangle E224 is (−s+1). Accordingly, even if the random value s is the maximum ($2^k$−1), all the most significant k bits of the minimum value of the range illustrated by rectangle E224 are 0. That is to say, rectangle E224 never corresponds to the index of −1.

As mentioned above, in the second embodiment, the range of the index corresponding to the window value w[i] obtained by extracting the most significant k bits of the corrected difference value diff (i.e., the window value w[i] to which the carry correction has not yet been applied) is as illustrated in the range U2 of FIG. 17. That is to say, the range U2 is not less than 0 and not greater than $2^{k-1}$, and when k=2, is not less than 0 and not greater than 2.

Accordingly, when the carry correction is considered, the index used in the second embodiment is not less than −1 and not greater than ($2^{k-1}$+1), and when k=2, is not less than −1 and not greater than 3. FIG. 17 graphically illustrates the table data of scalar multiple information storage unit 308 in the case where the window size k is 2 and the number of bits, b, of the random value s is 3. In other words, in FIG. 17, each index h where −1≤h≤$2^{k-1}$+1=3, and the value (h×$2^3$+s)A corresponding to the index h, are illustrated.

Subsequently, by referring to FIG. 18, explanation is given as to specifically on the basis of what criterion the judgment unit 302 may rely in order for the determination unit 303 to determine the window value w[i] corresponding to rectangles E211, E212, E213, and E214 of FIG. 17. FIG. 18 schematically explains the range of the values used as an index of the scalar multiple information storage unit 308 in the second embodiment. The format of FIG. 18 is similar to that of FIG. 15 in the first embodiment.

Stating it from the conclusion, in the second embodiment, the judgment unit 302 uses the signed (k+b)-bit value $d_H$ itself as the judgment criterion. In response to which of the ranges R1 to R4 the value of the signed (k+b)-bit value $d_H$ belongs, the determination unit 303 performs the different processing.

That is to say, rectangle E201 of FIG. 18 illustrates the signed (k+b)-bit value $d_H$ which belongs to the range R1. The range R1 illustrated by rectangle E201 is as indicated in formula (10.1), and specifically, as indicated in formula (10.2) when the window size k is 2 and the length b of the random value s is 3, as illustrated in FIG. 18.

$$-2^{k+b}+1 \leq d_H \leq 2^{k+b-1} \quad (10.1)$$

$$-2^5+1 = -(11111)_2 \leq d_H \leq -2^4 = -(10000)_2 \quad (10.2)$$

Further, rectangle E202 illustrates the signed (k+b)-bit value $d_H$ which belongs to the range R2. The range R2 illustrated by rectangle E202 is as indicated in formula (10.3), and specifically, as indicated in formula (10.4) in the example of FIG. 18.

$$2^{k+b-1}+1 \leq d_H \leq -1 \qquad (10.3)$$

$$-2^4+1=-(01111)_2 \leq d_H \leq -1=-(00001)_2 \qquad (10.4)$$

In addition, rectangle E203 illustrates the signed (k+b)-bit value $d_H$ which belongs to the range R3. The range R3 illustrated by rectangle E203 is as indicated in formula (10.5), and specifically, as indicated in formula (10.6) in the example of FIG. 18.

$$0 \leq d_H \leq 2^{k+b-1}-1 \qquad (10.5)$$

$$0 \leq d_H \leq 2^4-1=-(01111)_2 \qquad (10.6)$$

Further, rectangle E204 illustrates the signed (k+b)-bit value $d_H$ which belongs to the range R4. The range R4 illustrated by rectangle E204 is as indicated in formula (10.7), and specifically, as indicated in formula (10.8) in the example of FIG. 18.

$$2^{k+b-1} \leq d_H \leq 2^{k+b}-1 \qquad (10.7)$$

$$2^4=(10000)_2 \leq d_H \leq 2^5-1=(11111)_2 \qquad (10.8)$$

Subsequently, in comparison with FIG. 15 and in the order of ranges R3, R1, R2, and R4, explanation is given for the relationship between the ranges of the signed (k+b)-bit value $d_H$ illustrated by rectangles E201 to E204 and the range of the window value w[i].

In the first embodiment, the determination unit 303 determines the random value s[i] to be +s and the window correction value t[i] to be 0 when the criterion value ($d_H$-s) belongs to the range R3. Similarly, in the second embodiment, the determination unit 303 determines the random value s[i] to be +s and the window correction value t[i] to be 0 when the signed (k+b)-bit value $d_H$ belongs to the range R3.

Here, also in the second embodiment, the corrected difference value diff is defined in the same way as in formula (9.3) of the first embodiment. Accordingly, when the signed (k+b)-bit value $d_H$ belongs to the range R3, formula (10.9) is obtained from formula (10.5), s[i]=+s, and t[i]=0.

$$0-s+0 \leq \text{diff}=d_H-s[i]+t[i] \leq 2^{k+b-1}-1-s+0 \qquad (10.9)$$

The range of the corrected difference value diff indicated by formula (10.9) is as illustrated in rectangle E213 of FIG. 18. Rectangle E213 in FIG. 18 is the same as rectangle E213 in FIG. 17; therefore, when the signed (k+b)-bit value $d_H$ belongs to the range R3, the index is included in the desired range U2 illustrated in FIG. 17 if there is no carry correction effect.

Subsequently, explanation is given for the range R1. In the first embodiment, when the criterion value ($d_H$-s) belongs to the range R1, the determination unit 303 determines the window correction value t[i] to be $2^{k+b}$, determines the carry correction value to the window value w[i+1], whose order is higher by one order, to be -1, and determines the random value [i] to be +s. In the second embodiment, the determination unit 303 determines the window correction value t[i], the carry correction value, and the random value s[i] in the same way, when the signed (k+b)-bit value $d_H$ belongs to the range R1.

Then, when the signed (k+b)-bit value $d_H$ belongs to the range R1, formula (10.10) is obtained from the definition of the corrected difference value diff of formula (9.3), formula (10.1), s[i]=+s, and t[i]=$2^{k+b}$.

$$-2^{k+b}+1-s+2^{k+b}=-s+1 \leq \text{diff}=d_H-s[i]+t[i] \leq -2^{k+b-1}-s+2^{k+b}=2^{k+b-1}-s \qquad (10.10)$$

The range of the corrected difference value diff indicated by formula (10.10) is as illustrated by rectangle E211 of FIG. 18. Since rectangle E211 of FIG. 18 is the same as rectangle E211 of FIG. 17, if there is no carry correction effect, the index is included in the desired range U2 illustrated in FIG. 17 when the signed (k+b)-bit value $d_H$ belongs to the range R1 as well.

Subsequently, explanation is given for the range R2. In the first embodiment, when the criterion value ($d_H$-s) belongs to the range R2, the determination unit 303 determines the random value s[i] to be -s, and determines the window correction value t[i] to be 0. In the second embodiment, when the signed (k+b)-bit value $d_H$ belongs to the range R2, the determination unit 303 similarly determines the random value s[i] to be -s, and determines the correction value t[i] to be 0.

Then, when the signed (k+b)-bit value $d_H$ belongs to the range R2, formula (10.11) is obtained from the definition of the corrected difference value diff of formula (9.3), formula (10.3), s[i]=-s, and t[i]=0.

$$-2^{k+b-1}+1+s+0 \leq \text{diff}=d_H-s[i]+t[i] \leq -1+s+0 \qquad (10.11)$$

The range of the corrected difference value diff indicated by formula (10.11) is as illustrated by rectangle E212 of FIG. 18. Rectangle E212 of FIG. 18 is the same as rectangle E212 of FIG. 17. Therefore, the range whose sign is reverse to that of the range of formula (10.11) illustrated by rectangle E212 (i.e., the range illustrated by rectangle E222) is as indicated in formula (10.12).

$$-s+1 \leq -\text{diff} \leq 2^{k+b-1}-1-s \qquad (10.12)$$

Therefore, if there is no carry correction effect, the index is included in the desired range U2 illustrated in FIG. 17 when the signed (k+b)-bit value $d_H$ belongs to the range R2 as well.

Subsequently, explanation is given for the range R4. In the first embodiment, when the criterion value ($d_H$-s) belongs to the range R4, the determination unit 303 determines the window correction value t[i] to be $-2^{k+b}$, determines the carry correction value to the window value w[i+1], whose order is higher by one order, to be +1, and determines the random value s[i] to be -s. In the second embodiment, when the signed (k+b)-bit value $d_H$ belongs to the range R4, the determination unit 303 determines the window correction value t[i], the carry correction value, and the random value s[i] in the same way.

Then, when the signed (k+b)-bit value $d_H$ belongs to the range R4, formula (10.13) is obtained from the definition of the corrected difference value diff of formula (9.3), formula (10.7), s[i]=-s, and t[i]=$-2^{k+b}$.

$$2^{k+b-1}+s-2^{k+b}=-2^{k+b-1}+s \leq \text{diff}=d_H-s[i]+t[i] \leq 2^{k+b}-1+s-2^{k+b}=s-1 \qquad (10.13)$$

The range of the corrected difference value diff indicated by formula (10.13) is as illustrated by rectangle E214 of FIG. 18. Rectangle E214 of FIG. 18 is the same as rectangle E214 of FIG. 17. Therefore, the range whose sign is reverse to that of the range of formula (10.13) illustrated by rectangle E214 (i.e., the range illustrated by rectangle E224) is as indicated by formula (10.14).

$$-s+1 \leq -\text{diff} \leq 2^{k+b-1}-s \qquad (10.14)$$

Therefore, if there is no carry correction effect, the index is included in the desired range U2 illustrated in FIG. 17 when the signed (k+b)-bit value $d_H$ belongs to the range R4 as well.

To sum up explanation given above by referring to FIGS. 17 and 18, in the second embodiment, the judgment unit 302 uses the value of the signed (k+b)-bit value $d_H$ itself instead of the value ($d_H$-s), which is obtained by subtracting the random value s from the signed (k+b)-bit value $d_H$, as the judgment criterion. With this, in the second embodiment, no such situation occurs that "the window value w[i] corresponding to the random value s[i] which is −s is set to be 1, and then is determined to be 2 by the carry correction" and thus, −2 becomes unnecessary as the index of the scalar multiple information storage unit 308. In other words, according to the second embodiment, further reduction in the memory consumption amount of the scalar multiple information storage unit 308 is achieved only by changing the judgment criterion of the judgment unit 302.

Hereinafter, further specific explanation is given for the second embodiment, as mentioned above.

Figure 19:
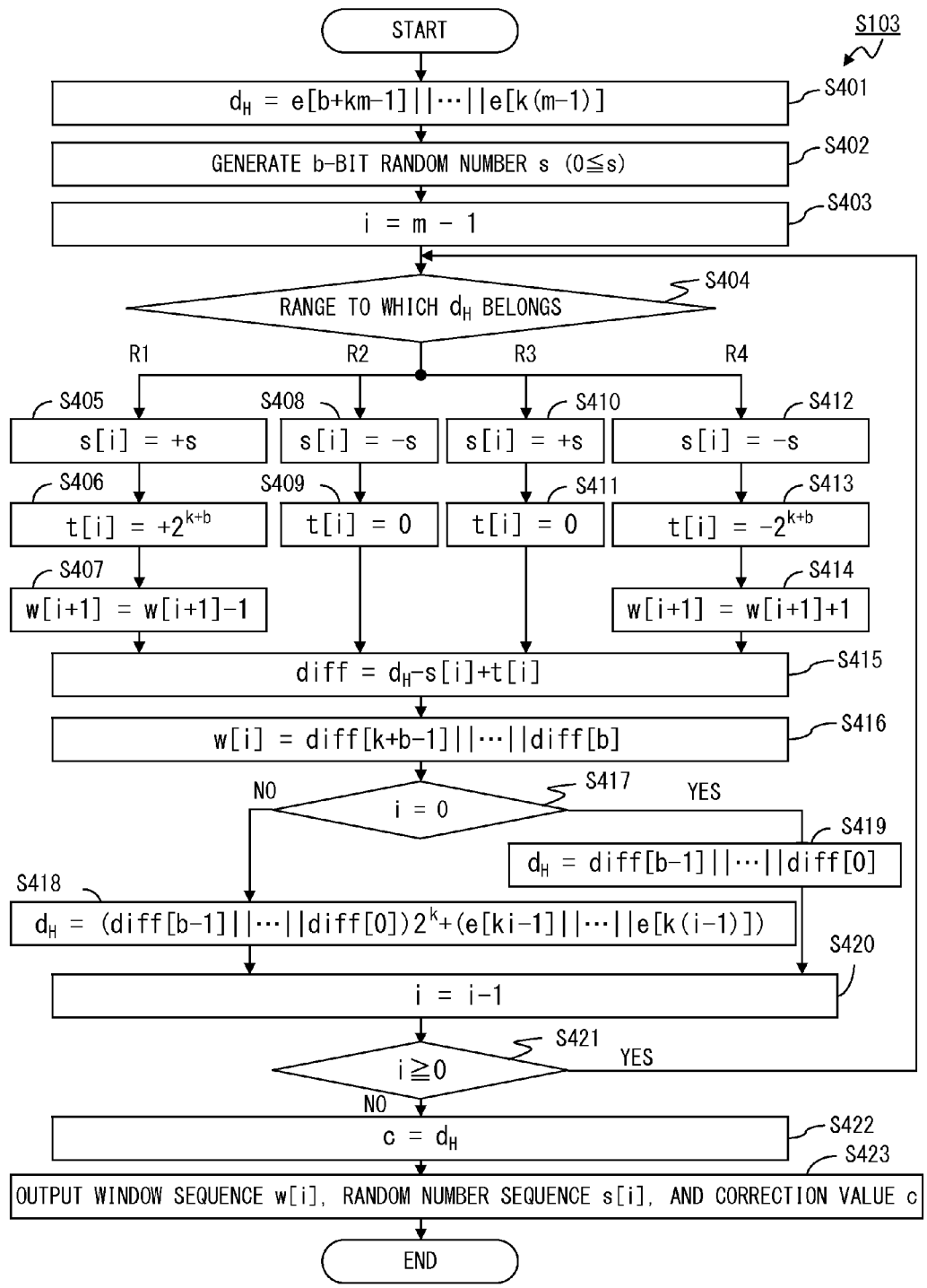
FIG. 19 is a flowchart of a process in which the cryptographic processing device in the second embodiment determines the window sequence, random number sequence, and correction value.

FIG. 19 is a flowchart of a process in which the cryptographic processing device 300 in the second embodiment determines the window sequence w[i], random number sequence s[i], and correction value c. That is to say, FIG. 19 is a flowchart of step S103 of FIG. 9 according to the second embodiment.

Steps S401 to S403 of FIG. 19 are similar to steps S301 to S303 of FIG. 11 in the first embodiment, and steps S405 to S423 are similar to steps S305 to S323 of FIG. 11. Therefore, explanation for these steps is omitted.

In FIG. 19, what is different from FIG. 11, which concerns the first embodiment, is step S404. In step S404, the judgment unit 302 judges to which range of the ranges R1 to R4 the signed (k+b)-bit value $d_H$ is included. The ranges R1 to R4 are defined to be as follows, similarly to those in the first embodiment.

Range R1: not greater than $-2^{k+b-1}$
Range R2: not less than $(-2^{k+b-1}+1)$ and not greater than $-1$
Range R3: not less than 0 and not greater than $(2^{k+b-1}-1)$
Range R4: not less than $2^{k+b-1}-1$ When the signed (k+b)-bit value $d_H$ is included in the range R1, the processing proceeds to step S405. When the signed (k+b)-bit value $d_H$ is included in the range R2, the processing proceeds to step S408. When the signed (k+b)-bit value $d_H$ is included in the range R3, the processing proceeds to step S410. When the signed (k+b)-bit value $d_H$ is included in the range R4, the processing proceeds to step S412.

For simplification of the processing of step S404, the judgment unit 302 may judge as to which range the signed (k+b)-bit value $d_H$ is included by checking the sign of the signed (k+b)-bit value $d_H$ and the value of the MSB of the signed (k+b)-bit value $d_H$.

Specifically, the signed (k+b)-bit value $d_H$ is included in the range R1 when its sign is negative and the value of its MSB is 1. In addition, the signed (k+b)-bit value $d_H$ is included in the range R2 when its sign is negative and the value of its MSB is 0. Further, the signed (k+b)-bit value $d_H$ is included in the range R3 when its sign is positive and the value of its MSB is 0. Moreover, the signed (k+b)-bit value $d_H$ is included in the range R4 when its sign is positive and the value of its MSB is 1.

Figure 20A:
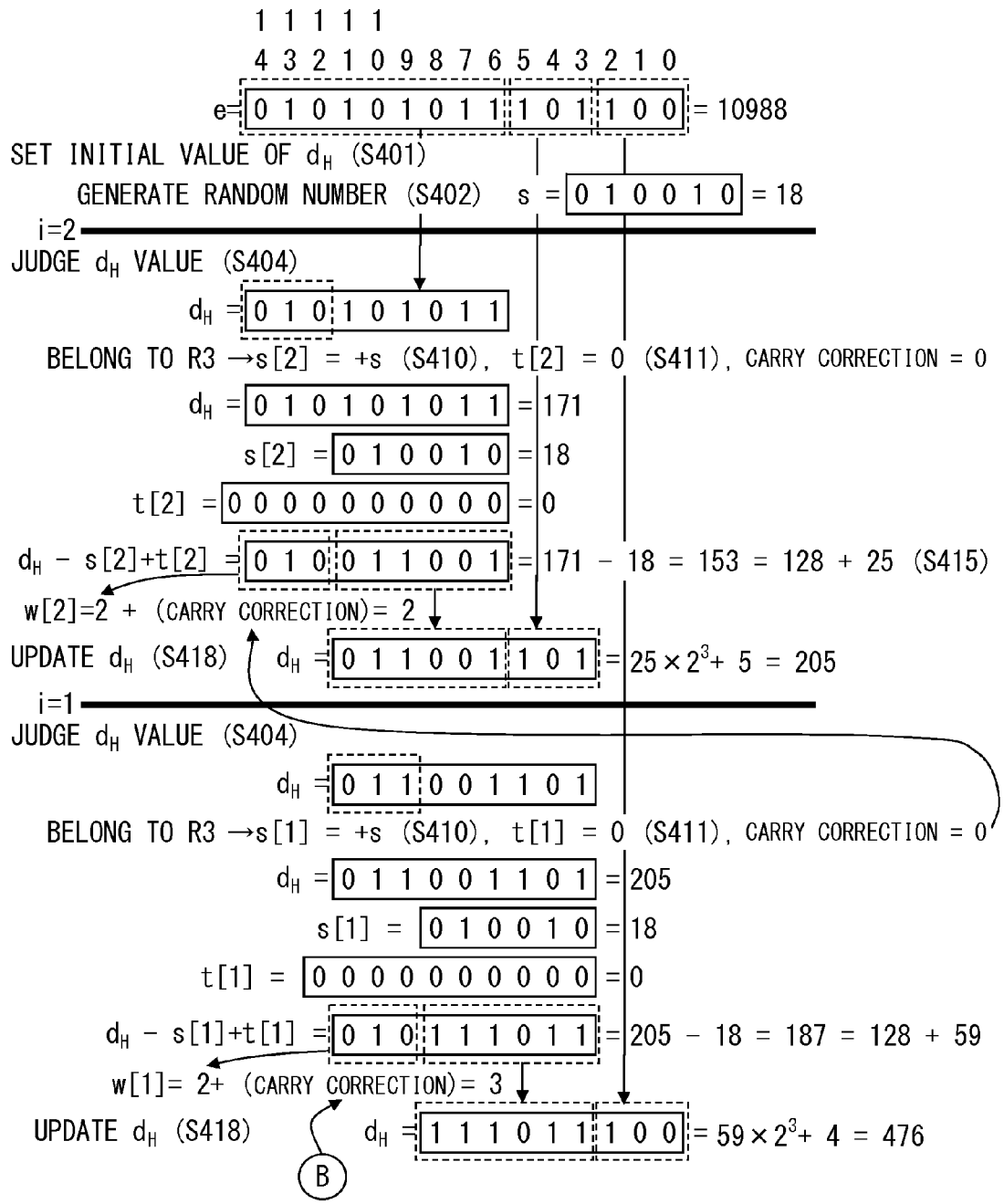
FIG. 20A is one (No. 1) of figures for illustrating a specific example of the window sequence, random number sequence, and correction value determined in the second embodiment.

Subsequently, by referring to FIGS. 20A to 21 which include numerical examples of the private key d and the random value s, the specific example of the processing of FIGS. 9, 10, and 19 in the second embodiment is explained.

Let the dummy key e obtained by the processing unit 301 in step S102 of FIG. 9 be a 15-bit value as illustrated in formula (10.15). The specific examples of the private key d corresponding to formula (10.15) are mentioned later together with FIG. 21.

$$e = (010101011101100)_2 = 10988 \quad (10.15)$$

Subsequently, the processing of FIG. 19, which corresponds to step S103 of FIG. 9, is started. In the example of FIGS. 20A to 20B, let the window size k be 3, and let the bit length b of the random value s be 6. Accordingly, m=3 as in formula (9.9).

When the processing of FIG. 19 is started, in step S401, the judgment unit 302 initializes the signed (k+b)-bit value $d_H$, as illustrated in formula (10.16).

$$d_H = e[14] \| \ldots \| e[6] = (010101011)_2 = 171 \quad (10.16)$$

In addition, it is assumed that the random number generation unit 305, in step S402, generates the value of formula (10.17) as the b(=6)-bit random value s.

$$s = (010010)_2 = 18 \quad (10.17)$$

Then, in the subsequent step, namely in step S403, the processing unit 301 initializes the loop variable i to be 2(=m−1). Then in step S404, the judgment unit 302 judges to which range the signed (k+b)-bit value $d_H$ of formula (10.16) belongs. According to formula (10.16), the signed (k+b)-bit value $d_H$ belongs to R3 since its sign is positive and the value of its MSB is 0.

Therefore, in step S410, the determination unit 303 determines the random value s[2] to be +s as illustrated in formula (10.18), and in step S411, determines the window correction value t[2] to be 0 as illustrated in formula (10.19). In addition, since the window correction value t[2] is 0, no carry correction is performed.

$$s[2] = +s = 18 = (010010)_2 \quad (10.18)$$

$$t[2] = 0 = (0000000000)_2 \quad (10.19)$$

Then in step S415, the determination unit 303 calculates the corrected difference value diff, according to formula (9.3), specifically as illustrated in formula (10.20).

$$\begin{aligned} diff &= d_H - s[2] + t[2] \\ &= 171 - 18 + 0 \\ &= 153 \\ &= 2 \times 2^6 + 25 \\ &= (010011001)_2 \\ &= (010\|011001)_2 \end{aligned} \quad (10.20)$$

Further, in step S416, the determination unit 303 calculates the window value w[2] as illustrated in formula (10.21). Note that the window value w[2] obtained here has not been settled yet because there is a potential possibility that the window value w[2] will be incremented or decremented later by the carry correction.

$$w[2] = diff[8]\|diff[7]\|diff[6] = (010)_2 = 2 \quad (10.21)$$

Since i=2, the processing proceeds to step S418. In step S418, the judgment unit 302 updates the signed (k+b)-bit value $d_H$, according to formula (9.5), specifically as illustrated in formula (10.22).

$$\begin{aligned} d_H &= (diff[5]\| \ldots \|diff[0])2^3 + (e[5]\| \ldots \|e[3]) \\ &= 25 \times 2^3 + (101)_2 \\ &= 200 + 5 \end{aligned} \quad (10.22)$$

-continued $$= 205$$
$$= (011001101)_2$$

Then, since the processing unit 301 decrements the loop variable i in step S420, i=1. And since i≥0, the processing goes back to step S404 from step S421.

In step S404, the judgment unit 302 judges as to which range the signed (k+b)-bit value $d_H$ updated as illustrated in formula (10.22) belongs. The signed (k+b)-bit value $d_H$ belongs to the range R3 because its sign is positive and the value of its MSB is 0.

Therefore, in step S410, the determination unit 303 determines the random value s[1] to be +s as illustrated in formula (10.23), and in step S411, the determination unit 303 determines the window correction value t[1] to be 0 as illustrated in formula (10.24). Since the window correction value t[1] is 0, the carry correction to the window value w[2] is not performed; it is settled that the window value w[2] is the value of formula (10.21).

$$s[1]=+s=18=(010010)_2 \qquad (10.23)$$

$$t[1]=0=(0000000000)_2 \qquad (10.24)$$

Then in step S415, the determination unit 303 calculates the corrected difference value diff, according to formula (9.3), specifically as illustrated in formula (10.25).

$$\begin{aligned} \text{diff} &= d_H - s[1] + t[1] \\ &= 205 - 18 + 0 \\ &= 187 \\ &= 2 \times 2^6 + 59 \\ &= (010111001)_2 \\ &= (010||111011)_2 \end{aligned} \qquad (10.25)$$

Further, in step S416, the determination unit 303 calculates the window value w[1] as illustrated in formula (10.26). Note that the window value w[1] obtained here has not yet been settled because there is a potential possibility that the window value w[1] will be incremented or decremented by the carry correction later.

$$w[1]=\text{diff}[8]||\text{diff}[7]||\text{diff}[6]=(010)_2=2 \qquad (10.26)$$

Further, since i=1, the processing proceeds to step S418. In step S418, the judgment unit 302 updates the signed (k+b)-bit value $d_H$, according to formula (9.5), specifically as illustrated in formula (10.27).

$$\begin{aligned} d_H &= (\text{diff}[5]||\ldots||\text{diff}[0])2^3 + (e[2]||\ldots||e[0]) \\ &= 59 \times 2^3 + (100)_2 \\ &= 472 + 4 \\ &= 476 \\ &= (111011100)_2 \end{aligned} \qquad (10.27)$$

Then, since the processing unit 301 decrements the loop variable i in step S420, i=0. And since i≥0, the processing goes back to step S404 from step S421.

In step S404, the judgment unit 302 judges as to which range the signed (k+b)-bit value $d_H$ updated as illustrated in formula (10.27) belongs. The signed (k+b)-bit value $d_H$ belongs to the range R4 because its sign is positive and the value of its MSB is 1.

Then, in step S412, the determination unit 303 determines the random value s[0] to be −s as illustrated in formula (10.28), and in step S413, determines the window correction value t[0] to be $-2^{k+b}$, as illustrated in formula (10.29)

$$s[0]=-s=-18=-(010010)_2 \qquad (10.28)$$

$$t[0]=-2^{k+b}=-2^9=-(1000000000)_2 \qquad (10.29)$$

And since the window correction value t[0] is a nonzero value, in step S414, the determination unit 303 performs the carry correction. That is to say, the determination unit 303 adds 1 to the window value w[1] obtained in formula (10.26). As a result, it is settled that the window value w[1] is the value of formula (10.30).

$$w[1]=2+1=3 \qquad (10.30)$$

Further, in step S415, the determination unit 303 calculates the corrected difference value diff, according to formula (9.3), specifically as illustrated in formula (10.31).

$$\begin{aligned} \text{diff} &= d_H - s[0] + t[0] \\ &= 476 + 18 - 512 \\ &= -18 \\ &= -(000010010)_2 \\ &= -(000||100010)_2 \end{aligned} \qquad (10.31)$$

Further, in step S416, the determination unit 303 calculates the window value w[0] as illustrated in formula (10.32). Since the window value w[0] is the lowest-order window value, no carry correction is applied thereto and the value is settled here.

$$w[0]=\text{diff}[8]||\text{diff}[7]||\text{diff}[6]=-(000)_2=(000)_2=0 \qquad (10.32)$$

Further, since i=0, the processing proceeds to step S419. In step S419, the judgment unit 302 updates the signed (k+b)-bit value $d_H$, according to formula (9.6), specifically as illustrated in formula (10.33).

$$d_H=(\text{diff}[5]||\ldots||\text{diff}[0])=-(010010)_2=-18 \qquad (10.33)$$

Then, since the processing unit 301 decrements the loop variable i in step S420, i=−1. And since i<0, the processing proceeds to step S422 from step S421. Accordingly, in step S422, the determination unit 303 obtains the correction value c as illustrated in formula (10.34).

$$c=d_H=-18 \qquad (10.34)$$

Finally, in step S423, the determination unit 303 outputs the window sequence w[i] as illustrated in formula (10.35) and the random number sequence s[i] as illustrated in formula (10.36) to the window operation unit 309, and outputs the correction value c as illustrated in formula (10.34) to the correction unit 310. Formula (10.35) is clear from formulae (10.21), (10.30), and (10.32), and formula (10.36) is clear from formulae (10.18), (10.23), and (10.28).

$$w[2]=2, w[1]=3, w[0]=0 \qquad (10.35)$$

$$s[2]=18, s[1]=18, s[0]=-18 \qquad (10.36)$$

When the processing of FIG. 11, which corresponds to step S103 of FIG. 9, is completed as mentioned above, in step S104 of FIG. 9, the acquisition unit 306 acquires the x-y coordinates of the point A. Then, in step S105, the scalar multiplication unit 307 generates the randomized table data tab[h] of formula (10.37) as scalar multiple information in accordance with the random value s=18 (see formula (10.17)) for each index h within the range of $-1 \le h \le 2^{k-1}+1=5$.

$$\text{tab}[h]=(2^b h+s)A=(2^6 h+18)A=(64h+18)A \qquad (10.37)$$

Then, the scalar multiple information storage unit 308 stores the generated randomized table data tab[h] in association with the index h.

FIG. 21 illustrates the window sequence w[i], the random number sequence s[i], and the correction value c obtained as mentioned above, and also illustrates a table 108 in which the scalar multiple information storage unit 308 holds the randomized table data tab[h].

According to the processing as explained above referring to FIGS. 19 to 20B, formula (8.9) holds true as illustrated in FIG. 21. Specifically, when the values of k=3, b=6, m=3, e=10988 in the example of FIGS. 19 to 20B and the values illustrated in formulae (10.34) to (10.36) are substituted for the respective variables in formula (8.9), the following formula, namely formula (10.38), is obtained.

$$c + 2^6 w[0] + 2^0 s[0] + 2^9 w[1] + 2^3 s[1] + 2^{12} w[2] + 2^6 s[2] = \qquad (10.38)$$
$$-18 + 64 \times 0 + 1 \times (-18) + 512 \times 3 +$$
$$8 \times 18 + 4096 \times 2 + 64 \times 18 = 10988$$

In addition, as illustrated in formula (10.37), in the table 108 of FIG. 21, the x-y coordinates of each of the scalar multiples −46A, 18A, 82A, 146A, 210A, 274A, and 338A are stored corresponding to each index h within the range of $-1 \le h \le 5$.

Accordingly, the x-y coordinates of the scalar multiple dA are eventually calculated as illustrated in formula (10.39) by the processing of FIG. 10, which corresponds to step S106 of FIG. 9, and by steps S107 to S111 of FIG. 9. Since the correspondence between this formula, namely formula (10.39), and FIGS. 9 and 10 are clear from the explanation for formula (9.36) of the first embodiment, explanation is omitted.

$$dA=2(2^3(2^3(O)+\text{tab}[w[2]])+\text{tab}[w[1]])-\text{tab}[-w[0]]+cA)+d[0]A \qquad (10.39)$$

When the part representing the target of the doubling of step S109 is modified at the right-hand side of this formula, namely formula (10.39), the following formula, namely formula (10.40), is obtained. Formula (10.40) also illustrates that formula (8.9) holds true in the second embodiment.

$$2^3(2^3(2^3(O)+\text{tab}[2])+\text{tab}[3])-\text{tab}[0]+cA = \qquad (10.40)$$
$$8(8(O+146A)+210A)-18A-18A =$$
$$8(1168A+210A)-36A = 8(1378A)-36A=10988A$$

As illustrated in FIG. 21, the dummy key e of formula (10.15) is obtained from the private key d illustrated in formula (10.41) or (10.42). In FIG. 21, as an example, the private key d of formula (10.42) is illustrated.

$$d=(1010101111011000)_2=21976 \qquad (10.41)$$

$$d=(1010101111011001)_2=21977 \qquad (10.42)$$

When the private key d is indicated by formula (10.41), d[0]=0 according to formula (10.41); therefore, formula (10.43) is obtained by substituting formula (10.40) at the right-hand side of formula (10.39).

$$2(10988A)+d[0]A=21976A+0=21976A=dA \qquad (10.43)$$

Meanwhile, when the private key d is indicated by formula (10.42), d[0]=1 according to formula (10.42); therefore, formula (10.44) is obtained by substituting formula (10.40) at the right-hand side of formula (10.39).

$$2(10988A)+d[0]A=21976A+A=21977A=dA \qquad (10.44)$$

As mentioned above, according to the second embodiment, the desired point dA is actually obtained by the processing illustrated in FIGS. 9, 10, and 19.

In the second embodiment, the range of the index h corresponding to the scalar multiple information tab[h] stored in the scalar multiple information storage unit 308 is $-1 \le h \le 2^{k-1}+1$. Therefore, in the second embodiment, the number of entries in the table held by the scalar multiple information storage unit 308 is $(2^{k-1}+3)$.

FIG. 22 compares the second embodiment, the third comparative example, and the fourth comparative example with respect to the number of entries of the table data where the window size k is 3. In FIG. 22, the tables 106 and 107 are the same as those in FIG. 14. That is, the table 106 is the table of the signed window method, which is explained as the fourth comparative example; the table 107 is the table of the randomized window method, which is explained as the third comparative example.

The table 109 is the table in which the scalar multiple information storage unit 308 stores the scalar multiple information in the second embodiment. Since k=3, for each index h where $-1 \le h \le 2^{3-1}+1=5$, the x-y coordinates of the point $(h \times 2^b+s)A$ are stored as table data tab[h] in the table 109. In other words, the number of entries in the table 109 is 7.

When the tables 106, 107, and 109 as mentioned above are compared, the table 109 in the second embodiment has the advantage that, while the secure method against a PA attack is provided, the number of entries is limited to the order of $2^{k-1}$ similarly to the table 106. In other words, the table 109 in the second embodiment is advantageous over the table 106 with respect to security, and is advantageous over the table 107 in that it consumes smaller amount of memory.

Subsequently, explanation is given for the third embodiment. The third embodiment is an embodiment for intending to further save memory by narrowing the range of the value having the possibility of being used as the index of the scalar multiple information storage unit 308, compared with the second embodiment.

Figure 23:
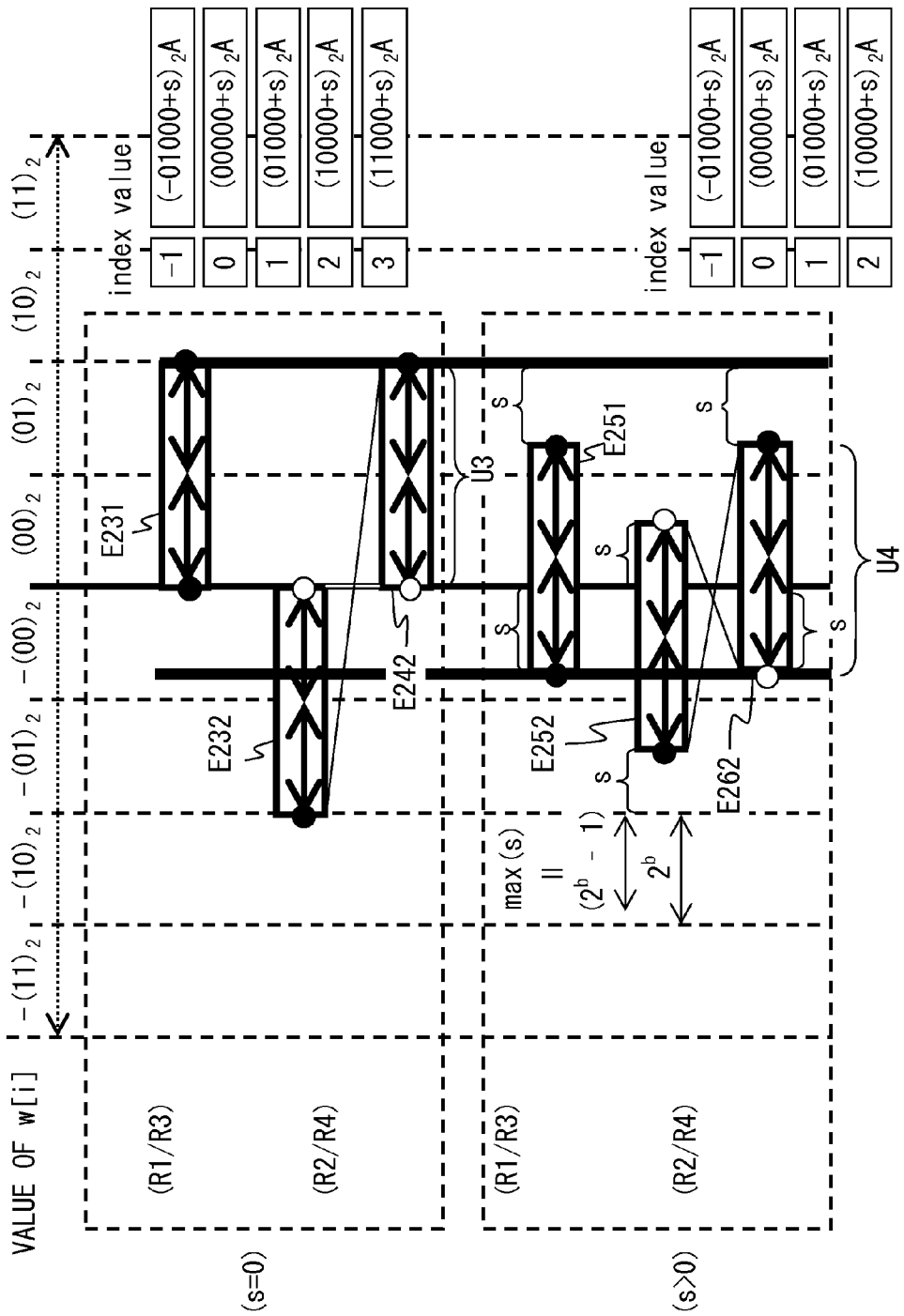
FIG. 23 explains the reduction in the memory usage according to the third embodiment.

Then, concerning the third embodiment, explanation is first given as to how to make it possible to narrow the range of the index by referring to FIG. 23. Then, by referring to FIGS. 24 to 27, details of the operation of the cryptographic processing device 300 in the third embodiment are explained.

FIG. 23 explains the reduction in the memory usage in the third embodiment. Hereinafter, FIG. 23 is explained, comparing it with FIGS. 17 and 18 concerning the second embodiment.

Specifically, in the third embodiment, by limiting the random value s to a nonzero value, the range of the index is narrowed and the memory usage of the scalar multiple information storage unit 308 is reduced. The reason that the memory usage is reduced by limiting the random value s to a nonzero value is clear when the second embodiment is examined for the case where s=0 and for the case where s>0. Hereinafter, explanation of the reason is given by referring to FIGS. 17, 18, and 23.

In FIGS. 17 and 18, the range illustrated by rectangle E211 is as indicated by formula (10.10) and the range illustrated by rectangle E213 is as indicated by formula (10.9). Accordingly, the ranges respectively illustrated by rectangles E211 and E213, which are illustrated in FIGS. 17 and 18, are the same, except in regard to whether or not the boundary values are included in the ranges.

For convenience of graphic illustration, it is defined that in FIG. 23, instead of rectangles E211 and E213, the rectangle which illustrates the union of the range illustrated by rectangle E211 and the range illustrated by rectangle E213 is used. According to formulae (10.9) and (10.10), the union of the range illustrated by rectangle E211 and the range illustrated by rectangle E213 is as illustrated by formula (11.1).

$$s \leq \text{diff} \leq 2^{k+b-1} - s \quad (11.1)$$

Therefore, when s=0, the union of the range illustrated by rectangle E211 and the range illustrated by rectangle E213 is as illustrated by formula (11.2) according to formula (11.1); the range of formula (11.2) is illustrated by rectangle E231 in FIG. 23.

$$0 \leq \text{diff} \leq 2^{k+b-1} \quad (11.2)$$

In addition, when s>0, the union of the range illustrated by rectangle E211 and the range illustrated by rectangle E213 is as illustrated by formula (11.3) according to formula (11.1); the range of formula (11.3) is illustrated by rectangle E251 in FIG. 23.

$$-s \leq \text{diff} \leq 2^{k+b-1} - s < 2^{k+b-1} \quad (11.3)$$

Further, in FIGS. 17 and 18, the range illustrated by rectangle E212 is as illustrated by formula (10.11) and the range illustrated by rectangle E214 is as illustrated by formula (10.13). In this way, the ranges respectively illustrated by rectangles E212 and E214, which are illustrated in FIGS. 17 and 18, are the same, except in regard to whether or not the boundary value is included in the ranges.

For convenience of graphic illustration, it is defined that in FIG. 23, instead of rectangles E212 and E214, the rectangle which illustrates the union of the range illustrated by rectangle E212 and the range illustrated by rectangle E214 is used. According to formulae (10.11) and (10.13), the union of the range illustrated by rectangle E212 and the range illustrated by rectangle E214 is as illustrated by formula (11.4).

$$-2^{k+b-1} + s \leq \text{diff} \leq s - 1 \quad (11.4)$$

Therefore, when s=0, the union of the range illustrated by rectangle E212 and the range illustrated by rectangle E214 is as illustrated by formula (11.5) according to formula (11.4); the range of formula (11.5) is illustrated by rectangle E232 in FIG. 23.

$$2^{k+k-1} \leq \text{diff} \leq -1 \quad (11.5)$$

Therefore, when the sign of the range of formula (11.5) illustrated by rectangle E232 is reversed, it is as illustrated by formula (11.6). The range of formula (11.6) is illustrated by rectangle E242 in FIG. 23.

$$1 \leq -\text{diff} \leq 2^{k+b-1} \quad (11.6)$$

In addition, when s>0, the union of the range illustrated by rectangle E212 and the range illustrated by rectangle E214 is as illustrated by rectangle E252 in FIG. 23. When the sign of the range illustrated by rectangle E252 is reversed, it is as illustrated by formula (11.7). The range of formula (11.7) is as illustrated by rectangle E262 in FIG. 23.

$$-2^b < -s + 1 \leq -\text{diff} \leq 2^{k+b-1} - s < 2^{k+b-1} \quad (11.7)$$

Therefore, when it is assumed that there is no carry correction effect, according to formulae (11.2) and (11.6), the range U3 of the index where s=0 is the range within which the most significant k bits of the (k+b)-bit value that is not less than 0 and is not greater than $2^{k+b-1}$ may vary. In other words, the range U3 is not less than 0 and not greater than $2^{k-1}$, and therefore, when k=2 and b=3 as illustrated in FIG. 23, it is not less than 0 and not greater than 2.

On the other hand, according to formulae (11.3) and (11.7), the range U4 of the index where s>0 with the assumption that there is no carry correction effect is the range within which the most significant k bits of the (k+b)-bit value that is not less than −s and is not greater than $(2^{k+b-1} - s)$ may vary. In addition, since $0 < s < 2^b$ and $-0 = +0 = 0$, the range U4 is not less than 0 and not greater than $(2^{k-1} - 1)$, and therefore, when k=2 and b=3 as illustrated in FIG. 23, it is not less than 0 and not greater than 1.

In other words, by limiting the random value s to a nonzero value, $2^{k-1}$ is excluded from the range of the index which corresponds to the window value before the carry correction. Therefore, when the carry correction is taken into consideration, limiting the random value s to a nonzero value makes it possible to eliminate the necessity of the index of $(2^{k-1} - 1)$. Therefore, by limiting the random value s to a nonzero value, the number of entries in the scalar multiple information storage unit 308 is decreased by one compared with the second embodiment.

For example, when k=2 and b=3 as illustrated in FIG. 23, if s=0, the index range is from −1 to 3 $(=2^{k-1} - 1)$, and five entries corresponding to the five indexes are included in the table of the scalar multiple information storage unit 308. On the other hand, if s>0, the index range is from −1 to $2(=2^{k-1})$, and four entries corresponding to the four indexes are included in the table of the scalar multiple information storage unit 308.

Thus, according to the third embodiment, only by limiting the random value s generated by the random number generation unit 305 to a nonzero value, further reduction in memory consumption of the scalar multiple information storage unit 308 is achieved.

Hereinafter, further specific explanation is given for the third embodiment explained above.

Figure 24:
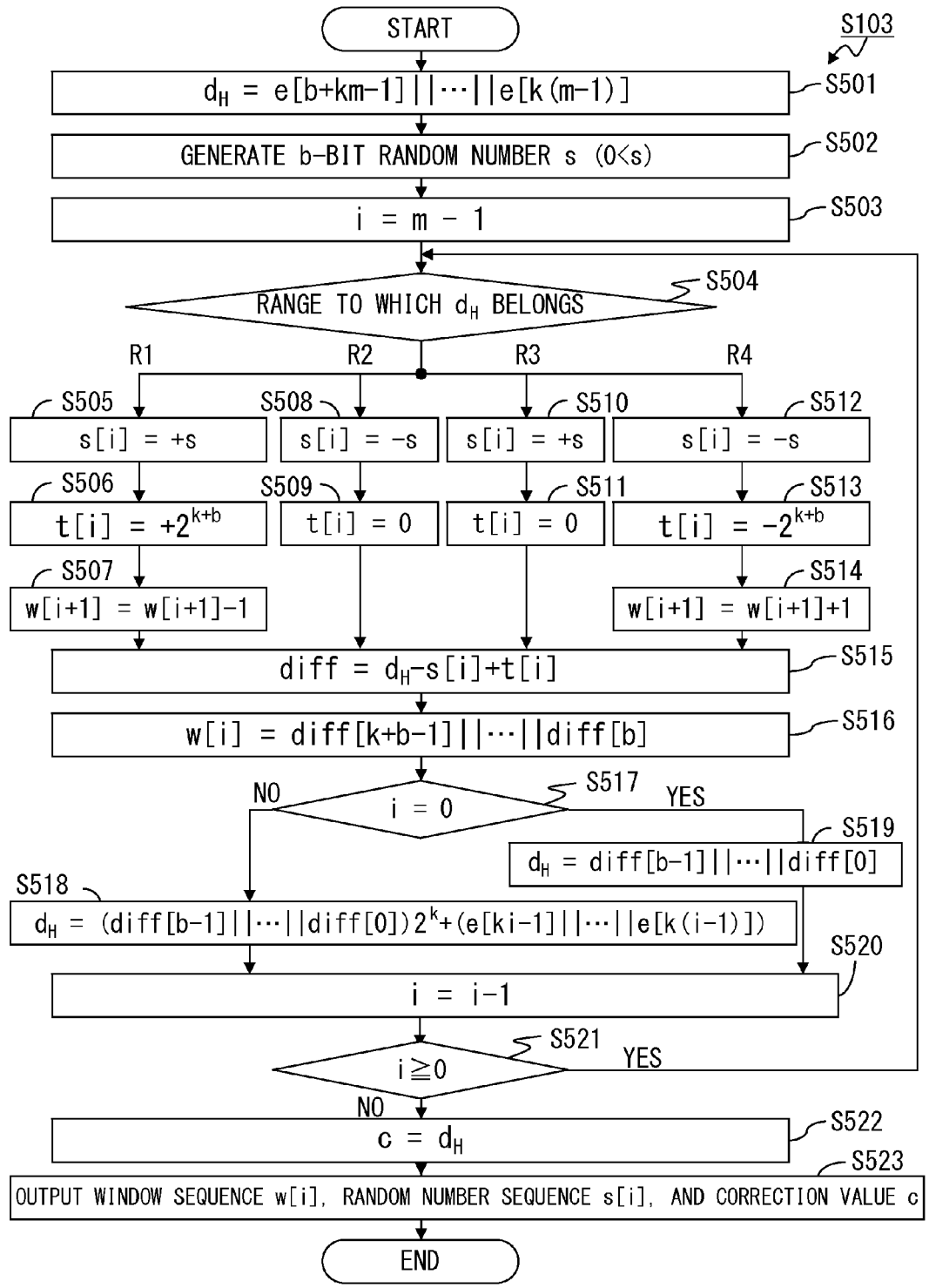
FIG. 24 is a flowchart of a process in which the cryptographic processing device in the third embodiment determines the window sequence, random number sequence, and correction value.

FIG. 24 is a flowchart of the processing in which the cryptographic processing device 300 determines the window sequence w[i], the random number sequence s[i], and the correction value c in the third embodiment. In other words, FIG. 24 is a flowchart of step S103 of FIG. 9 in the third embodiment.

Step S501 of FIG. 24 is similar to step S401 of FIG. 19 concerning the second embodiment, and steps S503 to S523 of FIG. 24 are similar to steps S403 to S423 of FIG. 19. Therefore, explanation is omitted for these steps.

In FIG. 24, what is different from FIG. 19 concerning the second embodiment is step S502. In step S502, the random number generation unit 305 generates the random value s that is a nonzero b-bit value. For simplification of explanation, the random value s is assumed to be positive. The case where the random value s is negative is mentioned later as a modification example of the third embodiment. Therefore, the random value s generated in step S502 satisfies formula (11.8).

$$0 < s \leq 2^b - 1 \quad (11.8)$$

Figure 25A:
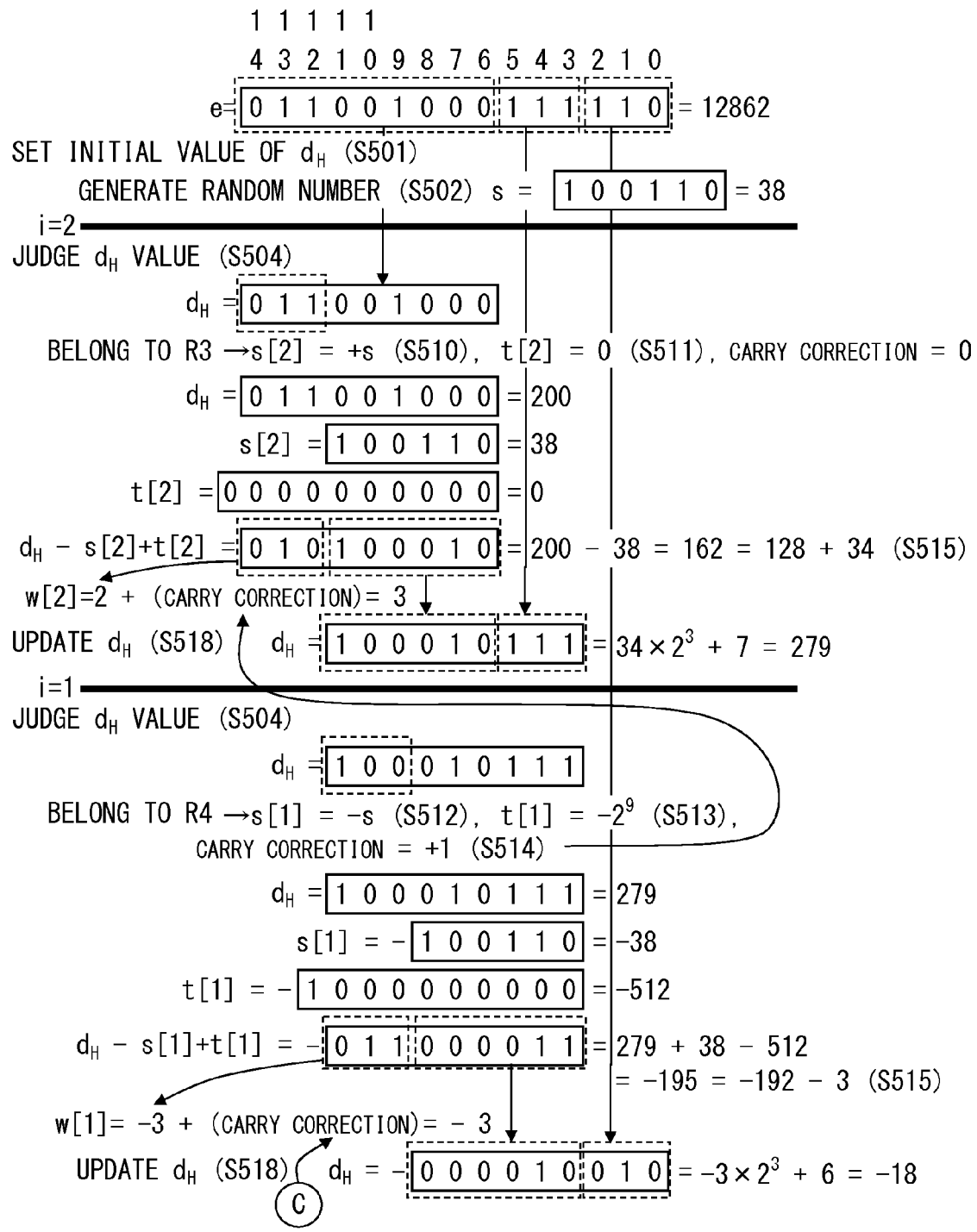
FIG. 25A is one (No. 1) of figures for illustrating a specific example of the window sequence, random number sequence, and correction value determined in the third embodiment.

Subsequently, by referring to FIGS. 25A to 26, a specific example of the processing of FIGS. 9, 10, and 24 in the third embodiment is explained.

Let the dummy key e obtained by the processing unit 301 in step S102 of FIG. 9 be a 15-bit value illustrated in formula (11.9). The specific examples of the private key d corresponding to formula (11.9) are mentioned later together with FIG. 26.

$$e = (011001000111110)_2 = 12862 \quad (11.9)$$

Subsequently, the processing of FIG. 24 corresponding to step S103 of FIG. 9 is started. In the examples of FIGS. 25A to 26, let the window size k be 3, and let the bit length b of the random value s be 6. Therefore, m=3 as in formula (9.9).

When the processing of FIG. 24 is started, in step S501, the judgment unit 302 initializes the signed (k+b)-bit value $d_H$, as illustrated in formula (11.10).

$$d_H = e[14] \| \ldots \| e[6] = (011001000)_2 = 200 \quad (11.10)$$

Further, in step S502, it is assumed that the random number generation unit 305 generates the value of formula (11.11) as the nonzero b(=6)-bit random value s.

$$s = (100110)_2 = 38 \quad (11.11)$$

In the next step, namely in step S503, the processing unit 301 initializes the loop variable i to be 2(=m−1). Then, in step S504, the judgment unit 302 judges to which range the signed (k+b)-bit value $d_H$ of formula (11.10) belongs. According to formula (11.10), the signed (k+b)-bit value $d_H$ belongs to the range R3 since its sign is positive and the value of its MSB is 0.

Therefore, in step S510, the determination unit 303 determines the random value s[2] to be +s as illustrated in formula (11.12), and in step S511, it determines the window correction value t[2] to be 0 as illustrated in formula (11.13). In addition, since the window correction value t[2] is 0, no carry correction is performed.

$$s[2] = +s = 38 = (100110)_2 \quad (11.12)$$

$$t[2] = 0 = (0000000000)_2 \quad (11.13)$$

In step S515, the determination unit 303 calculates the corrected difference value diff according to formula (9.3), specifically as illustrated in formula (11.14).

$$\begin{aligned} \text{diff} &= d_H - s[2] + t[2] \quad (11.14) \\ &= 200 - 38 + 0 \\ &= 162 \\ &= 2 \times 2^6 + 34 \\ &= (010100010)_2 \\ &= (101\|100010)_2 \end{aligned}$$

Further, in step S516, the determination unit 303 calculates the window value w[2] as illustrated in formula (11.15). Note that the window value w[2] obtained here has not yet been settled because there is a potential possibility that the window value w[2] will be incremented or decremented later by the carry correction.

$$w[2] = \text{diff}[8] \| \text{diff}[7] \| \text{diff}[6] = (010)_2 = 2 \quad (11.15)$$

Further, since i=2, the processing proceeds to step S518. In step S518, the judgment unit 302 updates the signed (k+b)-bit value $d_H$ according to formula (9.5), specifically as illustrated in formula (11.16).

$$\begin{aligned} d_H &= (\text{diff}[5] \| \ldots \| \text{diff}[0]) 2^3 + (e[5] \| \ldots \| e[3]) \quad (11.16) \\ &= 34 \times 2^3 + (111)_2 \\ &= 272 + 7 \\ &= 279 \\ &= (100010111)_2 \end{aligned}$$

Then, since the processing unit 301 decrements the loop variable i in step S520, i=1. Since the processing goes back from step S521 to step S504.

In step S504, the judgment unit 302 judges to which range the signed (k+b)-bit value $d_H$ updated as in formula (11.16) belongs. The signed (k+b)-bit value $d_H$ belongs to the range R4 because its sign is positive and the value of its MSB is 1.

Accordingly, in step S512, the determination unit 303 determines the random value s[1] to be −s as illustrated in formula (11.17), and in step S513, it determines the window correction value t[1] to be $-2^{k+b}$ as illustrated in formula (11.18).

$$s[1] = -s = -38 = -(100110)_2 \quad (11.17)$$

$$t[1] = -2^{k+b} = -2^9 = -(1000000000)_2 \quad (11.18)$$

And since the window correction value t[1] is a nonzero value, in step S514, the determination unit 303 performs the carry correction. That is to say, the determination unit 303 adds 1 to the window value w[2] obtained in formula (11.15). As a result, it is settled that the window value w[2] is the value of formula (11.19).

$$w[2] = 2 + 1 = 3 \quad (11.19)$$

Further, in step S515, the determination unit 303 calculates the corrected difference value diff, according to formula (9.3), specifically as illustrated in formula (11.20).

$$\begin{aligned} \text{diff} &= d_H - s[1] + t[1] \quad (11.20) \\ &= 279 + 38 - 512 \\ &= -195 \\ &= -3 \times 2^6 - 3 \\ &= -(011000011)_2 \\ &= -(011\|000011)_2 \end{aligned}$$

Further, the determination unit 303, in step S516, calculates the window value w[1] as illustrated in formula (11.21). Note that the window value w[1] obtained here has not been settled yet because there is a potential possibility that the window value w[1] will be incremented or decremented later by the carry correction.

$$w[1] = \text{diff}[8] \| \text{diff}[7] \| \text{diff}[6] = -(011)_2 = -3 \quad (11.21)$$

In addition, since i=1, the processing proceeds to step S518. In step S518, the judgment unit 302 updates the signed (k+b)-bit value $d_H$ according to formula (9.5), specifically as illustrated in formula (11.22).

$$d_H = (diff[5]\|\ldots\|diff[0])2^3 + (e[2]\|\ldots\|e[0]) \quad (11.22)$$
$$= -3 \times 2^3 + (110)_2$$
$$= -24 + 6$$
$$= -18$$
$$= (000010010)_2$$

Then, since the processing unit 301 decrements the loop variable i in step S520, i=0. Since i≥0, the processing goes back from step S521 to step S504.

In step S504, the judgment unit 302 judges to which range the signed (k+b)-bit value $d_H$ updated as in formula (11.22) belongs. The signed (k+b)-bit value $d_H$ belongs to the range R2 because its sign is negative and the value of its MSB is 0.

Accordingly, in step S508, the determination unit 303 determines the random value s[0] to be −s as illustrated in formula (11.23), and in step S509, the determination unit 303 determines the window correction value t[0] to be 0 as illustrated in formula (11.24). In addition, since the window correction value t[0] is 0, no carry correction is performed to the window value w[1]; it is settled that the window value w[1] is the value of formula (11.21).

$$s[0] = -s = -38 = -(100110)_2 \quad (11.23)$$

$$t[0] = 0 = (0000000000)_2 \quad (11.24)$$

And in step S515, the determination unit 303 calculates the corrected difference value diff, according to formula (9.3), specifically as illustrated in formula (11.25).

$$\text{diff} = d_H - s[0] + t[0] \quad (11.25)$$
$$= -18 + 38 + 0$$
$$= 20$$
$$= (000010100)_2$$
$$= (000\|010100)_2$$

Further, in step S516, the determination unit 303 calculates the window value w[0] as illustrated in formula (11.26). Since the window value w[0] is the lowest-order window value, no carry correction is applied thereto and the value is settled here.

$$w[0] = \text{diff}[8]\|\text{diff}[7]\|\text{diff}[6] = (000)_2 = 0 \quad (11.26)$$

In addition, since i=0, the processing proceeds to step S519. Then, in step S519, the judgment unit 302 updates the signed (k+b)-bit value $d_H$ according to formula (9.6), specifically as illustrated in formula (11.27).

$$d_H = (\text{diff}[5]\|\ldots\|\text{diff}[0]) = (010100)_2 = 20 \quad (11.27)$$

Then, since the processing unit 301 decrements the loop variable i in step S520, i=−1. Accordingly, since i<0, the processing proceeds from step S521 to step S522. Therefore, in step S522, the determination unit 303 obtains the correction value c as illustrated in formula (11.28).

$$c = d_H = 20 \quad (11.28)$$

Finally, in step S523, the determination unit 303 outputs the window sequence w[i] illustrated in formula (11.29) and the random number sequence s[i] illustrated in formula (11.30) to the window operation unit 309 and outputs the correction value c illustrated in formula (11.28) to the correction unit 310. Formula (11.29) is clear from formulae (11.19), (11.21), and (11.26), and formula (11.30) is clear from formulae (11.12), (11.17), and (11.23).

$$w[2] = 3, w[1] = -3, w[0] = 0 \quad (11.29)$$

$$s[2] = 38, s[1] = -38, s[0] = -38 \quad (11.30)$$

When the processing of FIG. 11, which corresponds to step S103 of FIG. 9, is completed as mentioned above, in step S104 in FIG. 9, the acquisition unit 306 acquires the x-y coordinates of the point A. Then, in step S105, the scalar multiplication unit 307 generates the randomized table data tab[h] of formula (11.31) as scalar multiple information in accordance with the random value s=38 (see formula (11.11)) for each index h within the range of $-1 \le h \le 2^{k-1} = 4$.

$$\text{tab}[h] = (2^b h + s)A = (2^6 h + 38)A = (64h + 38)A \quad (11.31)$$

Then, the scalar multiple information storage unit 308 stores the generated randomized table data tab[h] in association with the index h.

FIG. 26 illustrates the window sequence w[i], the random number sequence s[i], and the correction value c obtained as mentioned above, and FIG. 26 also illustrates a table 110 in which the scalar multiple information storage unit 308 holds the randomized table data tab[h].

According to the processing as explained above by referring to FIGS. 24 to 25B, formula (8.9) holds true as illustrated in FIG. 26. Specifically, when the values of k=3, b=6, m=3, e=12862 in the example of FIGS. 24 to 25B and the values illustrated in formulae (11.28) to (11.30) are substituted in the respective variables in formula (8.9), the following formula, namely formula (11.32), is obtained.

$$c + 2^6 w[0] + 2^0 s[0] + 2^9 w[1] + 2^3 s[1] + 2^{12} w[2] + 2^6 s[2] = \quad (11.32)$$
$$20 + 64 \times 0 + 1 \times (-38) + 512 \times (-3) +$$
$$8 \times (-38) + 4096 \times 3 + 64 \times 38 = 12862$$

In addition, as illustrated in formula (11.31), in the table 110 of FIG. 26, the x-y coordinates of each of the scalar multiples −26A, 38A, 102A, 166A, 230A, and 294A are stored corresponding to each index h within the range of −1≤h≤4.

Accordingly, the x-y coordinates of the scalar multiple dA are eventually calculated as illustrated in formula (11.33) by the processing of FIG. 10, which corresponds to step S106 of FIG. 9, and by steps S107 to S111 of FIG. 9. Since the correspondence between this formula, namely formula (11.33), and FIGS. 9 and 10 are clear from the explanation for formula (9.36) of the first embodiment, explanation is omitted.

$$dA = 2(2^3(2^3(2^3(O) + \text{tab}[w[2]]) - \text{tab}[-w[1]]) - \text{tab}[-w[0]] + cA) + d[0]A \quad (11.33)$$

When the part representing the target of the doubling of step S109 is modified at the right-hand side of this formula, namely formula (11.33), the following formula, namely formula (11.34), is obtained. Formula (11.34) also illustrates that formula (8.9) holds true in the third embodiment.

$$2^3(2^3(2^3(O) + \text{tab}[3]) - \text{tab}[3]) - \text{tab}[0] + 20A = \quad (11.34)$$
$$8(8(O + 230A) - 230A) - 38A + 20A =$$
$$8(1840A - 230A) - 18A = 8(1610A) - 18A = 12862A$$

As illustrated in FIG. 26, the dummy key e of formula (11.9) is obtained from the private key d illustrated in formula (11.35) or (11.36). In FIG. 26, as an example, the private key d of formula (11.35) is illustrated.

$$d=(110010001111100)_2=25724 \quad (11.35)$$

$$d=(110010001111101)_2=25725 \quad (11.36)$$

When the private key d is indicated by formula (11.35), d[0]=0 according to formula (11.35); therefore, formula (11.37) is obtained by substituting formula (11.34) on the right-hand side of formula (11.33).

$$2(12862A)+d[0]A=25724A+0=25724A=dA \quad (11.37)$$

Meanwhile, when the private key d is indicated by formula (11.36), d[0]=1 according to formula (11.36); therefore, formula (11.38) is obtained by substituting formula (11.34) on the right-hand side of formula (11.33).

$$2(12862A)+d[0]A=25724A+A=25725A=dA \quad (11.38)$$

As mentioned above, according to the third embodiment, the desired point dA is actually obtained by the processing illustrated in FIGS. 9, 10, and 24.

In the third embodiment, the range of the index h corresponding to the scalar multiple information tab[h] stored in the scalar multiple information storage unit 308 is $-1 \leq h \leq 2^{k-1}$. Therefore, in the third embodiment, the number of entries in the table held by the scalar multiple information storage unit 308 is $(2^{k-1}+2)$.

FIG. 27 compares the third embodiment, the third comparative example, and the fourth comparative example in regard to the number of entries of the table data where the window size k is 3. In FIG. 27, the tables 106 and 107 are the same as those of FIG. 14. That is, the table 106 is the table of the signed window method, which is explained as the fourth comparative example; the table 107 is the table of the randomized window method, which is explained as the third comparative example.

The table 111 is a table in which the scalar multiple information storage unit 308 stores the scalar multiple information in the third embodiment. Since k=3, the x-y coordinates of the point $(h \times 2^b + s)A$ are stored in the table 111 as the table data tab[h] for each index h where $-1 \leq h \leq 2^{3-1}=4$. That is to say, the number of entries in the table 111 is 6.

When the tables 106, 107, and 111 as mentioned above are compared, the table 111 of the third embodiment is advantageous in that the number of entries is reduced to the order of $2^{k-1}$ similarly to the table 106, while providing a secure method against a PA attack. In other words, the table 111 of the third embodiment is advantageous over the table 106 with respect to security, and the table 111 of the third embodiment is advantageous over the table 107 in that the table 111 has a smaller amount of memory consumption.

The present invention is not limited to the above-mentioned first to third embodiments. For example, with respect to the length u of the private key d, the window size k, and the length b of the random value s, some specific numerical values have been exemplified in the above-mentioned explanation for convenience. The specific values of u, k, and b, however, are arbitrary in accordance with the embodiments. In addition, the specific values of k and/or b may be determined in advance in a fixed manner as system parameters in an encrypted communication system which includes the cryptographic processing device 300, or the specific values of k and/or b may be variable values which are determined by the cryptographic processing device 300.

Meanwhile, in the first embodiment, the processing unit 301 estimates the window value w[i], presupposing that s[i]=+s. In some embodiments, however, the processing unit 301 may estimate the window value w[i], presupposing that s[i]=−s.

Further, in the first to third embodiments, the determination unit 303 outputs the random number sequence s[i] to the window operation unit 309. As illustrated in step S207 of FIG. 10, however, it is sufficient for the window operation unit 309 to be able to merely recognize "whether the random value s[i] is +s or −s".

Accordingly, in some embodiments, the determination unit 303 may output, for each i, information which indicates "whether the random value s[i] is +s or −s" to the window operation unit 309 instead of outputting the random number sequence s[i] itself to the window operation unit 309. For example, the determination unit 303 may output a sequence of 1-bit flags, each of which corresponds to each i, (i.e., the determination unit 303 may output a flag sequence that is m bits long in total) instead of outputting the random number sequence [i].

Meanwhile, in the first to third embodiments, the dummy key e is introduced as a technique to appropriately handle the highest-order carry correction value. Other techniques for appropriately handling the highest-order carry correction value, however, may be used in accordance with the embodiments. Among such techniques, two are exemplified as follows.

The first technique is a method of not using the dummy key e. More specifically, according to this first technique, step S102 of FIG. 9 is omitted and in the processing of FIG. 11, 19, or 24 corresponding to step S103, the private key d itself is used instead of the dummy key e. For example, in step S301 of FIG. 11 (or in step S401 of FIG. 19 or in step S501 of FIG. 24), the judgment unit 302 initializes the signed (k+b)-bit value $d_H$ by formula (12.1) instead of formula (9.1).

$$d_H = d[b+km-1] \| \ldots \| d[k(m-1)] \quad (12.1)$$

In step S318 of FIG. 11 (or in step S418 of FIG. 19 or in step S518 of FIG. 24), the judgment unit 302 updates the signed (k+b)-bit value $d_H$ by formula (12.2) instead of formula (9.5).

$$d_H = (\text{diff}[b-1] \| \ldots \| \text{diff}[0]) 2^k + (d[ki-1] \| \ldots \| d[k(i-1)]) \quad (12.2)$$

When the dummy key e is not used as mentioned above, there is a possibility that the value of d[u−1], which is the MSB of the private key d, may be 1. Accordingly, even when i=m−1, there is a possibility that the criterion value $(d_H-s)$ may be judged to belong to the range R4 in step S304 in FIG. 11 and that the carry correction may therefore occur. Alternatively, even when i=m−1, there is a possibility that the signed (k+b)-bit value $d_H$ may be judged to belong to the range R4 in step S404 of FIG. 19 or step S504 of FIG. 24 and that the carry correction may therefore occur.

Accordingly, in this first technique, in the case where step S314 of FIG. 11 (or step S414 of FIG. 19 or step S514 of FIG. 24) is executed when i=m−1, the determination unit 303 sets the window value w[m] as 1. That is to say, the determination unit 303 performs the carry correction, while regarding the initial value of the window value w[m] as 0.

The window value w[m] thus set corresponds to a more significant bit which exceeds the range of the u-bit private key d. In other words, the window value w[m] simply represents the carry correction value, although, for convenience of explanation, it is called the "window value" here, using the symbol "w[m]"; the window value w[m] is not used as the index for looking up the table data.

In this first technique, the initialization of step S201 of the processing of FIG. 10, which corresponds to step S106 of FIG. 9, is replaced by the processing which sets the point V as illustrated in formula (12.3).

$$V=2^b w[m]A \tag{12.3}$$

In order to set the point V as illustrated in formula (12.3), specifically, the window operation unit 309 may operate as follows. That is, the window operation unit 309 judges whether the window value w[m], which represents the highest-order carry correction value, is 0 or 1. Then, the window operation unit 309 stores the point at infinity O in variable V when w[m]=0, and stores the point A in variable V when w[m]=1. After that, the window operation unit 309 repeats processing of "performing the doubling to the point V and newly storing the doubling result in variable V" b times.

There is no change in the processing in and after step S202 of FIG. 10 and in steps S107 to S108 of FIG. 9. In addition, since the dummy key e is not used in this first technique, steps S109 to S111 of FIG. 9, which are the post-processing for using the dummy key e, are omitted.

Then, when m=4, for example, the point which the correction unit 310 outputs in step S112 is the desired point dA as illustrated in formula (12.4). Note that the notation "±tab[±w[i]]" in formula (12.4) is an abbreviated notation for representing "when s[i]=+s, +tab[w[i]], and when s[i]=−s, −tab[−w[i]]".

$$dA=2^k(2^k(2^k(2^{k+b}(w[4]A)\pm\text{tab}[\pm w[3]])\pm\text{tab}[\pm w[2]]) \\ \pm\text{tab}[\pm w[1]])\pm\text{tab}[\pm w[0]]+cA \tag{12.4}$$

In other words, according to this first technique, the processing unit 301 determines the window sequence w[i], the random number sequence s[i], and the correction value c under the constraint condition that formula (12.5) holds true.

$$d = c + 2^{km+b}w[m] + \sum_{i=0}^{m-1}(2^{ki+b}w[i] + 2^{ki}s[i]) \tag{12.5}$$

The second technique is a method of using a dummy key which is different from that in the above-mentioned first to third embodiments. For convenience of explanation, let "zero (z)" represent a bit string whose every bit has a value of 0 and whose length is z; according to this second technique, in step S102 of FIG. 9, the processing unit 301 obtains the dummy key r of formula (12.6) instead of the dummy key e of formula (8.6). In order to avoid confusion, the "dummy key r" is hereinafter called a "zero-padded bit string", which is a name different from the name "dummy key e".

$$r=\text{zero}(z)\|d \tag{12.6}$$

In the second technique, let the symbol "u" represent the length of the zero-padded bit string r instead of the length of the private key d itself. That is, the length of the private key d is (u−z).

Then, the values of the integer m, the bit length b of the random value s, and the window size k are determined so that formula (8.4) holds true with respect to the length u of the zero-padded bit string r. Explained from an opposite viewpoint, the number z of bits which are prepended to the private key d for the generation of the zero-padded bit string r is selected so as to allow a positive integer m which satisfies formula (8.4) to exist.

When the random value s is limited to not less than 0, it may be that z=1. As illustrated in the later-mentioned modification example, when the negative random value s is allowed, z>1.

In addition, for example, under circumstances such that the bit length (u−z) of the private key d, the bit length b of the random value s, and the window size k are determined in a fixed manner as system parameters, one example of a preferable settings is the setting of z=k.

According to formula (12.6), it is ensured that the MSB of the zero-padded bit string r is 0. Therefore, for a similar reason as explained with respect to step S304 of FIG. 11, it is ensured that no carry correction occurs when i=m−1. Accordingly, the processing of FIG. 10, which corresponds to step S106 of FIG. 9, is exactly the same as that of the first to third embodiments.

In addition, according to formula (12.6), the private key d and the zero-padded bit string r have a different bit length but they represent the same numerical value. Therefore, when this second technique is used, dA=rA; hence, the post-processing of steps S109 to S111 of FIG. 9 are unnecessary and are, therefore, omitted.

According to the second technique as explained above, the processing unit 301 determines the window sequence w[i], random number sequence s[i], and the correction value c under the constraint condition that formula (8.1) holds true.

The points in common for the technique of using the dummy key e in the first to third embodiments illustrated in FIGS. 9 to 11, 19, and 24, and the above-mentioned two techniques are as follows. In all cases, by using the random value s and a bit string D based on the private key d, the processing unit 301 determines the following values with respect to the positive integer m for which the relationship u=mk+b holds true for the length u of the bit string D and the window size k.

Signed k-bit window value w[i] corresponding to each i where 0≤i≤(m−1)

Signed b-bit random value s[i] corresponding to each i where 0≤i≤(m−1)

Correction value g

Specifically, the processing unit 301 determines the above-mentioned values under the constraint condition that formula (12.7) holds true, while determining each random value s[i] to be +s or −s.

$$D = g + \sum_{i=0}^{m-1}(2^{ki+b}w[i] + 2^{ki}s[i]) \tag{12.7}$$

In other words, the first to third embodiments correspond to the case where the bit string D and the correction value g in formula (12.7) are specifically those in formula (12.8); more specifically, the first to third embodiments correspond to the case where the right shift amount f is 1 in formula (12.8). As mentioned later, in the case where the random number generation unit 305 generates the negative random value s, the appropriate right shift amount f of formula (12.8) is not less than 2.

$$D=\text{zero}(f)\|d[u-1]\|\ldots\|d[f] \text{ and } g=c \tag{12.8}$$

In the case of formula (12.8), the constraint condition of formula (12.7) is equivalent to the constraint condition of formula (12.9) for any f.

$$d = 2^f\left(c + \sum_{i=0}^{m-1}(2^{ki+b}w[i] + 2^{ki}s[i])\right) + \sum_{i=0}^{f-1}2^i d[i] \tag{12.9}$$

This constraint condition of formula (12.9) is the constraint condition generalized from formula (8.8), which is for the case where the right shift amount f is 1. In addition, the dummy key e is as illustrated in formula (12.10) for any f. That is to say, formula (12.10) is a formula generalized from formula (8.7), in which the right shift amount f is 1.

$$e = \left\lfloor \frac{d}{2^f} \right\rfloor \tag{12.10}$$

In addition, the above-mentioned first technique corresponds to the case where the bit string D and the correction value g in formula (12.7) are, specifically, as illustrated in formula (12.11).

$$D=d \text{ and } g=2^{km+b}w[m]+c \tag{12.11}$$

In addition, the above-mentioned second technique corresponds to the case where the bit string D and the correction value g in formula (12.7) are, specifically, as illustrated in formula (12.12).

$$D=\text{zero}(z)\|d \text{ and } g=c \tag{12.12}$$

Meanwhile, in the above-mentioned explanation, the random value s is assumed to be non-negative for simplification of explanation; however, it may be that s≤0. As a modification example with respect to each of the first to third embodiments, explanation is given below for the case where s≤0 or s<0.

Figure 28:
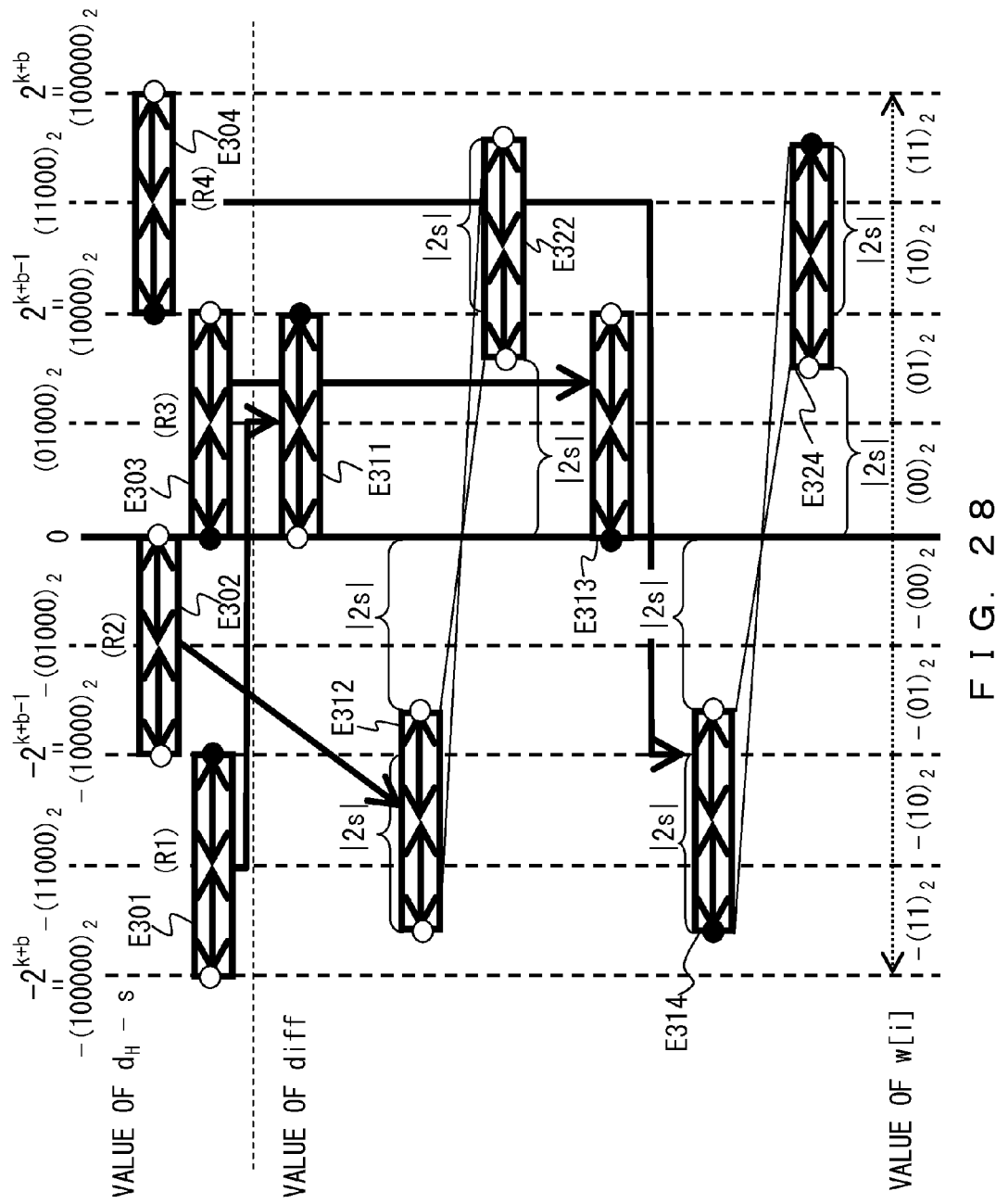
FIG. 28 schematically explains the range of the values used as an index of the scalar multiple information storage unit in the first embodiment modified to generate a random value of not greater than 0.

FIG. 28 schematically explains the range of the value used as an index of the scalar multiple information storage unit 308 in the first embodiment modified to generate a random value of not greater than 0.

In FIG. 28, rectangles E301, E302, E303, and E304 are respectively the same as rectangles E101, E102, E103, and E104 of FIG. 15, which concerns the first embodiment. Therefore, rectangles E311 and E313 which illustrate the range of the corrected difference value diff in the case where the presupposition that the random value s[i] is +s is formally employed (i.e., in the case where the criterion value ($d_H$-s) belongs to the range R1 or R3) are the same as rectangles E111 and E113 of FIG. 15.

The difference between FIGS. 15 and 28 lies in the case where the determination unit 303 determines the random value s[i] to be −s according to the judgment that the presupposition of the random value s[i] being +s is not appropriate (i.e., in the case where the criterion value ($d_H$-s) belongs to the range R2 or R4).

When the criterion value ($d_H$-s) belongs to the range R2, in the first embodiment illustrated in FIG. 15, as indicated in formula (9.51), rectangle E112 obtained by shifting rectangle E102 by +2s illustrates the range of the corrected difference value diff. In the modification example of FIG. 28, it is similar to FIG. 15 in that rectangle E312 obtained by shifting rectangle E302 by +2s illustrates the range of the corrected difference value diff. In the modification example of FIG. 28, however, since s≤0, the shift of +2s is a shift in the negative direction and it is not a shift to the positive direction as illustrated in FIG. 15.

Accordingly, the left end of rectangle E322 which illustrates the range whose sign is reverse to that of the range illustrated by rectangle E312 is positioned on |2s|, and the right end of rectangle E322 is positioned on ($2^{k+b-1}$+|2s|). Since some random values s may satisfy |2s|>$2^b$, there is a possibility that the most significant k bits of the range illustrated by rectangle E322 may indicate the value of ($2^{k-1}$+1) at a maximum.

Therefore, when the carry correction effect is taken into consideration, there is a possibility that the value of ($2^{k-1}$+2) may be used as the index of the scalar multiple information storage unit 308. In other words, when compared with the first embodiment illustrated in FIG. 15, in the modification example of FIG. 28, the entry which corresponds to the index of ($2^{k-1}$+2) is added in the scalar multiple information storage unit 308.

A similar argument holds true when the criterion value ($d_H$-s) belongs to the range R4 as well. In other words, when the criterion value ($d_H$-s) belongs to the range R4, in FIG. 28, rectangle E314 obtained by shifting rectangle E304 by ($-2^{k+b}$+2s), which includes the window correction, illustrates the range of the corrected difference value diff. Accordingly, the left end of rectangle E324, which illustrates the range whose sign is reverse to that of the range illustrated by rectangle E314, is positioned on |2s|, and the right end of rectangle E324 is positioned on ($2^{k+b-1}$+|2s|).

Therefore, there is a possibility that the most significant k bits of the range illustrated by rectangle E324 may indicate the value of ($2^{k-1}$+1) at a maximum. That is, when the carry correction effect is taken into consideration, there is a possibility that the value of ($2^{k-1}$+2) may be used as the index of the scalar multiple information storage unit 308.

When compared with the first embodiment illustrated in FIG. 15, however, a certain entry becomes unnecessary in the modification example of FIG. 28. More specifically, since there is a possibility that the left end positions of rectangles E122 and E124 may correspond to a value of not greater than $-2^b$ in the first embodiment illustrated in FIG. 15, the scalar multiple information storage unit 308 includes an entry which corresponds to the index of −2(=−1−1) in consideration of the carry correction effect. In the modification example of FIG. 28, however, the entry which corresponds to the index of −2 is unnecessary.

The reason is that, as illustrated in FIG. 28, both of the ranges illustrated by rectangles E322 and E324 include only positive values. That is to say, in the modification example of FIG. 28, the most significant k bits of −diff, which is obtained by reversing the sign of the corrected difference value diff, never indicates −1. Therefore, the entry which corresponds to the index of −2 is unnecessary in the scalar multiple information storage unit 308.

Therefore, in the modification example of FIG. 28 in which the random number generation unit 305 is modified to generate a random value s of not greater than 0, the number of entries is the same as that of the first embodiment, although the range of the index to be used is different from that of the first embodiment.

Figure 29:
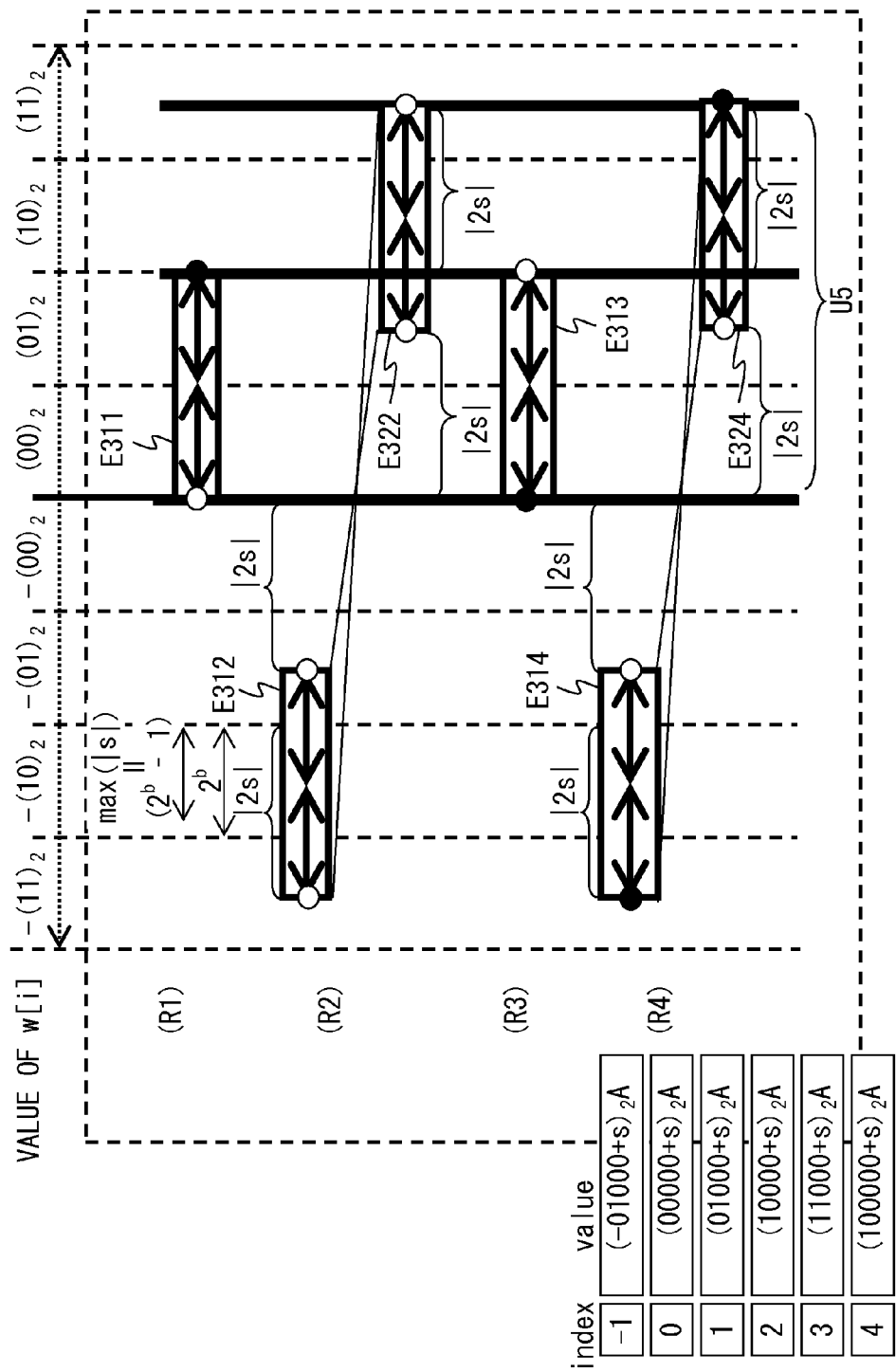
FIG. 29 summarizes the values used as an index in the first embodiment modified to generate a random value of not greater than 0.

That is to say, as summarized in FIG. 29, expressed in the same format as FIG. 16 concerning the first embodiment, ($2^{k-1}$+4) indexes from −1 to ($2^{k-1}$+2) are used in the modification example of FIG. 28.

FIG. 29 illustrates rectangles E311, E312, E322, E313, E314, and E324 of FIG. 28. In addition, FIGS. 28 to 29 illustrate the example in the case where the window size k is 2 and the random value s is the signed 3-bit value (i.e., b=3). Therefore, as illustrated in FIG. 29, in the modification example of FIG. 28, the scalar multiple information storage unit 308 holds the table data tab[h]=(h×$2^3$+s)A corresponding to each index h from −1 to ($2^{k-1}$+2) (i.e., −1 to 4).

Figure 30:
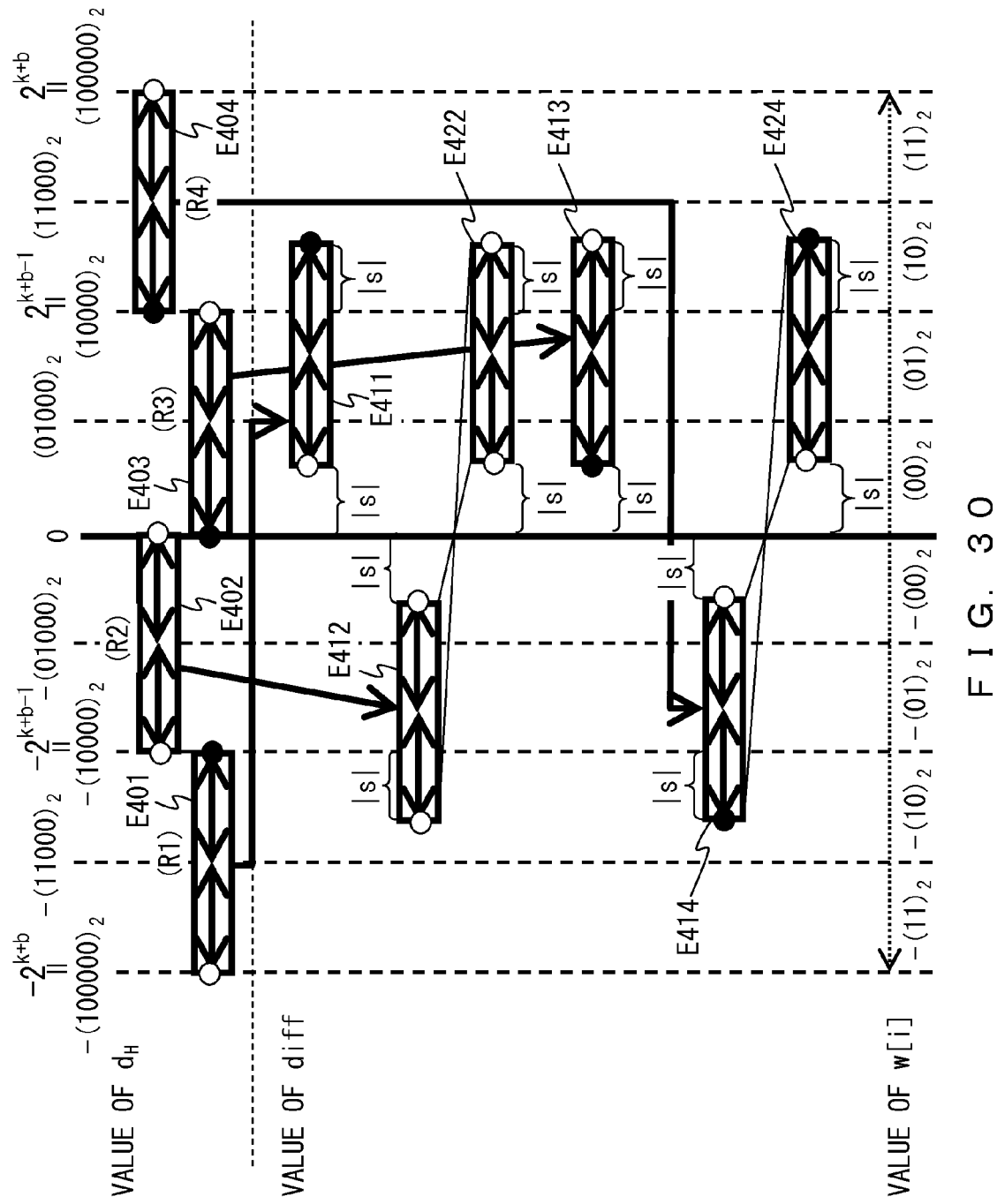
FIG. 30 schematically explains the range of the values used as an index of the scalar multiple information storage unit in the second embodiment modified to generate a random value of not greater than 0.

Subsequently, explanation is given for the modification example of the second embodiment. FIG. 30 schematically explains the range of the values used as an index of the scalar multiple information storage unit in the second embodiment modified to generate a random value of not greater than 0.

In FIG. 30, rectangles E401, E402, E403, and E404 are respectively the same as rectangles E201, E202, E203, and E204 of FIG. 18, which concerns the second embodiment.

The range of the corrected difference value diff in the case where the signed (k+b)-bit value $d_H$, which is used for judgment criterion, belongs to the range R1 is illustrated by rectangle E211, whose right end is positioned at $(2^{k+b-1}-s)$, in FIG. 18. Similarly, the range of the corrected difference value diff in the case where the signed (k+b)-bit value $d_H$ belongs to the range R3 is illustrated by rectangle E213, whose right end is positioned at $(2^{k+b-1}-s)$, in FIG. 18.

On the other hand, in the modification example of FIG. 30, since s≤0, the range of the corrected difference value diff in the case where the signed (k+b)-bit value $d_H$ belongs to the range R1 is illustrated by rectangle E411 whose right end is positioned at $(2^{k+b-1}-s)=(2^{k+b-1}+|s|)$. Similarly, the range of the corrected difference value diff in the case where the signed (k+b)-bit value $d_H$ belongs to the range R3 is illustrated by rectangle E413 whose the right end is positioned at $(2^{k+b-1}+|s|)$.

Note that $|s|<2^b$ because the random value s is a signed b-bit value. Therefore, the most significant k bits of the value corresponding to the right end of the range illustrated by rectangle E411 or E413 do not indicate a value greater than $2^{k-1}$. In other words, even though the right ends of rectangles E411 and E413 are positioned at the right side of $2^{k+b-1}$, it does not lead to an increase in the index.

In addition, the range of the corrected difference value diff in the case where the signed (k+b)-bit value $d_H$, which is used for judgment criterion, belongs to the range R2 is illustrated by rectangle E212, whose right end is positioned at s, in FIG. 18. Therefore, in FIG. 18, the position of the left end of rectangle E222, which illustrates the range of the index, is the position at −s. Similarly, the range of the corrected difference value diff in the case where the signed (k+b)-bit value $d_H$ belongs to the range R4 is illustrated by rectangle E214, whose right end is positioned at s, in FIG. 18. Therefore, in FIG. 18, the position of the left end of rectangle E224, which illustrates the range of the index, is the position at −s.

On the other hand, in the modification example of FIG. 30, since s≤0, the range of the corrected difference value diff in the case where the signed (k+b)-bit value $d_H$ belongs to the range R2 is illustrated by rectangle E412 whose right end is positioned at s=−|s|. Therefore, in FIG. 30, the position of the left end of rectangle E422 which illustrates the range of the index is the position of |s|, and thus is the right side of 0. In addition, the position of the right end of rectangle E422 is the position of $(2^{k+b-1}+|s|)$, and thus is the right side of the position of $2^{k+b-1}$. Since $|s|<2^b$, however, even though the right end of rectangle E422 is positioned at the right side of the position of $2^{k+b-1}$, it does not lead to an increase in the index.

The same holds true about rectangle E414 illustrating the range of the corrected difference value diff in the case where the signed (k+b)-bit value $d_H$ belongs to the range R4 and about rectangle E424 illustrating the range whose sign is reverse to that of the range illustrated by rectangle E414. That is to say, although the right end of rectangle E424, which illustrates the range of the index, is at the right side of the position of $2^{k+b-1}$, it does not bring about an increase in the index.

As mentioned above, in the second embodiment, even if the random number generation unit 305 is modified to generate a random value of not greater than 0, the range of the index used in the scalar multiple information storage unit 308 does not change.

In the third embodiment, in which the random value s is limited to a nonzero value, however, when the random number generation unit 305 is modified to generate a negative random value, the number of indexes is changed as well, as explained below by referring to FIG. 31.

Figure 31:
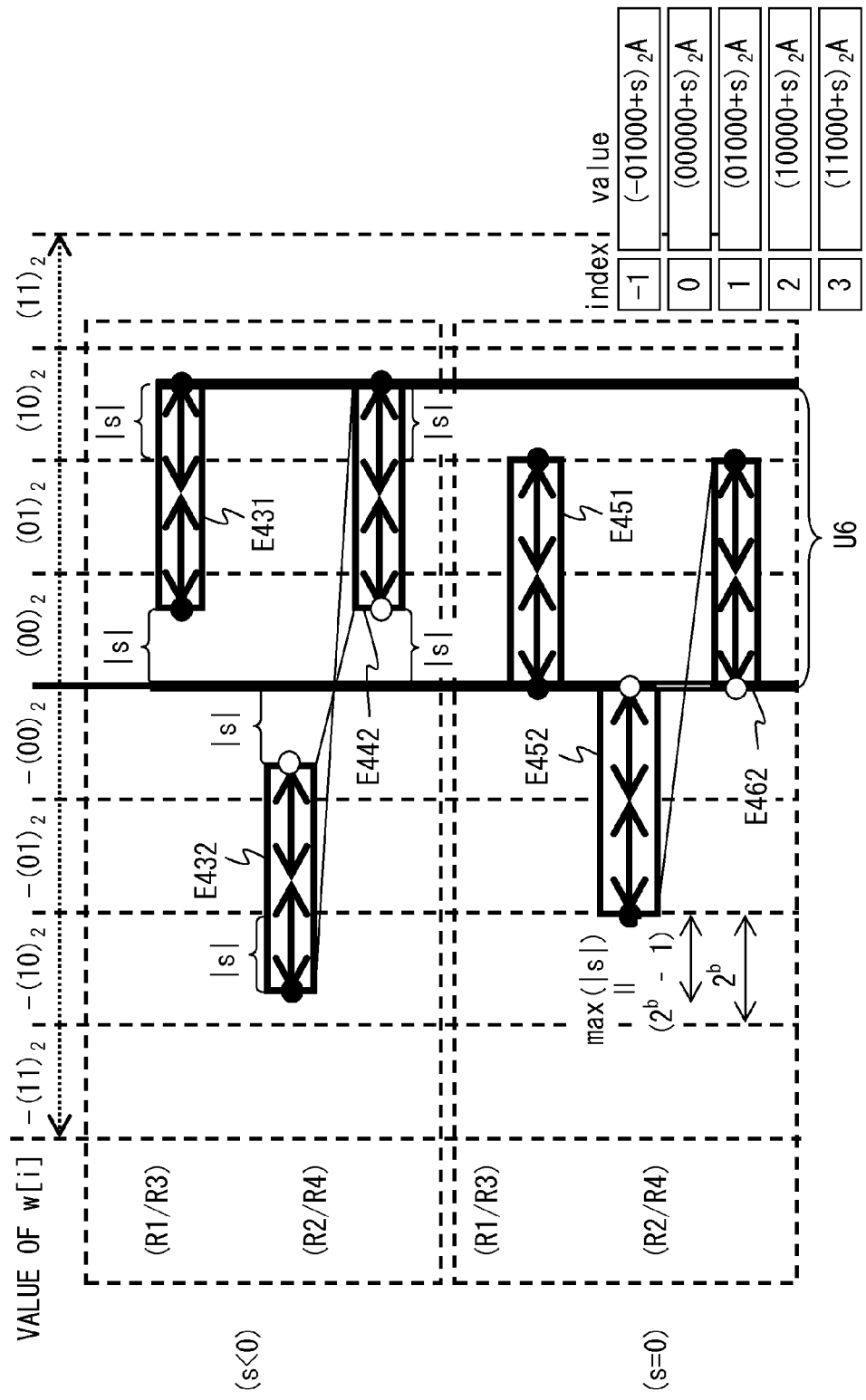
FIG. 31 summarizes values used as an index in the second embodiment modified to generate a random value of not greater than 0 and in the third embodiment modified to generate a negative random value.

FIG. 31 summarizes values used as an index in the second embodiment modified to generate a random value of not greater than 0 and in the third embodiment modified to generate a negative random value. FIG. 31 has the same format as that of FIG. 23, which explains the reduction in the memory usage according to the third embodiment. That is to say, in FIG. 31, the cases where the random value s is negative and where the random value s is 0 are graphically illustrated, separately.

With respect to the case where the random value s is negative, FIG. 31 illustrates: rectangle E431, which illustrates the union of the range illustrated by rectangle E411 of FIG. 30 and the range illustrated by rectangle E413; and rectangle E432, which illustrates the union of the range illustrated by rectangle E412 of FIG. 30 and the range illustrated by rectangle E414. In FIG. 31, rectangle E442 illustrating the range whose sign is reverse to that of the range illustrated by rectangle E432 is also illustrated.

As illustrated in FIG. 31, when s<0, the ranges illustrated by rectangles E431 and E442 include only the positive values because 0<|s|. Further, since 0<|s|, the right ends of rectangles E431 and E442 are positioned at the right side of the position corresponding to the index of $2^{k-1}$. Therefore, even when s<0, in which the random value s is limited to a nonzero value, there is a possibility that the index of $2^{k-1}$ may be used in the stage where an effect due to the carry correction has not yet been experienced, and thus, when the carry correction is taken into consideration, there is a possibility that the index of $(2^{k-1}+1)$ may be used.

With respect to the case where the random value is 0, FIG. 31 illustrates: rectangle E451, which illustrates the union of the range illustrated by rectangle E411 of FIG. 30 and the range illustrated by rectangle E413; and rectangle E452, which illustrates the union of the range illustrated by rectangle E412 of FIG. 30 and the range illustrated by rectangle E414. In FIG. 31, rectangle E462 illustrating the range whose sign is reverse to that of the range illustrated by rectangle E452 is also illustrated.

As illustrated in FIG. 31, when s=0, rectangles E451 and E462 illustrating the range of the index are the same as rectangles E231 and E242 of FIG. 23. Therefore, when s=0 in the modification example of FIG. 30, and when the carry correction is taken into consideration, there is a possibility that the indexes from −1 to $(2^{k-1}+1)$ may be used similarly to the second embodiment.

In other words, although the third embodiment has the effect of reducing the memory consumption amount compared with the second embodiment by limiting the random value s to a nonzero value, the number of entries does not change even when the random value s is limited to a nonzero value in the modification example, in which the random number generation unit 305 generates a negative random value. When explained from an opposite viewpoint, the effect of reducing the memory consumption amount is achieved not by simply limiting the random value s to a nonzero value, but by limiting the random value s to a positive nonzero value as illustrated in the third embodiment.

As mentioned above, various modification examples have been explained from some of the viewpoints; the following sums up the first to third embodiments and the above-mentioned various modification examples.

The processing unit 301 reads the private key d for elliptic curve cryptography from the private key storage unit 304 and recognizes the bit string D to be processed. The processing unit 301 may recognize the private key d itself as the bit string D to be processed. Alternatively, the processing unit 301 may modify the private key d in such a way that the value of the MSB is 0 and may recognize the bit string obtained by the modification as the bit string D to be processed. The above-mentioned dummy key e and the zero-padded bit string r are specific examples of the bit string D obtained by modifying the private key d by the processing unit 301 so that the value of the MSB is 0.

Further, the random number generation unit 305 generates the signed or unsigned b-bit random value s; the relation u=mk+b holds true for the length u of the bit string D and the window size k with respect to the positive integer m. With respect to the positive integer m, the processing unit 301 determines the window value w[i], which is a signed k-bit value corresponding to each i where 0≤i≤(m−1), the random value s[i], which is a signed b-bit value corresponding to each i where 0≤i≤(m−1), and the correction value g. Specifically, the processing unit 301 determines these values under the constraint condition that formula (12.7) holds true, by using the bit string D and the random value s, while determining each random value s[i] to be +s or −s.

To be more specific, in the first embodiment or its modification examples, the judgment unit 302 in the processing unit 301 judges whether either of the following criteria is satisfied or not.

A first criterion that a first value is not less than 0 and is less than $2^{k-1}$, the first value being a value estimated as the window value w[i] under the presupposition that the random value s[i] is +s.

A second criterion that a second value is not less than 0 and is not greater than $2^{k-1}$, the second value being a value obtained by correcting the first value by a window correction value which offsets a carry correction value to the window value w[i+1], whose order is higher by one order.

When i=m−1, the above-mentioned first value is constituted by the most significant k bits of a value obtained by subtracting the random value s from the most significant (k+b) bits of the bit string D (e.g., the initial value of the signed (k+b)-bit value $d_H$, which is set in step S301 of FIG. 11).

Meanwhile, when i<m−1, the above-mentioned first value is constituted by the most significant k bits of a value obtained by subtracting the random value s from the signed (k+b)-bit value. The signed (k+b)-bit value discussed here is a value obtained by canceling out the contribution of the window value w[j] and the random value s[j], which are calculated by the determination unit 303 for each j where i<j≤(m−1), from the most significant (k(m−i)+b) bits of the bit string D. More accurately, with respect to j, where j=i+1, the contribution of the window value w[j] to be canceled out from the most significant (k(m−i)+b) bits of the bit string D is the contribution of the window value w[j] before the carry correction. In addition, the specific example of this signed (k+b)-bit value is, in the first embodiment, the signed (k+b)-bit value $d_H$ updated in step S318 of FIG. 11.

The specific operational procedure of the judgment for the above-mentioned first and second criteria is, for example, as follows. That is to say, when the criterion value ($d_H$−s) belongs to the range R3, the judgment unit 302 may judge that "the first criterion is satisfied". In addition, when the criterion value ($d_H$−s) belongs to the range R1, the judgment unit 302 may judge that "the second criterion is satisfied".

When the first criterion is satisfied, the determination unit 303 in the processing unit 301, as illustrated in steps S310, S311, S315, and S316 of FIG. 11, determines the random value s[i] to be +s, and determines the window value w[i] to be the first value. When the second criterion is satisfied, the determination unit 303, as illustrated in steps S305 to S307, S315, and S316 of FIG. 11, determines the random value s[i] to be +s, and determines the window value w[i] to be the second value.

On the other hand, when neither the first criterion nor the second criterion is satisfied, the determination unit 303 determines the random value s[i] to be −s and calculates the window value w[i] in accordance with the random value s[i] determined as −s.

On this occasion, when the first value is positive, the determination unit 303 performs the window correction by a negative value which offsets a positive carry correction value for the window value w[i+1], whose order is higher by one order. For example, in the example of the first embodiment, when the criterion value ($d_H$−s) belongs to the range R4, the determination unit 303 sets the window correction value t[i] to be the negative value in step S313 of FIG. 11, thereby performing the window correction.

Meanwhile, when the random value s[i] is determined to be −s, if the above-mentioned first value is negative, the determination unit 303 calculates the window value w[i] in accordance with the random value s[i] determined as −s, without performing the window correction. For example, in the example of the first embodiment, if the criterion value ($d_H$−s) belongs to the range R2, the determination unit 303 does not perform the window correction.

The operations of the processing unit 301 in the first embodiment or in its modification examples have been heretofore mentioned. Summing up the operations of the processing unit 301 in the second embodiment, third embodiment or the modification examples of them is as follows.

The judgment unit 302 judges whether or not the signed (k+b)-bit value $d_H$ is included either in a first range of not less than 0 and not greater than $2^{k+b-1}-1$ (i.e., the range R3) or in a second range of not greater than $-2^{k+b-1}$ (i.e., the range R1).

When i=m−1, the signed (k+b)-bit value $d_H$ discussed here is constituted by the most significant (k+b) bits of the bit string D, and the specific example thereof is the value which is set in step S401 of FIG. 19 or in step S501 of FIG. 24. When i<m−1, the signed (k+b)-bit value $d_H$ is a value obtained by canceling out the contribution of the window value w[j] and the random value s[j], which are calculated for each j where i<j≤m−1, from the most significant (k(m−i)+b) bits of the bit string D. The specific example thereof is the value which is set in step S418 of FIG. 19 or in step S518 of FIG. 24. To be more accurate, with respect to j where j=i+1, the contribution of the window value w[j] to be canceled out from the most significant (k(m−i)+b) bits of the bit string D is the contribution of the window value w[j] before the carry correction.

When the signed (k+b)-bit value $d_H$ is included in the first range, the determination unit 303 determines the random value s[i] to be +s and determines the window value w[i] to be the most significant k bits of a value obtained by subtracting the random value s from the signed (k+b)-bit value $d_H$. Examples of this operation are illustrated in steps S410, S411, S415, and S416 of FIG. 19 and in steps S510, S511, S515, and S516 of FIG. 24.

When the signed (k+b)-bit value $d_H$ is included in the second range, the determination unit 303 determines the random value s[i] to be +s and determines the window value w[i] to be the most significant k bits of a value obtained by subtracting the random value s from the signed (k+b)-bit value $d_H$ and by adding the window correction value of $2^k$+b.

Examples of this operation are illustrated insteps S405 to S407, S415, and S416 of FIG. 19 and in steps S505 to S507, S515, and S516 of FIG. 24.

When the signed (k+b)-bit value $d_H$ is included neither in the first range nor in the second range, the determination unit 303 determines the random value s[i] to be −s and calculates the window value w[i] in accordance with the random value s[i] determined as −s.

On this occasion, when the signed (k+b)-bit value $d_H$ is positive, the determination unit 303 specifically performs the window correction by a negative value which offsets a positive carry correction value for the window value w[i+1], whose order is higher by one order. Examples of this operation are illustrated in steps S412 to S416 of FIG. 19 and in steps S512 to S516 of FIG. 24.

On the other hand, when the random value s[i] is determined to be −s, if the signed (k+b)-bit value $d_H$ is negative, the determination unit 303 calculates the window value w[i] in accordance with the random value s[i], without performing the window correction. Examples of this operation are illustrated in steps S408, S409, S415, and S416 of FIG. 19 and in steps S508, S509, S515, and S516 of FIG. 24.

In any of the embodiments as explained above, the range of the index h for which the scalar multiplication unit 307 calculates the coordinates of the point $(2^b h+s)A$ on the elliptic curve is as follows. The index h is not less than the negative value obtained by reversing the sign of the maximum value (e.g., 2 in the first embodiment, and 1 in the second and third embodiments) of the range of the window value w[i] which corresponds to the random value s[i] determined as −s by the processing unit 301. The index is also not greater than the maximum value (e.g., $2^{k-1}+1$ in the first and second embodiments, and $2^{k-1}$ in the third embodiment) of the range of the window value w[i] which corresponds to the random value s[i] determined as +s by the processing unit 301.

Finally, with respect to the number of entries of the table data, FIG. 32 summarizes the above-explained first to third embodiments and the modification examples thereof as well as the two comparative examples.

Any of the first to third embodiments is secure against a PA attack (i.e., secure against both an SPA attack and a DPA attack). The randomized window method explained as the third comparative example is also secure against a PA attack. The signed window method, as explained as the fourth comparative example, providing a memory-saving effect is, however, vulnerable to a DPA attack.

In the first embodiment, the range of the index of the scalar multiple information is $-2 \le h \le 2^{k-1}+1$ in the case where s≥0, and the range of the index is $-1 \le h \le 2^{k-1}+2$ in the case where s≤0, explained as the modification example. Therefore, the number of entries of the scalar multiple information is, in either case, $(2^{k-1}+4)$. For example, the respective numbers of entries, when the window size k is 2, 3, and 4, for example, are 6, 8, and 12.

In the second embodiment, both in the case where s≥0 and in the case where s≤0, explained as the modification example, the range of the index of the scalar multiple information is $-1 \le h \le 2^{k-1}+1$. Accordingly, the number of entries of the scalar multiple information is $(2^{k-1}+3)$. For example, the numbers of entries are 5, 7, and 11, respectively, when the window size k is 2, 3, and 4.

In the third embodiment, in which the random value s is limited to be a nonzero value, the range of the index of the scalar multiple information differs in the case where s>0 and in the case where s<0, and so does the number of entries. Specifically, in the case where s>0, the range of the index is $-1 \le h \le 2^{k-1}$, and the number of entries is $(2^{k-1}+2)$. For example, the numbers of entries are 4, 6, and 10, respectively, when the window size k is 2, 3, and 4. When s<0, the range of the index and the number of entries are the same as those in the second embodiment.

In the third comparative example, the range of the index of the table data is $0 \le h \le 2^k -1$ and the number of entries is $2^k$. For example, the numbers of entries are 4, 8, and 16, respectively, when the window size k is 2, 3, and 4.

Accordingly, when the first embodiment and the third comparative example are compared, when k is not less than 3, the number of entries in the first embodiment is not greater than the number of entries in the third comparative example, and in particular, when k is not less than 4, the number of entries in the first embodiment is less than the number of entries in the third comparative example.

In addition, when the second embodiment and the third comparative example are compared, when k is not less than 3, the number of entries in the second embodiment is less than the number of entries in the third comparative example. The same holds true when s<0 in the third embodiment.

Further, when the third embodiment and the third comparative example are compared with respect to the case where s>0, when k is not less than 2, the number of entries in the third embodiment is not greater than the number of entries in the third comparative example, and in particular, when k is not less than 3, the number of entries in the third embodiment is less than the number of entries in the third comparative example.

That is to say, while the numbers of entries in the first to third embodiments are on the order of $2^{k-1}$, the number of entries in the third comparative example is on the order of $2^k$. Therefore, although for a certain window size k the numbers of entries in the first to third embodiments may exceed the number of entries in the third comparative example, in many cases the numbers of entries in the first to third embodiments are less than the number of entries in the third comparative example. In addition, with respect to the window size, in many cases, k≥3. Accordingly, in practice inmost cases, the first to third embodiments have an advantage over the third comparative example with respect to memory usage.

In the fourth comparative example, the range of the index of the table data is $0 \le h \le 2^{k-1}$, and the number of entries is $(2^{k-1}+1)$. For example, the numbers of entries are 3, 5, and 9, respectively, when the window size k is 2, 3, and 4. In this way, regardless of the window size k, the number of entries in the fourth comparative example is always less than the numbers of entries in the first to third embodiments by 1 to 3; however, the fourth comparative example is vulnerable to a DPA attack. Accordingly, the first to third embodiments have an advantage over the fourth comparative example with respect to the security.

As mentioned above, as illustrated in FIG. 32, according to the first to third embodiments and the modification examples thereof, both security against an SPA attack and a DPA attack and a reduction in the memory usage are realized. Therefore, the cryptographic processing devices according to the first to third embodiments and the modification examples thereof are preferable in various fields, and in particular, they are preferable for devices with a small memory capacity such as smart cards, embedded devices, and the like.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A cryptographic processing device, comprising:
a private key storage unit which stores a private key d for elliptic curve cryptography;
a random number generation unit which generates a signed or unsigned b-bit random value s;
a memory storing instructions; and
a processor which executes the instructions to provide
a processing unit which
reads the private key d from the private key storage unit, and
with respect to a positive integer m where a relation u=mk+b holds true for
a length u of a bit string D which is the private key d or a bit string obtained by modifying the private key d in such a way that a value of a most significant bit is 0, and
a window size k,
determines, by using the bit string D and the random value s,
a window value w[i] which is a signed k-bit value corresponding to each i where 0≤i≤(m−1),
a random value s[i] which is a signed b-bit value corresponding to each i where 0≤i≤(m−1), and
a correction value g,
under a constraint condition in which $$D = g + \sum_{i=0}^{m-1} (2^{ki+b} w[i] + 2^{ki} s[i])$$

holds true,
while determining each random value s[i] to be +s or −s.

2. The cryptographic processing device according to claim 1, wherein the processor executes the instruction to provide the processing unit including:
a judgment unit which judges whether
either a first criterion that a first value is not less than 0 and is less than $2^{k-1}$, the first value being a value estimated as the window value w[i] under a presupposition that the random value s[i] is +s,
or a second criterion that a second value is not less than 0 and is not greater than $2^{k-1}$, the second value being a value obtained by correcting the first value by a window correction value which offsets a carry correction value to a window value w[i+1] whose order is higher than an order of the window value w[i] by one order,
is satisfied or not; and
a determination unit which
determines the random value s[i] to be +s, and determines the window value w[i] to be the first value, when the first criterion is satisfied,
determines the random value s[i] to be +s, and determines the window value w[i] to be the second value, when the second criterion is satisfied, and
determines the random value s[i] to be −s and calculates the window value w[i] in accordance with the random value s[i] determined as −s, when neither the first criterion nor the second criterion is satisfied.

3. The cryptographic processing device according to claim 2, wherein
when i=m−1, the first value is constituted by most significant k bits of a value obtained by subtracting the random value s from most significant (k+b) bits of the bit string D, and,
when i<m−1, the first value is constituted by most significant k bits of a value obtained by subtracting the random value s from a signed (k+b)-bit value that is a value obtained by canceling out contribution of a window value w[j] and a random value s[j] which are calculated by the determination unit for each j where i<j≤m−1, from most significant (k(m−i)+b) bits of the bit string D.

4. The cryptographic processing device according to claim 2, wherein in a case where the determination unit determines the random value s[i] to be −s,
the determination unit performs a window correction by a negative value which offsets a positive carry correction value for the window value w[i+1], whose order is higher by one order, in calculating the window value w[i] in accordance with the random value s[i] determined to be −s, when the first value is positive, and
the determination unit calculates the window value w[i] in accordance with the random value s[i] determined to be −s, without performing the window correction, when the first value is negative.

5. The cryptographic processing device according to claim 1, wherein the processor executes the instructions to provide the processing unit including:
a judgment unit which judges whether a signed (k+b)-bit value $d_H$ is included
either in a first range of not less than 0 and not greater than $2^{k+b-1}-1$
or in a second range of not greater than $-2^{k+b-1}$ or not,
where the signed (k+b)-bit value $d_H$ is
a value indicated by most significant (k+b) bits of the bit string D, when i=m−1, and
a value obtained by canceling out contribution of a window value w[j] and a random value s[j] calculated for each j where i<j≤m−1, from most significant (k(m−i)+b) bits of the bit string D, when i<m−1; and
a determination unit which
determines the random value s[i] to be +s and determines the window value w[i] to be most significant k bits of a value obtained by subtracting the random value s from the signed (k+b)-bit value $d_H$, when the signed (k+b)-bit value $d_H$ is included in the first range,
determines the random value s[i] to be +s and determines the window value w[i] to be most significant k bits of a value obtained by subtracting the random value s from the signed (k+b)-bit value $d_H$ and by adding a window correction value of $2^{k+b}$, when the signed (k+b)-bit value $d_H$ is included in the second range, and
determines the random value s[i] to be −s and calculates the window value w[i] in accordance with the random value s[i] determined as −s, when the signed (k+b)-bit value $d_H$ is included in neither the first range nor the second range.

6. The cryptographic processing device according to claim 5, wherein in a case where the determination unit determines the random value s[i] to be −s,
the determination unit performs a window correction by a negative window correction value which offsets a positive carry correction value for a window value w[i+1] whose order is higher by one order, in calculating the window value w[i] in accordance with the random value s[i] determined to be −s, when the signed (k+b)-bit value $d_H$ is positive, and the determination unit calculates the window value w[i] in accordance with the random value s[i] determined to be −s, without performing the window correction, when the signed (k+b)-bit value $d_H$ is negative.

7. The cryptographic processing device according to claim 5, wherein the random number generation unit generates only a nonzero positive value as the random value s.

8. The cryptographic processing device according to claim 1, wherein the processor executes the instructions to further provide:

a scalar multiplication unit which calculates coordinates of a point $(2^b h + s)A$ on an elliptic curve for each index h which is not less than a negative value obtained by reversing a sign of a maximum value of a range of the window value w[i] which corresponds to the random value s[i] determined as −s by the processing unit, and which is not greater than a maximum value of a range of the window value w[i] which corresponds to the random value s[i] determined as +s by the processing unit;

and a scalar multiple information storage unit which stores, in association with the index h, the coordinates of the point $(2^b h + s)A$ calculated by the scalar multiplication unit for each index h of not less than the negative value and not greater than the maximum value.

9. An cryptographic processing method, comprising:
reading a private key d for elliptic curve cryptography;
recognizing the private key d as a bit string D to be processed, or modifying the private key d in such a way that a value of a most significant bit is 0 and recognizing the bit string obtained by the modifying as the bit string D;
generating a signed or unsigned b-bit random value s; and
with respect to a positive integer m where a relation u=mk+b holds true for a length u of the bit string D and a window size k, determining, by using the bit string D and the random value s,
a window value w[i] which is a signed k-bit value corresponding to each i where 0≤i≤(m−1),
a random value s[i] which is a signed b-bit value corresponding to each i where 0≤i≤(m−1), and
a correction value g,
under a constraint condition in which $$D = g + \sum_{i=0}^{m-1} (2^{ki+b} w[i] + 2^{ki} s[i])$$

holds true,
while determining each random value s[i] to be +s or −s.

10. The cryptographic processing method according to claim 9, comprising:
estimating a value for the window value w[i] under a presupposition that the random value s[i] is +s;
judging whether
either a first criterion that a first value which is the estimated value is not less than 0 and is less than $2^{k-1}$,
or a second criterion that a second value is not less than 0 and is not greater than $2^{k-1}$, the second value being a value obtained by correcting the first value by a window correction value which offsets a carry correction value to a window value w[i+1] whose order is higher than an order of the window value w[i] by one order,
is satisfied or not; and
determining the random value s[i] to be +s, and determining the window value w[i] to be the first value, when the first criterion is satisfied;
determining the random value s[i] to be +s, and determining the window value w[i] to be the second value, when the second criterion is satisfied; and
determining the random value s[i] to be −s and calculating the window value w[i] in accordance with the random value s[i] determined as −s, when neither the first criterion nor the second criterion is satisfied.

11. The cryptographic processing method according to claim 10, wherein
when i=m−1, the first value is constituted by most significant k bits of a value obtained by subtracting the random value s from most significant (k+b) bits of the bit string D, and,
when i<m−1, the first value is constituted by most significant k bits of a value obtained by subtracting the random value s from a signed (k+b)-bit value that is a value obtained by canceling out contribution of a window value w[j] and a random value s[j] which are calculated for each j where i<j≤m−1, from most significant (k(m−i)+b) bits of the bit string D.

12. The cryptographic processing method according to claim 10, wherein in a case where the random value s[i] is determined to be −s, the cryptographic processing method comprises:
performing a window correction by a negative value which offsets a positive carry correction value for the window value w[i+1], whose order is higher by one order, in calculating the window value w[i] in accordance with the random value s[i] determined to be −s, when the first value is positive; and
calculating the window value w[i] in accordance with the random value s[i] determined to be −s, without performing the window correction, when the first value is negative.

13. The cryptographic processing method according to claim 9, comprising:
calculating a signed (k+b)-bit value $d_H$ which is
a value indicated by most significant (k+b) bits of the bit string D, when i=m−1, and
a value obtained by canceling out contribution of a window value w[j] and a random value s[j] calculated for each j where i<j≤m−1, from most significant (k(m−i)+b) bits of the bit string D, when i<m−1;
judging whether or not the signed (k+b)-bit value $d_H$ is included either in a first range of not less than 0 and not greater than $2^{k+b-1}-1$, or in a second range of not greater than $-2^{k+b-1}$;
determining the random value s[i] to be +s and determining the window value w[i] to be most significant k bits of a value obtained by subtracting the random value s from the signed (k+b)-bit value $d_H$, when the signed (k+b)-bit value $d_H$ is included in the first range;
determining the random value s[i] to be +s and determining the window value w[i] to be most significant k bits of a value obtained by subtracting the random value s from the signed (k+b)-bit value $d_H$ and by adding a window correction value of $2^{k+b}$, when the signed (k+b)-bit value $d_H$ is included in the second range; and
determining the random value s[i] to be −s and calculating the window value w[i] in accordance with the random value s[i] determined as −s, when the signed (k+b)-bit value $d_H$ is included in neither the first range nor the second range.

14. The cryptographic processing method according to claim 13, wherein in a case where the random value s[i] is determined to be −s, the cryptographic processing method comprises:

performing a correction by a negative window correction value which offsets a positive carry correction value for a window value w[i+1] whose order is higher by one order, in calculating the window value w[i] in accordance with the random value s[i] determined to be −s, when the signed (k+b)-bit value $d_H$ is positive; and calculating the window value w[i] in accordance with the random value s[i] determined to be −s, without performing the window correction, when the signed (k+b)-bit value $d_H$ is negative.

15. The cryptographic processing method according to claim 13, wherein the random value s is a nonzero positive number.

* * * * *